United States Patent
Jeong et al.

(10) Patent No.: US 11,509,925 B2
(45) Date of Patent: Nov. 22, 2022

(54) METHOD AND DEVICE FOR VIDEO ENCODING AND VIDEO DECODING MOTION VECTOR INFORMATION

(71) Applicant: SAMSUNG ELECTRONICS CO., LTD., Suwon-si (KR)

(72) Inventors: Seungsoo Jeong, Suwon-si (KR); Minwoo Park, Suwon-si (KR); Anish Tamse, Suwon-si (KR); Minsoo Park, Suwon-si (KR); Kiho Choi, Suwon-si (KR); Yinji Piao, Suwon-si (KR); Narae Choi, Suwon-si (KR); Woongil Choi, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 22 days.

(21) Appl. No.: 17/045,376

(22) PCT Filed: Apr. 12, 2019

(86) PCT No.: PCT/KR2019/004458
§ 371 (c)(1),
(2) Date: Oct. 5, 2020

(87) PCT Pub. No.: WO2019/199127
PCT Pub. Date: Oct. 17, 2019

(65) Prior Publication Data
US 2021/0152844 A1 May 20, 2021

Related U.S. Application Data

(60) Provisional application No. 62/743,628, filed on Oct. 10, 2018, provisional application No. 62/656,692, filed on Apr. 12, 2018.

(51) Int. Cl.
H04N 11/02 (2006.01)
H04N 19/52 (2014.01)
(Continued)

(52) U.S. Cl.
CPC .......... *H04N 19/52* (2014.11); *H04N 19/119* (2014.11); *H04N 19/176* (2014.11)

(58) Field of Classification Search
CPC .................................................. H04N 19/52
(Continued)

(56) References Cited

U.S. PATENT DOCUMENTS 10,602,179 B2 3/2020 Jeong et al.
2006/0083440 A1* 4/2006 Chen ..................... H04N 5/272
382/284

(Continued)

FOREIGN PATENT DOCUMENTS

KR 10-2014-0113855 A 9/2014
KR 10-2017-0125086 A 11/2017
(Continued)

OTHER PUBLICATIONS

Communication dated Jul. 16, 2019 issued by the International Searching Authority in counterpart English Application No. PCT/KR2019/004458 (PCT/ISA/220, PCT/ISA/210, and PCT/ISA/237).
(Continued)

Primary Examiner — Leron Beck
(74) Attorney, Agent, or Firm — Sughrue Mion, PLLC

(57) ABSTRACT

A video decoding method includes: obtaining two or more base motion vectors from an adjacent block of a current block; obtaining correction information for correcting the two or more base motion vectors; determining two or more affine motion vectors by correcting the two or more base motion vectors according to the correction information; obtaining a plurality of affine parameters of the current block according to the two or more affine motion vectors; and predicting the current block according to the plurality of affine parameters.

13 Claims, 26 Drawing Sheets

(51) Int. Cl.
*H04N 19/119* (2014.01)
*H04N 19/176* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 2011/0242339 A1* | 10/2011 | Ogawa ................ | G06T 7/285 348/208.4 |
| 2013/0022123 A1* | 1/2013 | Ueda .................. | H04N 19/51 375/240.16 |
| 2014/0269923 A1 | 9/2014 | Kwon et al. | |
| 2017/0347116 A1* | 11/2017 | Lin ..................... | H04N 19/176 |
| 2017/0374379 A1 | 12/2017 | Chen et al. | |
| 2018/0070102 A1 | 3/2018 | Zhang et al. | |
| 2018/0184126 A1* | 6/2018 | Zhang ................. | H04N 19/137 |
| 2018/0192069 A1* | 7/2018 | Chen .................. | H04N 19/51 |
| 2018/0270500 A1* | 9/2018 | Li ....................... | H04N 19/54 |
| 2019/0110064 A1* | 4/2019 | Zhang ................. | H04N 19/184 |
| 2019/0182504 A1* | 6/2019 | Lainema .............. | H04N 19/70 |
| 2019/0238843 A1* | 8/2019 | Filippov ............. | H04N 19/176 |
| 2019/0273943 A1* | 9/2019 | Zhao .................. | H04N 19/176 |

FOREIGN PATENT DOCUMENTS

| | | |
|---|---|---|
| KR | 10-2018-0006961 A | 1/2018 |
| WO | 2017/200771 A1 | 11/2017 |

OTHER PUBLICATIONS

Huanbang Chen et al., "Description of SDR, HDR and 360° video coding technology proposal by Huawei, GoPro, HiSilicon, and Samsung", Document: JVET-J0025 (version 2), Joint Video Exploration Team (JVET) of ITU-T SG 16 WP 3 and ISO/IEC JTC 1/SC 29/WG 11, 10th Meeting: San Diego, US, Apr. 3, 2018, pp. 1-127, 133 pages total.

Y. Chen et al., "Description of SDR, HDR and 360° video coding technology proposal by Qualcomm and Technicolor—low and high complexity versions", Document: JVET-J0021, Joint Video Exploration Team (JVET) of ITU-T SG 16 WP 3 and ISO/IEC JTC 1/SC 29/WG 11, 10th Meeting: San Diego, US, Apr. 2, 2018, pp. 1-43, 43 pages total.

Hong Zhang et al.."Performance analysis of affine inter prediction in JEM1.0", Document: JVET-B0037, Joint Video Exploration Team (JVET) of ITU-T SG 16 WP 3 and ISO/IEC JTC 1/SC 29/WG 11, 2nd Meeting: San Diego, USA, Feb. 15, 2016, pp. 1-8, 8 pages total.

Feng Zou et al., "Improved affine motion prediction", Document: JVET-C0062_v2, Joint Video Exploration Team (JVET) of ITU-T SG 16 WP 3 and ISO/IEC JTC 1/SC 29/WG 11, 3rd Meeting: Geneva, CH, May 25, 2016, pp. 1-5, 5 pages total.

Guichun Li et al.,"CE2: Affine merge with prediction offset (Test CE2.2.4)", Document: JVET-M0431, Joint Video Experts Team (JVET) of ITU-T SG 16 WP 3 and ISO/IEC JTC 1/SC 29/WG 11, 13th Meeting: Marrakech, MA, Jan. 2, 2019, pp. 1-5, 5 pages total.

* cited by examiner

FIG. 3
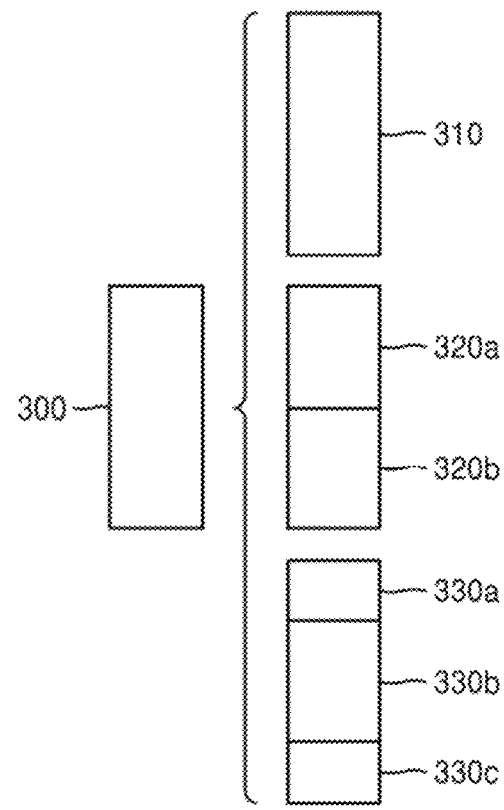
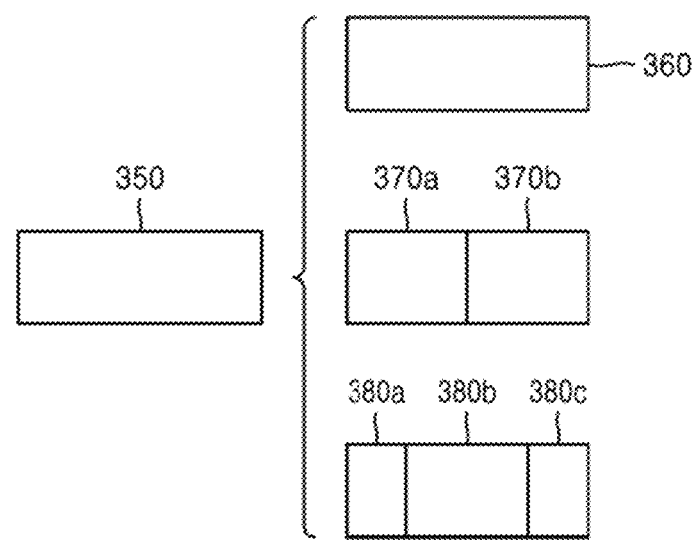

FIG. 12

| BLOCK SHAPE / DEPTH | 0: SQUARE | 1: NS_VER | 2: NS_HOR |
|---|---|---|---|
| DEPTH D | 1200 | 1210 | 1220 |
| DEPTH D+1 | 1202 | 1212 | 1222 |
| DEPTH D+2 | 1204 | 1214 | 1224 |
| ... | ... | ... | ... |

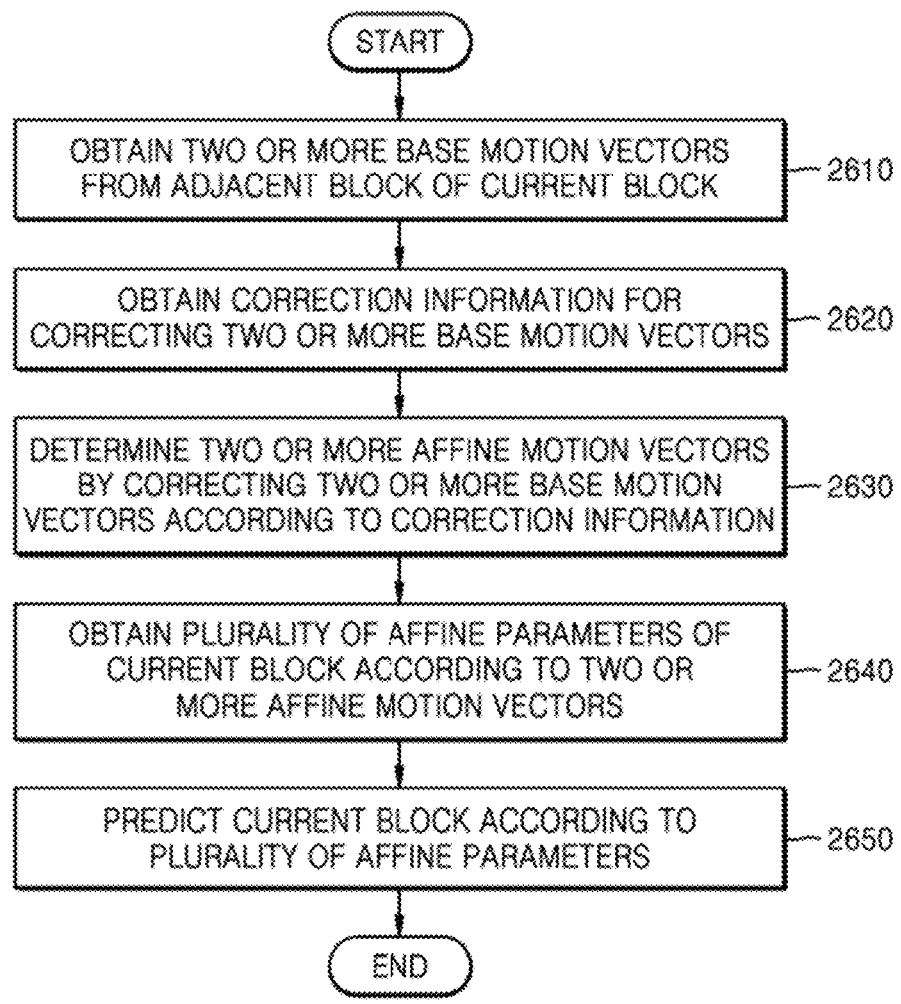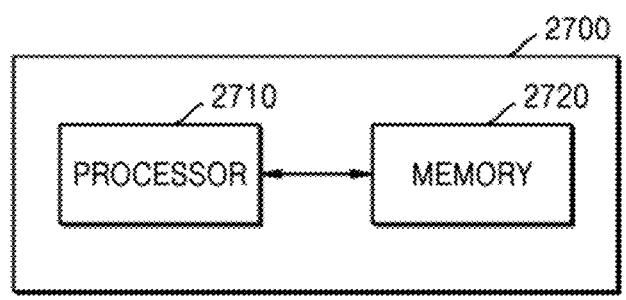

METHOD AND DEVICE FOR VIDEO ENCODING AND VIDEO DECODING MOTION VECTOR INFORMATION

TECHNICAL FIELD

The disclosure relates to a video encoding method and a video decoding method, and more particularly, to methods of efficiently encoding and decoding information about a motion vector.

BACKGROUND ART

A video of high image quality requires a large amount of data for encoding. However, there is a limited bandwidth permitted to transmit video data, and thus, data rates that are applied when transmitting video data may be restricted. Thus, for efficient transmission of video data, methods of encoding and decoding video data are required, whereby deterioration of image quality is minimized, while a compression rate is increased.

Video data may be compressed by removing spatial redundancy and temporal redundancy between pixels. Pixels adjacent to each other generally have common characteristics, and thus, in order to remove redundancy between adjacent pixels, encoding information is transmitted in a data unit including pixels.

Pixel values of the pixels included in the data unit are not directly transmitted, and a method required for obtaining the pixel values is transmitted. A prediction method for predicting a pixel value to be similar as an original value is determined for each data unit, and encoding information with respect to the prediction method is transmitted from an encoder to a decoder. Also, because a prediction value is not entirely the same as an original value, residual data about a difference between the original value and the prediction value is transmitted from the encoder to the decoder.

As prediction becomes more accurate, encoding information required for specifying a prediction method is increased, but a size of residual data is decreased. Thus, the prediction method is determined by taking into account the encoding information and the size of the residual data. In particular, data units split from a picture have various sizes, and as sizes of the data units are increased, it is highly probable that prediction has reduced accuracy, but encoding information is decreased. Thus, a size of a block is determined in correspondence to characteristics of the picture.

Also, prediction methods are divided into intra prediction and inter prediction. Intra prediction is a method of predicting pixels of a block from peripheral pixels of the block. Inter prediction is a method of predicting pixels by referring to pixels of another picture, which are referred to by a picture including a block. Thus, intra prediction removes spatial redundancy and inter prediction removes temporal redundancy.

As the number of prediction methods is increased, the amount of encoding information for indicating the prediction methods is increased. Thus, the encoding information may be reduced likewise by predicting the encoding information applied to a block from another block.

A loss of video data is allowed within a limitation for not allowing recognition by human sight, and thus, the amount of residual data may be reduced by performing lossy compression on the residual data in transform and quantization processes.

DESCRIPTION OF EMBODIMENTS

Technical Problem

Provided are a video encoding method and a video encoding apparatus for performing inter prediction according to an affine mode and an ultimate motion vector expression (UMVE) mode. Also, provided are a video decoding method and a video decoding apparatus for performing inter prediction according to an affine mode and a UMVE mode. Also, provided is a computer-readable recording medium having recorded thereon a program for executing, on a computer, a video encoding method and a video decoding method according to an embodiment of the disclosure.

Solution to Problem

The disclosure provides a video decoding method including: obtaining two or more base motion vectors from an adjacent block of a current block; obtaining correction information for correcting the two or more base motion vectors; determining two or more affine motion vectors by correcting the two or more base motion vectors according to the correction information; obtaining a plurality of affine parameters of the current block according to the two or more affine motion vectors; and predicting the current block according to the plurality of affine parameters.

The disclosure also provides a video decoding apparatus including: a memory storing one or more instructions; and a processor configured to execute the one or more instructions stored in the memory to: obtain two or more base motion vectors from an adjacent block of a current block; obtain correction information for correcting the two or more base motion vectors; determine two or more affine motion vectors by correcting the two or more base motion vectors according to the correction information; obtain a plurality of affine parameters of the current block according to the two or more affine motion vectors; and predict the current block according to the plurality of affine parameters.

The disclosure also provides a video encoding method including: predicting a current block according to a plurality of affine parameters; determining two or more affine motion vectors according to the plurality of affine parameters; determining two or more base motion vectors from an adjacent block of the current block; and determining correction information for correcting the two or more base motion vectors according to the two or more affine motion vectors and the two or more base motion vectors.

The disclosure also provides a video encoding apparatus including: a memory storing one or more instructions; and a processor configured to execute the one or more instructions stored in the memory to: predict a current block according to a plurality of affine parameters; determine two or more affine motion vectors according to the plurality of affine parameters; determine two or more base motion vectors from an adjacent block of the current block; and determine correction information for correcting the two or more base motion vectors according to the two or more affine motion vectors and the two or more base motion vectors.

A computer-recordable recording medium having recorded thereon a program for executing the video encoding method and the video decoding method is provided.

Technical objectives of the embodiment are not limited to those described herein, and other technical aims may be derived from embodiments described hereinafter.

Advantageous Effects of Disclosure

An affine motion vector required for affine prediction according to an ultimate motion vector expression (UMVE) mode may be corrected, and thus, the accuracy of the affine prediction may be improved.

BRIEF DESCRIPTION OF DRAWINGS

FIG. 3 illustrates a process of determining at least one coding unit by splitting a non-square coding unit, according to an embodiment.

FIG. 12 illustrates a process of determining a depth of a coding unit as a shape and size of the coding unit change, when the coding unit is recursively split such that a plurality of coding units are determined, according to an embodiment.

FIG. 26 illustrates a flowchart of a video decoding method, according to which a current block is encoded by correcting a base motion vector determined according to an affine mode, according to a UMVE mode.

FIG. 27 illustrates a block diagram of a video encoding apparatus for encoding a current block by correcting a base motion vector determined according to an affine mode, according to a UMVE mode.

BEST MODE

Figure 1A:
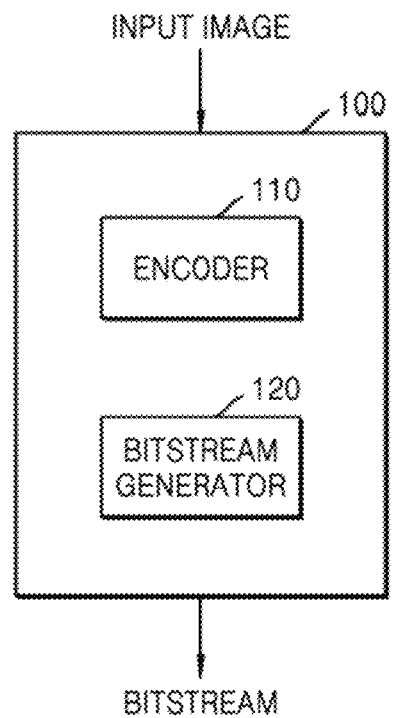
FIG. 1A illustrates a block diagram of an image encoding apparatus based on a coding unit according to a tree structure, according to an embodiment of the disclosure.

The disclosure provides a video decoding method including: obtaining two or more base motion vectors from an adjacent block of a current block; obtaining correction information for correcting the two or more base motion vectors; determining two or more affine motion vectors by correcting the two or more base motion vectors according to the correction information; obtaining a plurality of affine parameters of the current block according to the two or more affine motion vectors; and predicting the current block according to the plurality of affine parameters.

MODE OF DISCLOSURE

The advantages and features of the disclosure and methods of achieving the advantages and features will become more apparent by referring to embodiments to be described below with reference to the accompanying drawings. The disclosure, however, may be embodied in many different forms and should not be construed as being limited to the embodiments set forth herein; rather these embodiments are provided so that this disclosure will be thorough and complete, and will fully convey the concept of the disclosure to one of ordinary skill in the art.

Terms used in this specification will be briefly described and the disclosure will be described in detail.

The terms used in the embodiments are selected from among common terms that are currently widely used, in consideration of their function in the embodiments. However, the terms may become different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the embodiments are not merely designations of the terms, but the terms are defined based on the meaning of the terms and content throughout the embodiments.

As used herein, the singular forms "a," "an" and "the" are intended to include the plural forms as well, unless the context clearly indicates otherwise.

Throughout the specification, it will be further understood that when a part "includes" or "comprises" an element, unless otherwise defined, the part may further include other elements, not excluding the other elements. Also, the term "unit" used in the specification may denote software, or a hardware component, such as FPGA or ASIC, and may perform certain functions. However, the "unit" is not limited to software or hardware. The "unit" may be configured to be included in a storage medium which may perform addressing, or may be configured to reproduce one or more processors. Thus, for example, the "unit" may include software components, object-oriented software components, class components and task components, processors, functions, attributes, procedures, sub-routines, segments of program codes, drivers, firmware, micro codes, circuits, data, databases, data structures, tables, arrays, and variables. Functions provided by the components and the "units" may be integrated into a smaller number of components and the "units," or may further be separated into additional components and the "units."

The "current block" may denote one of a currently encoded or decoded coding unit, a prediction unit, and a transform unit. If, for convenience of explanation, there is a need to divide different types of blocks, such as a prediction unit, a transform unit, and the like, the "current coding block," the "current prediction block," and the "current transform block" may be used. Also, the "lower block" may denote a data unit split from the "current block." Also, the "upper block" may denote a data unit including the "current block."

Hereinafter, a "sample" is data assigned to an image sampling location and may denote data to be processed. For example, pixel values in an image of a spatial domain and transform coefficients on a transform area may be samples. A unit including least one of the samples may be defined as a block.

Hereinafter, embodiments of the disclosure will be described in detail with reference to the accompanying drawings so that one of ordinary skill in the art may easily execute the embodiments. Also, parts not related to the descriptions will be omitted to clearly describe the disclosure.

FIG. 1A illustrates a block diagram of an image encoding apparatus 100 based on a coding unit according to a tree structure, according to an embodiment of the disclosure.

The image encoding apparatus 100 may include an encoder 110 and a bitstream generator 120.

The encoder 110 may split a picture or a slice included in the picture into a plurality of largest coding units according to a size of the largest coding unit. The largest coding unit may correspond to a data unit having a square shape, a horizontal size and a vertical size of which correspond to squares of 2, for example, a data unit having a size of 32×32, 64×64, 128×128, or 256×256. The encoder 110 may provide largest coding unit size information indicating a size of a largest coding unit to the bitstream generator 120. Also, the bitstream generator 120 may include the largest coding unit size information in a bitstream.

The encoder 110 may determine a coding unit by splitting the largest coding unit. Whether or not to split the coding unit may be determined based on whether or not splitting of the coding unit is efficient with respect to rate-distortion optimization. Also, splitting information indicating whether or not the coding unit is split may be generated. The splitting information may be expressed in the form of a flag.

The coding unit may be split in various ways. For example, a square coding unit may be split into four square coding units each having a half width and a half height of the square coding unit. The square coding unit may be split into two rectangular coding units each having a half width of the square coding unit. The square coding unit may be split into two rectangular coding units each having a half height of the square coding unit. The square coding unit may be split into three coding units by splitting the width or the height into 1:2:1.

A rectangular coding unit having a width that is twice a height may be split into two square coding units. The rectangular coding unit having the width that is twice the height may be split into two rectangular coding units each having a width that is four times a height. The rectangular coding unit having the width that is twice the height may be split into two rectangular coding units and one square coding unit by splitting the width into 1:2:1.

Likewise, a rectangular coding unit having a height that is twice a width may be split into two square coding units. Also, the rectangular coding unit having a height that is twice the width may be split into two rectangular coding units each having a height that is four times a width. Likewise, the rectangular coding unit having a height that is twice the width may be split into two rectangular coding units and one square coding unit by splitting the height into 1:2:1.

When two or more splitting methods may be used by the image encoding apparatus 100, information about a splitting method to be used for a coding unit, from the two or more splitting methods which may be used by the image encoding apparatus 100, may be determined for each picture. Thus, only one or more preset splitting methods may be determined to be used for each pixel. When the image encoding apparatus 100 uses only one splitting method, the information about the splitting method to be used for the coding unit may not be additionally determined.

A coding unit having a specific size may be split by using specific splitting methods. For example, when a size of the coding unit is 256×256, the coding unit may be set to be split into only four square coding units each having a half width and a half height of the coding unit.

When the splitting information of the coding unit indicates that the coding unit is to be split, split shape information indicating a method of splitting the coding unit may be generated. When there is only one splitting method to be used in a picture in which the coding unit is included, the split shape information may not be generated. When the splitting method is adaptively determined with respect to coding information peripheral to the coding unit, the split shape information may not be generated.

As described above, image data of a current picture may be split into the largest coding units, according to a largest size of the coding unit. Also, the largest coding unit may include coding units hierarchically split from the largest coding unit. A shape and location of a lower coding unit may be determined according to a split shape of an upper coding unit. Also, a smallest size of the coding unit to restrict the splitting of the coding unit may be preset.

The encoder 110 may compare a coding efficiency when the coding unit is hierarchically split with a coding efficiency when the coding unit is not split. Also, the encoder 110 may determine whether or not to split the coding unit according to a result of the comparison. When it is determined that it is more efficient to split the coding unit, the encoder 110 may hierarchically split the coding unit. When it is determined that it is more efficient not to split the coding unit, the encoder 110 may not split the coding unit. Whether or not to split the coding unit may be determined regardless of whether or not to split another coding unit which is adjacent to the coding unit.

The coding unit ultimately split may be predicted by intra prediction or inter prediction. Intra prediction may be a method of predicting samples of a prediction unit by using reference samples around the prediction unit. Inter prediction may be a method of predicting samples of a prediction unit by obtaining reference samples from a reference picture to which a current picture refers.

With respect to intra prediction, the encoder 110 may apply a plurality of intra prediction methods to the prediction unit to select a most efficient intra prediction method. The intra prediction methods may include a direct current (DC) mode, a planar mode, and a directional mode, such as a vertical mode or a horizontal mode.

When a reconstruction sample around the coding unit is used as the reference sample, intra prediction may be performed for each prediction unit. However, when a reconstruction sample in the coding unit is used as the reference sample, reconstruction of the reference sample in the coding unit may have to precede the prediction, and thus, a prediction order of the prediction unit may be subordinate to a transform order of a transform unit. Thus, when the reconstruction sample in the coding unit is used as the reference sample, only the intra prediction method with respect to transform units corresponding to the prediction unit may be determined with respect to the prediction unit and actual intra prediction may be performed for each transform unit.

The encoder 110 may determine an optimal motion vector and an optimal reference picture to select a most efficient inter prediction method. For inter prediction, a coding unit determiner 120 may determine a plurality of motion vector candidates from coding units spatially or temporally adjacent to a current coding unit and determine a most efficient motion vector from among the determined plurality of motion vector candidates, as a motion vector. Likewise, a plurality of reference picture candidates may be determined from coding units spatially or temporally adjacent to the current coding unit, and a most efficient reference picture may be determined from the determined plurality of reference picture candidates. According to an embodiment, the reference picture may be determined from reference picture lists previously determined with respect to a current picture. According to an embodiment, for accuracy of prediction, a most efficient motion vector from among a plurality of motion vector candidates may be determined as a prediction motion vector, and the prediction motion vector may be corrected to determine a motion vector. Inter prediction may be performed in a parallel fashion for each prediction unit in the coding unit.

The encoder 110 may reconstruct the coding unit by obtaining only information indicating the motion vector and the reference picture according to a skip mode. According to the skip mode, except for the information indicating the motion vector and the reference picture, all coding information including a residual signal may be omitted. Because the residual signal is omitted, the skip mode may be used for highly accurate prediction.

A partition mode to be used may be restricted according to a prediction method with respect to the prediction unit. For example, for intra prediction, only a partition mode with respect to a prediction unit having sizes of 2N×2N and N×N may be applied. However, for inter prediction, a partition mode with respect to a prediction unit having sizes of 2N×2N, 2N×N, N×2N, and N×N may be applied. Also, only a partition mode with respect to a prediction unit having a size of 2N×2N may be applied to the skip mode of inter prediction. The partition mode enabled for each prediction method in the image encoding apparatus 100 may be changed according to a coding efficiency.

The image encoding apparatus 100 may perform a transform operation based on a coding unit. The image encoding apparatus 100 may transform residual data, which is a difference value between an original value and a prediction value of pixels included in the coding unit, through a preset process. For example, the image encoding apparatus 100 may perform lossy compression on the residual data through quantization and DCT/DST transform. Alternatively, the image encoding apparatus 100 may perform nonlossy compression on the residual data without quantization.

As a result, the encoder 110 may determine a most efficient prediction method for a current coding unit from among the plurality of intra and inter prediction methods. Also, the encoder 110 may determine the prediction method of the current coding unit according to coding efficiencies based on prediction results. Likewise, the encoder 110 may determine a transform method according to coding efficiencies based on transform results. According to the most efficient prediction and transform methods of the coding unit that are determined, the coding efficiency of the coding unit may be ultimately determined. The encoder 110 may confirm a hierarchical structure of the largest coding unit according to the coding efficiency of the coding unit that is ultimately split.

The encoder 110 may measure the coding efficiency of the coding unit, the prediction efficiency of the prediction methods, etc. by using Lagrangian multiplier-based rate-distortion optimization.

The encoder 110 may generate splitting information indicating whether or not to split the coding unit, according to the determined hierarchical structure of the largest coding unit. Also, the encoder 110 may generate partition mode information for determining a prediction unit and transform unit splitting information for determining a transform unit with respect to a coding unit that is completely split. Also, when there are two or more splitting methods of the coding unit, the encoder 110 may generate split shape information indicating a splitting method, together with the splitting information. Also, the encoder 110 may generate information about a prediction method and a transform method used for a prediction unit and a transform unit.

The bitstream generator 120 may output the information that the encoder 110 generates according to the hierarchical structure of the largest coding unit, in the form of a bitstream.

Methods of determining the coding unit, the prediction unit, and the transform unit according to the tree structure of the largest coding unit according to an embodiment will be described in detail below with reference to FIGS. 3 through 12.

Figure 1B:
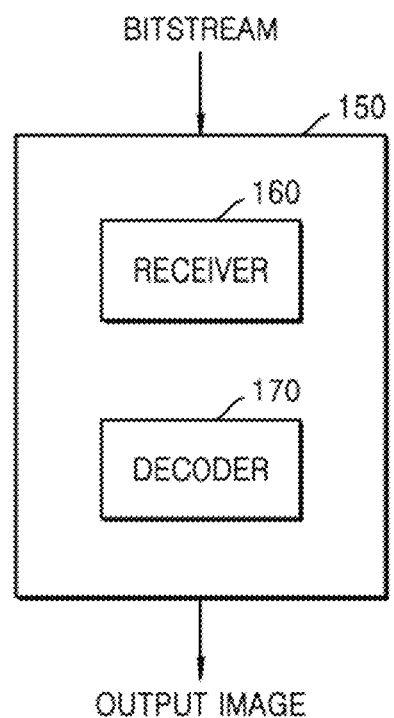
FIG. 1B illustrates a block diagram of an image decoding apparatus based on a coding unit according to a tree structure, according to an embodiment.

FIG. 1B illustrates a block diagram of an image decoding apparatus 150 based on a coding unit according to a tree structure, according to an embodiment.

The image decoding apparatus 150 may include a receiver 160 and a decoder 170.

The definitions of a plurality of terms, such as a coding unit, a prediction unit, a transform unit, and various splitting information, related to a decoding operation of the image decoding apparatus 150 according to an embodiment, are the same as described above about the image encoding apparatus 100 with reference to FIG. 1. Also, because the purpose of the image decoding apparatus 150 is reconstruction of image data, various encoding methods used in the image encoding apparatus 100 may be applied to the image decoding apparatus 150.

The receiver 160 may receive and parse a bitstream with respect to an encoded video. The decoder 170 may extract, from the parsed bitstream, pieces of information required for the decoding of each of largest coding units and provide the extracted pieces of information to the decoder 170. The decoder 170 may extract information about a largest size of a coding unit of a current picture from a header, a set of sequence parameters, or a set of picture parameters, with respect to the current picture.

Also, the decoder 170 may extract, from the parsed bitstream, splitting information about coding units according to a tree structure, for each largest coding unit. The extracted splitting information may be output by the decoder 170. The decoder 170 may determine a tree structure of the largest coding unit by splitting the largest coding unit according to the extracted splitting information.

The splitting information extracted by the decoder 170 may correspond to splitting information with respect to a tree structure that is determined to generate a least coding error by the image encoding apparatus 100. Thus, the image decoding apparatus 150 may decode data and reconstruct an image according to a decoding method generating the least coding error.

The decoder 170 may extract splitting information with respect to a data unit, such as a prediction unit and a transform unit included in the coding unit. For example, the decoder 170 may extract information about a most efficient partition mode with respect to the prediction unit. Also, the decoder 170 may extract transform splitting information with respect to a most efficient tree structure with respect to the transform unit.

Also, the decoder 170 may obtain information about a most efficient prediction method with respect to the prediction units split from the coding unit. Also, the decoder 170 may obtain information about a most efficient transform method with respect to the transform units split from the coding unit.

The decoder 170 may extract the information from a bitstream, according to a method performed by the bitstream generator 120 of the image encoding apparatus 100 to construct the bitstream.

The decoder 170 may split the largest coding unit into coding units having the most efficient tree structure based on the splitting information. Also, the decoder 170 may split the coding unit into the prediction units according to the information about the partition mode. The decoder 170 may split the coding unit into the transform units according to the transform splitting information.

The decoder 170 may predict the prediction unit according to the information about the prediction method. Also, the decoder 170 may de-quantize and inverse-transform residual data, which corresponds to a difference between an original value and a prediction value of a pixel, according to the information about a transform method of the transform unit. Also, the decoder 170 may reconstruct the pixels of the coding unit, according to a prediction result of the prediction unit and a transform result of the transform unit.

Figure 2:
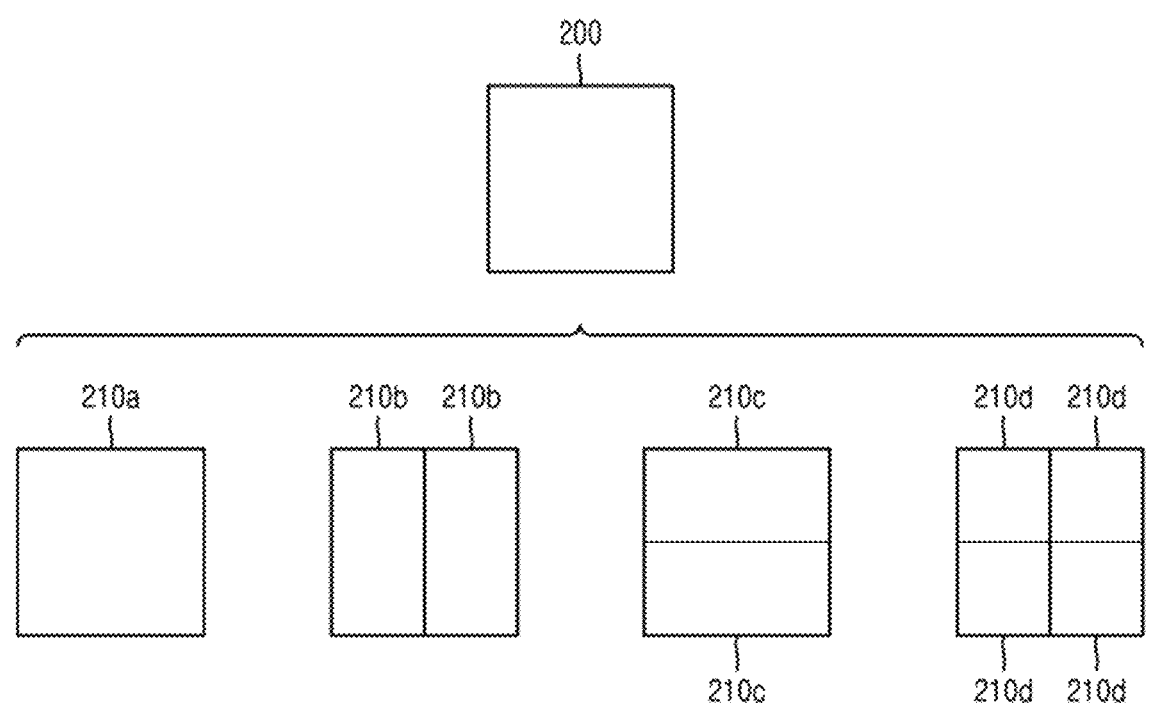
FIG. 2 illustrates a process of determining at least one coding unit by splitting a current coding unit, according to an embodiment.

FIG. 2 illustrates a process, performed by the image decoding apparatus 150, of determining at least one coding unit by splitting a current coding unit, according to an embodiment.

According to an embodiment, the image decoding apparatus 150 may determine a shape of a coding unit by using block shape information, and may determine a splitting method of the coding unit by using split shape information. That is, a coding unit splitting method indicated by the split shape information may be determined based on a block shape indicated by the block shape information used by the image decoding apparatus 150.

According to an embodiment, the image decoding apparatus 150 may use the block shape information indicating that the current coding unit has a square shape. For example, the image decoding apparatus 150 may determine whether or not to split a square coding unit, whether to vertically split the square coding unit, whether to horizontally split the square coding unit, or whether to split the square coding unit into four coding units, based on the split shape information. Referring to FIG. 2, when the block shape information of a current coding unit 200 indicates a square shape, a decoder 180 may determine that a coding unit 210*a* having the same size as the current coding unit 200 is not split, based on the split shape information indicating not to perform splitting, or may determine coding units 210*b*, 210*c*, or 210*d* split based on the split shape information indicating a preset splitting method.

Referring to FIG. 2, according to an embodiment, the image decoding apparatus 150 may determine two coding units 210*b* obtained by splitting the current coding unit 200 in a vertical direction, based on the split shape information indicating to perform splitting in a vertical direction. The image decoding apparatus 150 may determine two coding units 210*c* obtained by splitting the current coding unit 200 in a horizontal direction, based on the split shape information indicating to perform splitting in a horizontal direction. The image decoding apparatus 150 may determine four coding units 210*d* obtained by splitting the current coding unit 200 in vertical and horizontal directions, based on the split shape information indicating to perform splitting in vertical and horizontal directions. However, splitting methods of the square coding unit are not limited to the above-described methods, and the split shape information may indicate various methods. Preset splitting methods of splitting the square coding unit will be described in detail below in relation to various embodiments.

FIG. 3 illustrates a process, performed by the image decoding apparatus 150, of determining at least one coding unit by splitting a non-square coding unit, according to an embodiment.

According to an embodiment, the image decoding apparatus 150 may use block shape information indicating that a current coding unit has a non-square shape. The image decoding apparatus 150 may determine whether not to split the non-square current coding unit or whether to split the non-square current coding unit by using a preset splitting method, based on split shape information. Referring to FIG. 3, when the block shape information of a current coding unit 300 or 350 indicates a non-square shape, the image decoding apparatus 150 may determine that a coding unit 310 or 360 having the same size as the current coding unit 300 or 350 is not split, based on the split shape information indicating not to perform splitting, or determine coding units 320*a* and 320*b*, 330*a* to 330*c*, 370*a* and 370*b*, or 380*a* to 380*c* split based on the split shape information indicating a preset splitting method. Preset splitting methods of splitting a non-square coding unit will be described in detail below in relation to various embodiments.

According to an embodiment, the image decoding apparatus 150 may determine a splitting method of a coding unit by using the split shape information and, in this case, the split shape information may indicate the number of one or more coding units generated by splitting a coding unit. Referring to FIG. 3, when the split shape information indicates to split the current coding unit 300 or 350 into two coding units, the image decoding apparatus 150 may determine two coding units 320*a* and 320*b*, or 370*a* and 370*b* included in the current coding unit 300 or 350, by splitting the current coding unit 300 or 350 based on the split shape information.

According to an embodiment, when the image decoding apparatus 150 splits the non-square current coding unit 300 or 350 based on the split shape information, the location of a long side of the non-square current coding unit 300 or 350 may be considered. For example, the image decoding apparatus 150 may determine a plurality of coding units by dividing a long side of the current coding unit 300 or 350, considering the shape of the current coding unit 300 or 350.

According to an embodiment, when the split shape information indicates to split a coding unit into an odd number of blocks, the image decoding apparatus 150 may determine an odd number of coding units included in the current coding unit 300 or 350. For example, when the split shape information indicates to split the current coding unit 300 or 350 into three coding units, the image decoding apparatus 150 may split the current coding unit 300 or 350 into three coding units 330*a*, 330*b*, and 330*c*, or 380*a*, 380*b*, and 380*c*. According to an embodiment, the image decoding apparatus 150 may determine an odd number of coding units included in the current coding unit 300 or 350, and not all the determined coding units may have the same size. For example, a preset coding unit 330*b* or 380*b* from among the determined odd number of coding units 330*a*, 330*b*, and 330*c*, or 380*a*, 380*b*, and 380*c* may have a size different from the size of the other coding units 330*a* and 330*c*, or 380*a* and 380*c*. That is, coding units which may be determined by splitting the current coding unit 300 or 350 may have multiple sizes.

According to an embodiment, when the split shape information indicates to split a coding unit into an odd number of blocks, the image decoding apparatus 150 may determine an odd number of coding units included in the current coding unit 300 or 350, and may put a preset restriction on at least one coding unit from among the odd number of coding units generated by splitting the current coding unit 300 or 350. Referring to FIG. 3, the image decoding apparatus 150 may allow a decoding method of the coding unit 330*b* or 380*b* to be different from that of the other coding units 330*a* and 330*c*, or 380*a* and 380*c*, wherein the coding unit 330*b* or 380*b* is at a center location from among the three coding units 330*a*, 330*b*, and 330*c*, or 380*a*, 380*b*, and 380*c* generated by splitting the current coding unit 300 or 350. For example, the image decoding apparatus 150 may restrict the coding unit 330*b* or 380*b* at the center location to be no longer split or to be split only a preset number of times, unlike the other coding units 330*a* and 330*c*, or 380*a* and 380*c*.

Figure 4:
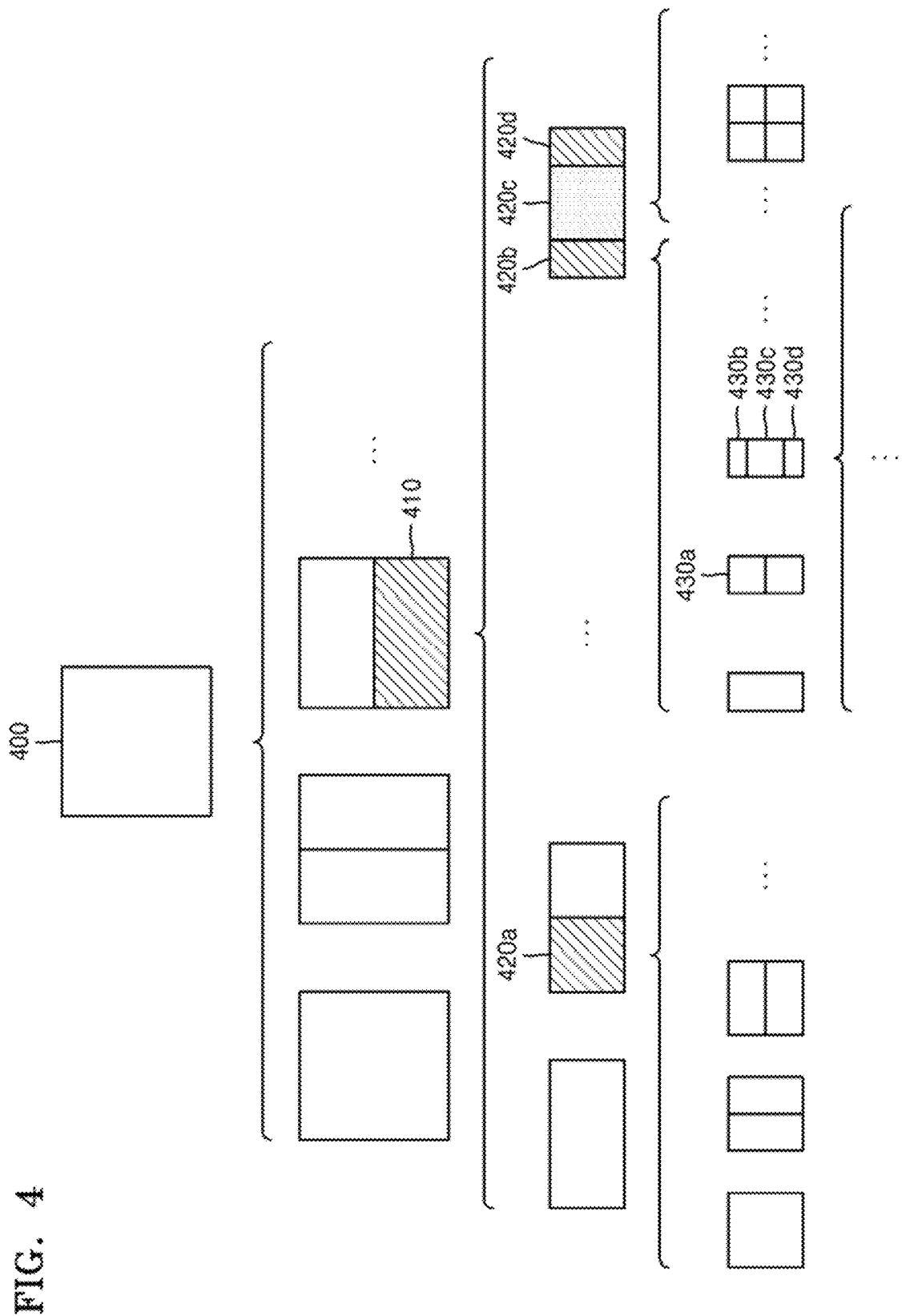
FIG. 4 illustrates a process of splitting a coding unit based on at least one of block shape information and split shape information, according to an embodiment.

FIG. 4 illustrates a process, performed by the image decoding apparatus 150, of splitting a coding unit based on at least one of block shape information and split shape information, according to an embodiment.

According to an embodiment, the image decoding apparatus 150 may determine to split or not to split a square first coding unit 400 into coding units, based on at least one of the block shape information and the split shape information. According to an embodiment, when the split shape information indicates to split the first coding unit 400 in a horizontal direction, the image decoding apparatus 150 may determine a second coding unit 410 by splitting the first coding unit 400 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 150 may determine to split or not to split the determined second coding unit 410 into coding units, based on at least one of the block shape information and the split shape information. Referring to FIG. 4, the image decoding apparatus 150 may split the non-square second coding unit 410, which is determined by splitting the first coding unit 400, into one or more third coding units 420*a*, or 420*b*, 420*c*, and 420*d* based on at least one of the block shape information and the split shape information, or may not split the non-square second coding unit 410. The image decoding apparatus 150 may obtain at least one of the block shape information and the split shape information, and determine a plurality of various-shaped second coding units (e.g., 410) by splitting the first coding unit 400, based on the obtained at least one of the block shape information and the split shape information, and the second coding unit 410 may be split by using the splitting method of the first coding unit 400, based on at least one of the block shape information and the split shape information. According to an embodiment, when the first coding unit 400 is split into the second coding units 410 based on at least one of the block shape information and the split shape information of the first coding unit 400, the second coding unit 410 may also be split into the third coding units 420*a*, or 420*b*, 420*c*, and 420*d* based on at least one of the block shape information and the split shape information of the second coding unit 410. That is, a coding unit may be recursively split based on at least one of the block shape information and the split shape information of each coding unit. A method that may be used to recursively split a coding unit will be described below in relation to various embodiments.

According to an embodiment, the image decoding apparatus 150 may determine to split each of the third coding units 420*a*, or 420*b*, 420*c*, and 420*d* into coding units or not to split the second coding unit 410, based on at least one of the block shape information and the split shape information. According to an embodiment, the image decoding apparatus 150 may split the non-square second coding unit 410 into the odd number of third coding units 420b, 420c, and 420d. The image decoding apparatus 150 may put a preset restriction on a preset third coding unit from among the odd number of third coding units 420b, 420c, and 420d. For example, the image decoding apparatus 150 may restrict the third coding unit 420c at a center location from among the odd number of third coding units 420b, 420c, and 420d to be no longer split or to be split a settable number of times. Referring to FIG. 4, the image decoding apparatus 150 may restrict the third coding unit 420c, which is at the center location from among the odd number of third coding units 420b, 420c, and 420d included in the non-square second coding unit 410, to be no longer split, to be split by using a preset splitting method (e.g., split into only four coding units or split by using a splitting method of the second coding unit 410), or to be split only a preset number of times (e.g., split only n times (where n>0)). However, the restrictions on the third coding unit 420c at the center location are not limited to the above-described examples, and it should be interpreted that the restrictions may include various restrictions for decoding the third coding unit 420c at the center location differently from the other third coding units 420b and 420d.

According to an embodiment, the image decoding apparatus 150 may obtain at least one of the block shape information and the split shape information, which is used to split a current coding unit, from a preset location in the current coding unit.

According to an embodiment, when the current coding unit is split into a preset number of coding units, the image decoding apparatus 150 may select one of the coding units. Various methods may be used to select one of a plurality of coding units, as will be described below in relation to various embodiments.

According to an embodiment, the image decoding apparatus 150 may split the current coding unit into a plurality of coding units, and may determine a coding unit at a preset location.

Figure 5:
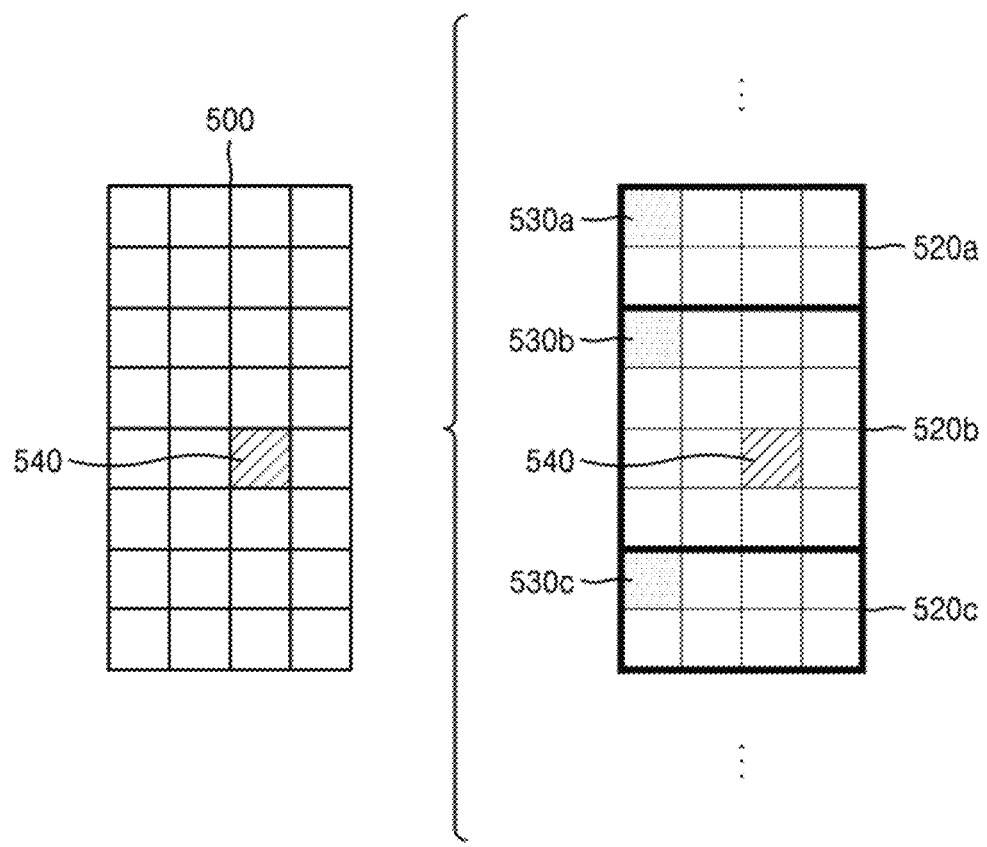
FIG. 5 illustrates a method of determining a preset coding unit from among an odd number of coding units, according to an embodiment.

FIG. 5 illustrates a method, performed by the image decoding apparatus 150, of determining a coding unit of a preset location from among an odd number of coding units, according to an embodiment.

According to an embodiment, the image decoding apparatus 150 may use information indicating locations of the odd number of coding units, to determine a coding unit at a center location from among the odd number of coding units.

Referring to FIG. 5, the image decoding apparatus 150 may determine an odd number of coding units 520a, 520b, and 520c by splitting the current coding unit 500. The image decoding apparatus 150 may determine a coding unit 520b at a center location by using information about locations of the odd number of coding units 520a to 520c. For example, the image decoding apparatus 150 may determine the coding unit 520b of the center location by determining the locations of the coding units 520a, 520b, and 520c based on information indicating locations of preset samples included in the coding units 520a, 520b, and 520c. In detail, the image decoding apparatus 150 may determine the coding unit 520b at the center location by determining the locations of the coding units 520a, 520b, and 520c based on information indicating locations of top left samples 530a, 530b, and 530c of the coding units 520a, 520b, and 520c.

According to an embodiment, the information indicating the locations of the top left samples 530a, 530b, and 530c, which are included in the coding units 520a, 520b, and 520c, respectively, may include information about locations or coordinates of the coding units 520a, 520b, and 520c in a picture. According to an embodiment, the information indicating the locations of the top left samples 530a, 530b, and 530c, which are included in the coding units 520a, 520b, and 520c, respectively, may include information indicating widths or heights of the coding units 520a, 520b, and 520c included in the current coding unit 500, and the widths or heights may correspond to information indicating differences between the coordinates of the coding units 520a, 520b, and 520c in the picture. That is, the image decoding apparatus 150 may determine the coding unit 520b at the center location by directly using the information about the locations or coordinates of the coding units 520a, 520b, and 520c in the picture, or by using the information about the widths or heights of the coding units, which correspond to the difference values between the coordinates.

According to an embodiment, information indicating the location of the top left sample 530a of the upper coding unit 520a may include coordinates (xa, ya), information indicating the location of the top left sample 530b of the middle coding unit 520b may include coordinates (xb, yb), and information indicating the location of the top left sample 530c of the lower coding unit 520c may include coordinates (xc, yc). The image decoding apparatus 150 may determine the middle coding unit 520b by using the coordinates of the top left samples 530a, 530b, and 530c which are included in the coding units 520a, 520b, and 520c, respectively. For example, when the coordinates of the top left samples 530a, 530b, and 530c are sorted in an ascending or descending order, the coding unit 520b including the coordinates (xb, yb) of the sample 530b at a center location may be determined as a coding unit at a center location from among the coding units 520a, 520b, and 520c determined by splitting the current coding unit 500. However, the coordinates indicating the locations of the top left samples 530a, 530b, and 530c may include coordinates indicating absolute locations in the picture, or may use coordinates (dxb, dyb) indicating a relative location of the top left sample 530b of the middle coding unit 520b and coordinates (dxc, dyc) indicating a relative location of the top left sample 530c of the lower coding unit 520c with reference to the location of the top left sample 530a of the upper coding unit 520a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 150 may split the current coding unit 500 into a plurality of coding units 520a, 520b, and 520c, and may select one of the coding units 520a, 520b, and 520c based on a preset criterion. For example, the image decoding apparatus 150 may select the coding unit 520b, which has a size different from that of the others, from among the coding units 520a, 520b, and 520c.

According to an embodiment, the image decoding apparatus 150 may determine the widths or heights of the coding units 520a, 520b, and 520c by using the coordinates (xa, ya) indicating the location of the top left sample 530a of the upper coding unit 520a, the coordinates (xb, yb) indicating the location of the top left sample 530b of the middle coding unit 520b, and the coordinates (xc, yc) indicating the location of the top left sample 530c of the lower coding unit 520c. The image decoding apparatus 150 may determine the respective sizes of the coding units 520a, 520b, and 520c by using the coordinates (xa, ya), (xb, yb), and (xc, yc) indicating the locations of the coding units 520a, 520b, and 520c.

According to an embodiment, the image decoding apparatus 150 may determine the width of the upper coding unit 520a to be xb-xa and determine the height thereof to be yb-ya. According to an embodiment, the image decoding apparatus 150 may determine the width of the middle coding unit 520b to be xc-xb and determine the height thereof to be yc-yb. According to an embodiment, the image decoding apparatus 150 may determine the width or height of the lower coding unit 520c by using the width or height of the current coding unit 500 or the widths or heights of the upper and middle coding units 520a and 520b. The image decoding apparatus 150 may determine a coding unit, which has a size different from that of the others, based on the determined widths and heights of the coding units 520a to 520c. Referring to FIG. 5, the image decoding apparatus 150 may determine the middle coding unit 520b, which has a size different from the size of the upper and lower coding units 520a and 520c, as the coding unit of the preset location. However, the above-described method, performed by the image decoding apparatus 150, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described top left locations, and information about arbitrary locations of samples included in the coding units may be used.

According to an embodiment, the image decoding apparatus 150 may select a coding unit at a preset location from among an odd number of coding units determined by splitting the current coding unit, considering the shape of the current coding unit. For example, when the current coding unit has a non-square shape, a width of which is longer than a height, the image decoding apparatus 150 may determine the coding unit at the preset location in a horizontal direction. That is, the image decoding apparatus 150 may determine one of coding units at different locations in a horizontal direction and put a restriction on the coding unit. When the current coding unit has a non-square shape, a height of which is longer than a width, the image decoding apparatus 150 may determine the coding unit at the preset location in a vertical direction. That is, the image decoding apparatus 150 may determine one of coding units at different locations in a vertical direction and may put a restriction on the coding unit.

According to an embodiment, the image decoding apparatus 150 may use information indicating respective locations of an even number of coding units, to determine the coding unit at the preset location from among the even number of coding units. The image decoding apparatus 150 may determine an even number of coding units by splitting the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 5, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 150 may use at least one of block shape information and split shape information, which is stored in a sample included in a coding unit at a center location, in a splitting operation to determine the coding unit at the center location from among the plurality of coding units determined by splitting the current coding unit.

Referring to FIG. 5, the image decoding apparatus 150 may split the current coding unit 500 into a plurality of coding units 520a, 520b, and 520c based on at least one of the block shape information and the split shape information, and may determine a coding unit 520b at a center location from among the plurality of the coding units 520a, 520b, and 520c. Furthermore, the image decoding apparatus 150 may determine the coding unit 520b at the center location, considering a location from which at least one of the block shape information and the split shape information is obtained. That is, at least one of the block shape information and the split shape information of the current coding unit 500 may be obtained from the sample 540 at a center location of the current coding unit 500 and, when the current coding unit 500 is split into the plurality of coding units 520a, 520b, and 520c based on at least one of the block shape information and the split shape information, the coding unit 520b including the sample 540 may be determined as the coding unit at the center location. However, information used to determine the coding unit at the center location is not limited to at least one of the block shape information and the split shape information, and various types of information may be used to determine the coding unit at the center location.

According to an embodiment, preset information for identifying the coding unit at the preset location may be obtained from a preset sample included in a coding unit to be determined. Referring to FIG. 5, the image decoding apparatus 150 may use at least one of the block shape information and the split shape information, which is obtained from a sample at a preset location in the current coding unit 500 (e.g., a sample at a center location of the current coding unit 500) to determine a coding unit at a preset location from among the plurality of the coding units 520a, 520b, and 520c determined by splitting the current coding unit 500 (e.g., a coding unit at a center location from among a plurality of split coding units). That is, the image decoding apparatus 150 may determine the sample at the preset location by considering a block shape of the current coding unit 500, determine the coding unit 520b including a sample, from which preset information (e.g., at least one of the block shape information and the split shape information) may be obtained, from among the plurality of coding units 520a, 520b, and 520c determined by splitting the current coding unit 500, and may put a preset restriction on the coding unit 520b. Referring to FIG. 5, according to an embodiment, the image decoding apparatus 150 may determine the sample 540 at the center location of the current coding unit 500 as the sample from which the preset information may be obtained, and may put a preset restriction on the coding unit 520b including the sample 540, in a decoding operation. However, the location of the sample from which the preset information may be obtained is not limited to the above-described location, and may include arbitrary locations of samples included in the coding unit 520b to be determined for a restriction.

According to an embodiment, the location of the sample from which the preset information may be obtained may be determined based on the shape of the current coding unit 500. According to an embodiment, the block shape information may indicate whether the current coding unit has a square or non-square shape, and the location of the sample from which the preset information may be obtained may be determined based on the shape. For example, the image decoding apparatus 150 may determine a sample located on a boundary for dividing at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 150 may determine one of samples adjacent to a boundary for dividing a long side of the current coding unit in half, as the sample from which the preset information may be obtained.

According to an embodiment, when the current coding unit is split into a plurality of coding units, the image decoding apparatus 150 may use at least one of the block shape information and the split shape information to determine a coding unit at a preset location from among the plurality of coding units. According to an embodiment, the image decoding apparatus 150 may obtain at least one of the block shape information and the split shape information from a sample at a preset location in a coding unit, and split the plurality of coding units, which are generated by splitting the current coding unit, by using at least one of the split shape information and the block shape information, which is obtained from the sample of the preset location in each of the plurality of coding units. That is, a coding unit may be recursively split based on at least one of the block shape information and the split shape information, which is obtained from the sample at the preset location in each coding unit. An operation of recursively splitting a coding unit has been described above in relation to FIG. 4, and thus detailed descriptions thereof will not be provided here.

According to an embodiment, the image decoding apparatus 150 may determine one or more coding units by splitting the current coding unit, and may determine an order of decoding the one or more coding units, based on a preset block (e.g., the current coding unit).

Figure 6:
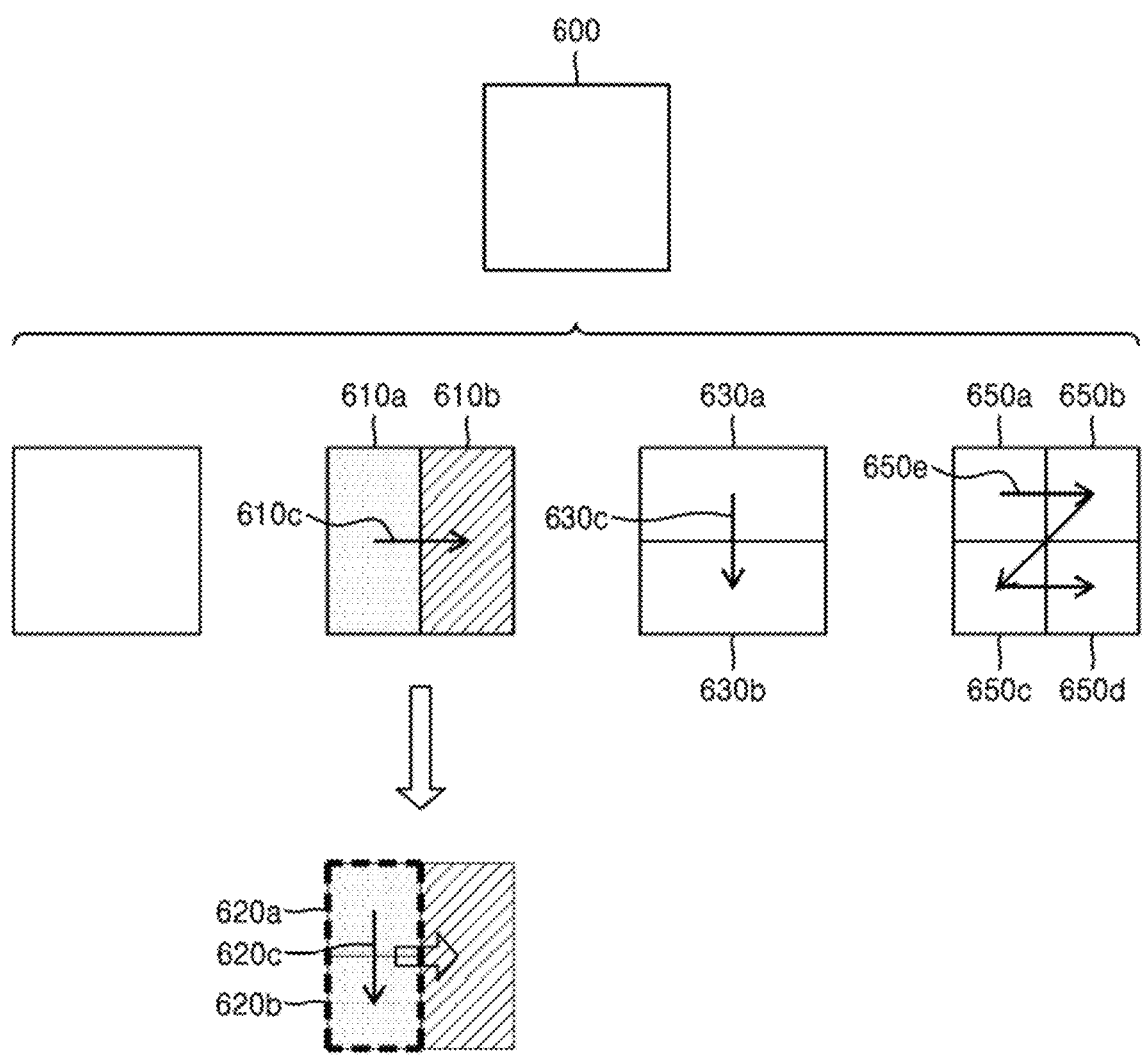
FIG. 6 illustrates an order of processing a plurality of coding units when the plurality of coding units are determined by splitting a current coding unit, according to an embodiment.

FIG. 6 illustrates an order of processing a plurality of coding units when the image decoding apparatus 150 determines the plurality of coding units by splitting a current coding unit, according to an embodiment.

According to an embodiment, the image decoding apparatus 150 may determine second coding units 610a and 610b by splitting a first coding unit 600 in a vertical direction, determine second coding units 630a and 630b by splitting the first coding unit 600 in a horizontal direction, or determine second coding units 650a to 650d by splitting the first coding unit 600 in vertical and horizontal directions, based on block shape information and split shape information.

Referring to FIG. 6, the image decoding apparatus 150 may determine to process the second coding units 610a and 610b, which are determined by splitting the first coding unit 600 in a vertical direction, in a horizontal direction order 610c. The image decoding apparatus 150 may determine to process the second coding units 630a and 630b, which are determined by splitting the first coding unit 600 in a horizontal direction, in a vertical direction order 630c. The image decoding apparatus 150 may determine the second coding units 650a to 650d, which are determined by splitting the first coding unit 600 in vertical and horizontal directions, according to a preset order (e.g., a raster scan order or Z-scan order 650e) by which coding units in a row are processed and then coding units in a next row are processed.

According to an embodiment, the image decoding apparatus 150 may recursively split coding units. Referring to FIG. 6, the image decoding apparatus 150 may determine a plurality of coding units 610a, 610b, 630a, 630b, 650a, 650b, 650c, and 650d by splitting the first coding unit 600, and may recursively split each of the determined plurality of coding units 610a, 610b, 630a, 630b, 650a, 650b, 650c, and 650d. A splitting method of the plurality of coding units 610a, 610b, 630a, 630b, 650a, 650b, 650c, and 650d may correspond to a splitting method of the first coding unit 600. As such, each of the plurality of coding units 610a, 610b, 630a, 630b, 650a, 650b, 650c, and 650d may be independently split into a plurality of coding units. Referring to FIG. 6, the image decoding apparatus 150 may determine the second coding units 610a and 610b by splitting the first coding unit 600 in a vertical direction, and may determine to independently split or not to split each of the second coding units 610a and 610b.

According to an embodiment, the image decoding apparatus 150 may determine third coding units 620a and 620b by splitting the left second coding unit 610a in a horizontal direction, and may not split the right second coding unit 610b.

According to an embodiment, a processing order of coding units may be determined based on an operation of splitting a coding unit. In other words, a processing order of split coding units may be determined based on a processing order of coding units immediately before being split. The image decoding apparatus 150 may determine a processing order of the third coding units 620a and 620b determined by splitting the left second coding unit 610a, independently of the right second coding unit 610b. Because the third coding units 620a and 620b are determined by splitting the left second coding unit 610a in a horizontal direction, the third coding units 620a and 620b may be processed in a vertical direction order 620c. Because the left and right second coding units 610a and 610b are processed in the horizontal direction order 610c, the right second coding unit 610b may be processed after the third coding units 620a and 620b included in the left second coding unit 610a are processed in the vertical direction order 620c. An operation of determining a processing order of coding units based on a coding unit before being split is not limited to the above-described example, and various methods may be used to independently process coding units, which are split and determined to be various shapes, in a preset order.

Figure 7:
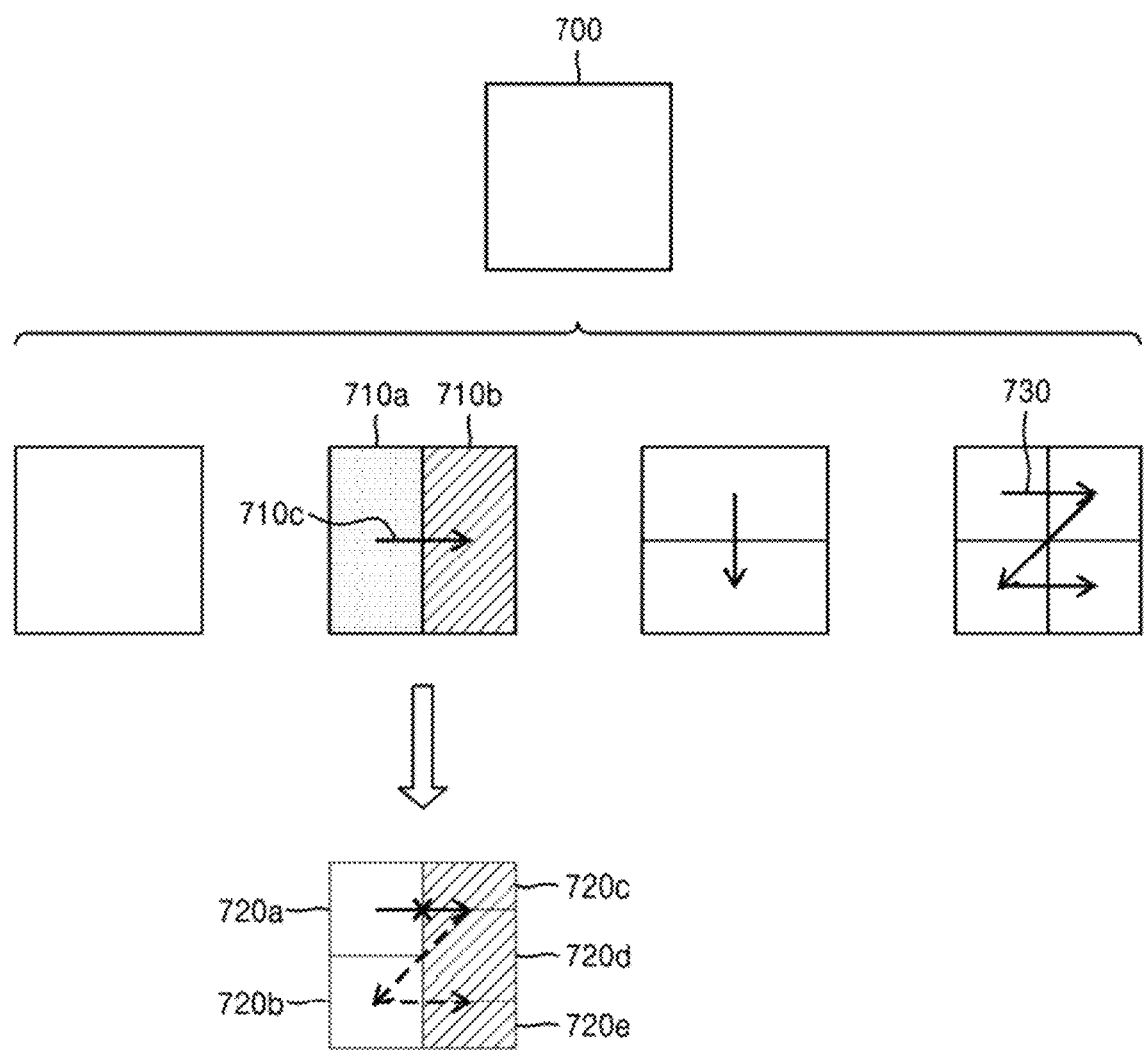
FIG. 7 illustrates a process of determining that a current coding unit is to be split into an odd number of coding units, when the coding units are not processable in a preset order, according to an embodiment.

FIG. 7 illustrates a process, performed by the image decoding apparatus 150, of determining that a current coding unit is to be split into an odd number of coding units, when the coding units are not processable in a preset order, according to an embodiment.

According to an embodiment, the image decoding apparatus 150 may determine that the current coding unit is to be split into an odd number of coding units, based on obtained block shape information and split shape information. Referring to FIG. 7, a square first coding unit 700 may be split into non-square second coding units 710a and 710b, and the second coding units 710a and 710b may be independently split into third coding units 720a and 720b, and 720c to 720e. According to an embodiment, the image decoding apparatus 150 may determine a plurality of third coding units 720*a* and 720*b* by splitting the left second coding unit 710*a* in a horizontal direction, and may split the right second coding unit 710*b* into an odd number of third coding units 720*c* to 720*e*.

According to an embodiment, the image decoding apparatus 150 may determine whether any coding unit is split into an odd number of coding units, by determining whether the third coding units 720*a* and 720*b*, and 720*c* to 720*e* are processable in a preset order. Referring to FIG. 7, the image decoding apparatus 150 may determine the third coding units 720*a* and 720*b*, and 720*c* to 720*e* by recursively splitting the first coding unit 700. The image decoding apparatus 150 may determine whether any of the first coding unit 700, the second coding units 710*a* and 710*b*, or the third coding units 720*a* and 720*b*, and 720*c*, 720*d*, and 720*e* is to be split into an odd number of coding units, based on at least one of the block shape information and the split shape information. For example, a coding unit located on the right from among the second coding units 710*a* and 710*b* may be split into an odd number of third coding units 720*c*, 720*d*, and 720*e*. A processing order of a plurality of coding units included in the first coding unit 700 may be a preset order (e.g., a Z-scan order 730), and the image decoding apparatus 150 may determine whether the third coding units 720*c*, 720*d*, and 720*e*, which are determined by splitting the right second coding unit 710*b* into an odd number of coding units, satisfy a condition for processing in the preset order.

According to an embodiment, the image decoding apparatus 150 may determine whether the third coding units 720*a* and 720*b*, and 720*c*, 720*d*, and 720*e* included in the first coding unit 700 satisfy the condition for processing in the preset order, and the condition relates to whether at least one of a width and height of the second coding units 710*a* and 710*b* is to be divided in half along a boundary of the third coding units 720*a* and 720*b*, and 720*c*, 720*d*, and 720*e*. For example, the third coding units 720*a* and 720*b* determined by dividing the height of the non-square left second coding unit 710*a* in half satisfy the condition. However, because boundaries of the third coding units 720*c*, 720*d*, and 720*e* determined by splitting the right second coding unit 710*b* into three coding units do not divide the width or height of the right second coding unit 710*b* in half, it may be determined that the third coding units 720*c*, 720*d*, and 720*e* do not satisfy the condition. When the condition is not satisfied as described above, the image decoding apparatus 150 may decide disconnection of a scan order, and determine that the right second coding unit 710*b* is to be split into an odd number of coding units, based on a result of the decision. According to an embodiment, when a coding unit is split into an odd number of coding units, the image decoding apparatus 150 may put a preset restriction on a coding unit at a preset location among the split coding units. The restriction or the preset location has been described above in relation to various embodiments, and thus detailed descriptions thereof will not be provided here.

Figure 8:
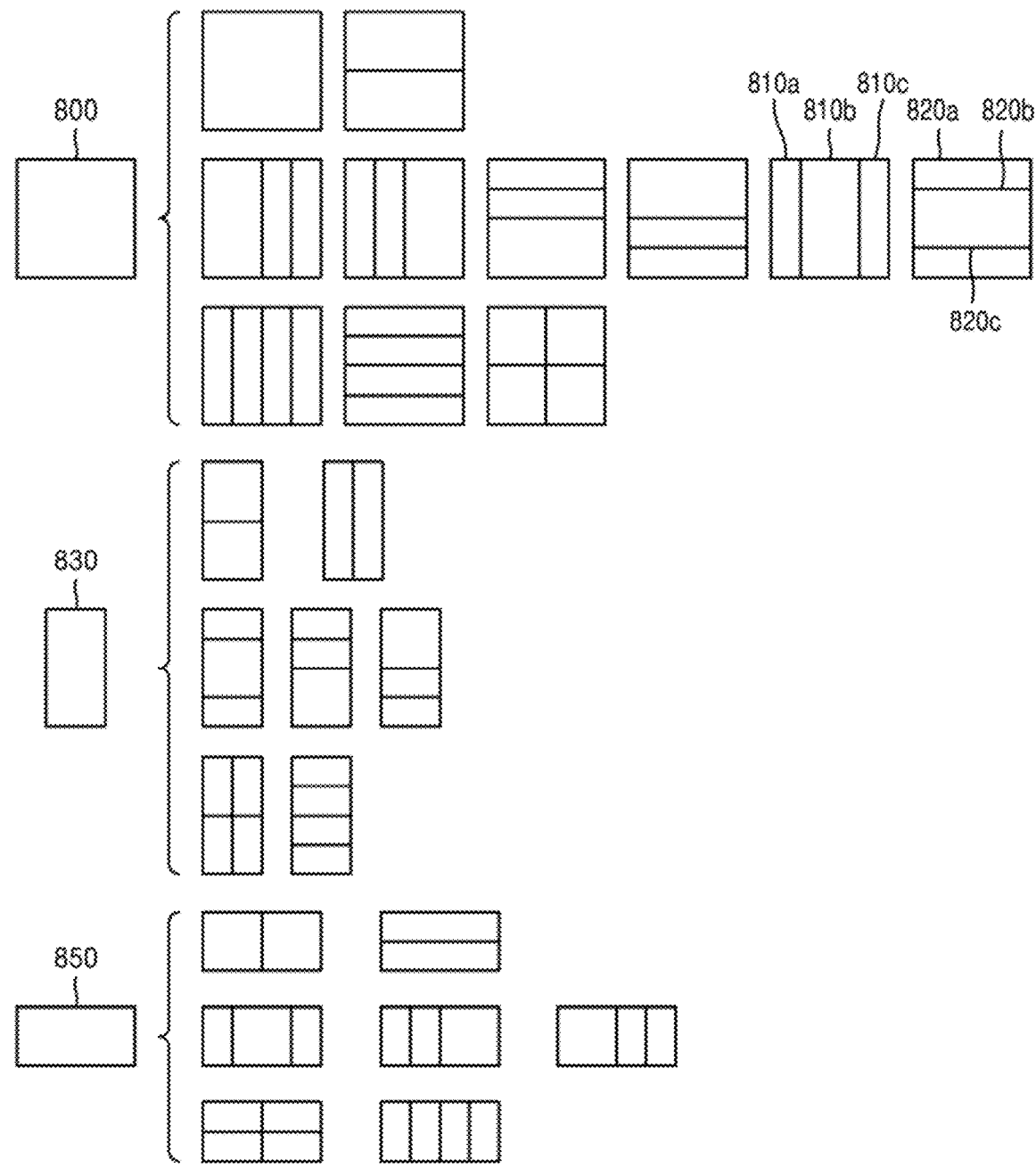
FIG. 8 illustrates a process of determining at least one coding unit by splitting a first coding unit, according to an embodiment.

FIG. 8 illustrates a process, performed by the image decoding apparatus 150, of determining at least one coding unit by splitting a first coding unit 800, according to an embodiment. According to an embodiment, the image decoding apparatus 150 may split the first coding unit 800, based on at least one of block shape information and split shape information, which is obtained by the receiver 160. The square first coding unit 800 may be split into four square coding units, or may be split into a plurality of non-square coding units. For example, referring to FIG. 8, when the block shape information indicates that the first coding unit 800 has a square shape and the split shape information indicates to split the first coding unit 800 into non-square coding units, the image decoding apparatus 150 may split the first coding unit 800 into a plurality of non-square coding units. In detail, when the split shape information indicates to determine an odd number of coding units by splitting the first coding unit 800 in a horizontal direction or a vertical direction, the image decoding apparatus 150 may split the square first coding unit 800 into an odd number of coding units, e.g., second coding units 810*a*, 810*b*, and 810*c* determined by splitting the square first coding unit 800 in a vertical direction or second coding units 820*a*, 820*b*, and 820*c* determined by splitting the square first coding unit 800 in a horizontal direction.

According to an embodiment, the image decoding apparatus 150 may determine whether the second coding units 810*a*, 810*b*, 810*c*, 820*a*, 820*b*, and 820*c* included in the first coding unit 800 satisfy a condition for processing in a preset order, and the condition relates to whether at least one of a width and height of the first coding unit 800 is to be divided in half along a boundary of the second coding units 810*a*, 810*b*, 810*c*, 820*a*, 820*b*, and 820*c*. Referring to FIG. 8, because boundaries of the second coding units 810*a*, 810*b*, and 810*c* determined by splitting the square first coding unit 800 in a vertical direction do not divide the width of the first coding unit 800 in half, it may be determined that the first coding unit 800 does not satisfy the condition for processing in the preset order. In addition, because boundaries of the second coding units 820*a*, 820*b*, and 820*c* determined by splitting the square first coding unit 800 in a horizontal direction do not divide the width of the first coding unit 800 in half, it may be determined that the first coding unit 800 does not satisfy the condition for processing in the preset order. When the condition is not satisfied as described above, the image decoding apparatus 150 may decide disconnection of a scan order, and may determine that the first coding unit 800 is to be split into an odd number of coding units, based on a result of the decision. According to an embodiment, when a coding unit is split into an odd number of coding units, the image decoding apparatus 150 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 150 may determine various-shaped coding units by splitting a first coding unit.

Referring to FIG. 8, the image decoding apparatus 150 may split the square first coding unit 800 or a non-square first coding unit 830 or 850 into various-shaped coding units.

Figure 9:
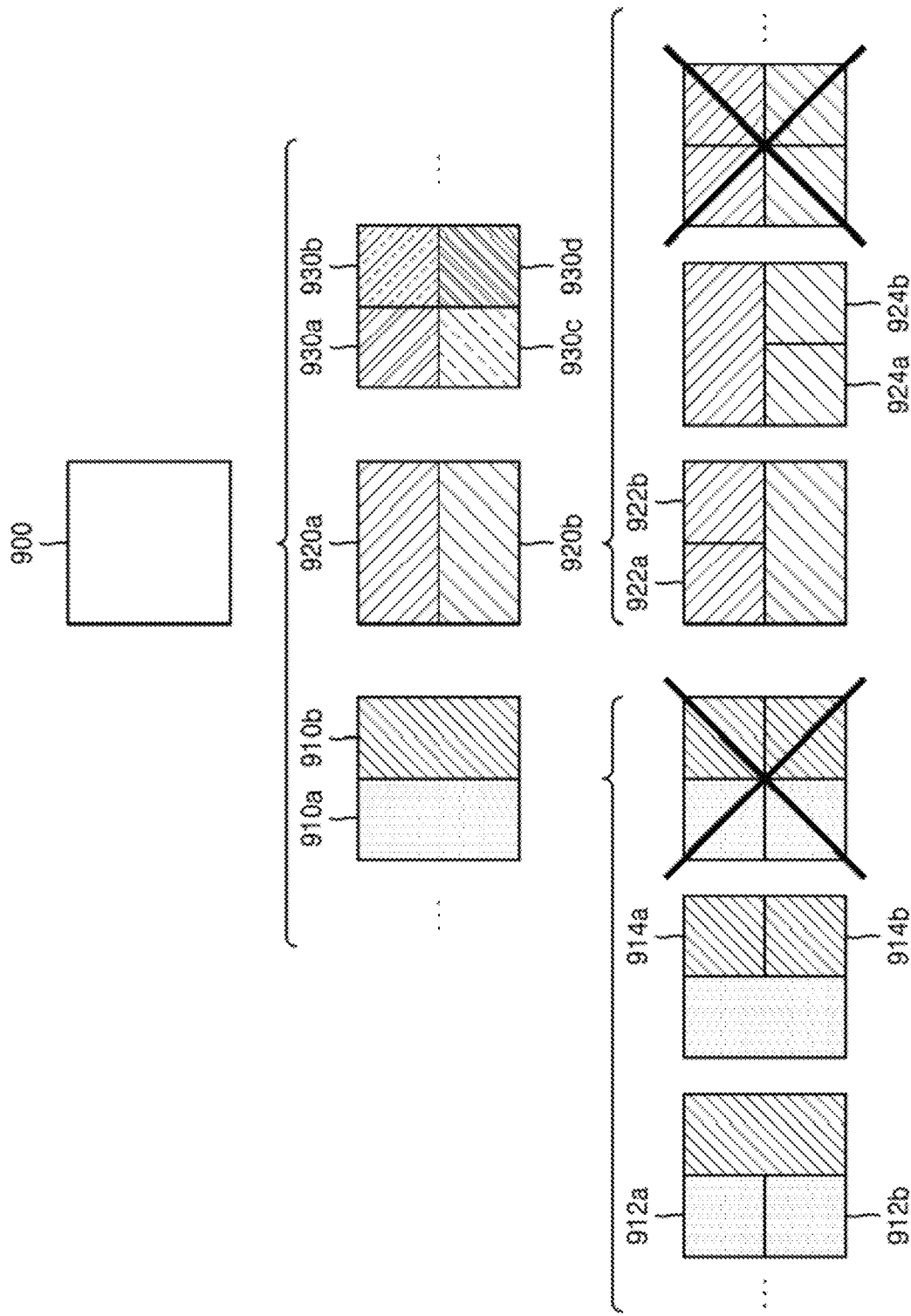
FIG. 9 illustrates that a shape into which a second coding unit is splittable is restricted when the second coding unit having a non-square shape, which is determined by splitting a first coding unit, satisfies a preset condition, according to an embodiment.

FIG. 9 illustrates that a shape into which a second coding unit is splittable by the image decoding apparatus 150 is restricted when the second coding unit having a non-square shape, which is determined by splitting a first coding unit 900, satisfies a preset condition, according to an embodiment.

According to an embodiment, the image decoding apparatus 150 may determine to split the square first coding unit 900 into non-square second coding units 910*a*, 910*b*, 920*a*, and 920*b*, based on at least one of block shape information and split shape information, which is obtained by the receiver 160. The second coding units 910*a*, 910*b*, 920*a*, and 920*b* may be independently split. As such, the image decoding apparatus 150 may determine to split or not to split the first coding unit 900 into a plurality of coding units, based on at least one of the block shape information and the split shape information of each of the second coding units 910a, 910b, 920a, and 920b. According to an embodiment, the image decoding apparatus 150 may determine third coding units 912a and 912b by splitting the non-square left second coding unit 910a, which is determined by splitting the first coding unit 900 in a vertical direction, in a horizontal direction. However, when the left second coding unit 910a is split in a horizontal direction, the image decoding apparatus 150 may restrict the right second coding unit 910b to not be split in a horizontal direction in which the left second coding unit 910a is split. When third coding units 914a and 914b are determined by splitting the right second coding unit 910b in a same direction, because the left and right second coding units 910a and 910b are independently split in a horizontal direction, the third coding units 912a, 912b, 914a, and 914b may be determined. However, this case serves equally as a case in which the image decoding apparatus 150 splits the first coding unit 900 into four square second coding units 930a, 930b, 930c, and 930d, based on at least one of the block shape information and the split shape information, and may be inefficient in terms of image decoding.

According to an embodiment, the image decoding apparatus 150 may determine third coding units 922a, 922b, 924a, and 924b by splitting the non-square second coding unit 920a or 920b, which is determined by splitting a first coding unit 330 in a horizontal direction, in a vertical direction. However, when a second coding unit (e.g., the upper second coding unit 920a) is split in a vertical direction, for the above-described reason, the image decoding apparatus 150 may restrict the other second coding unit (e.g., the lower second coding unit 920b) to not be split in a vertical direction in which the upper second coding unit 920a is split.

Figure 10:
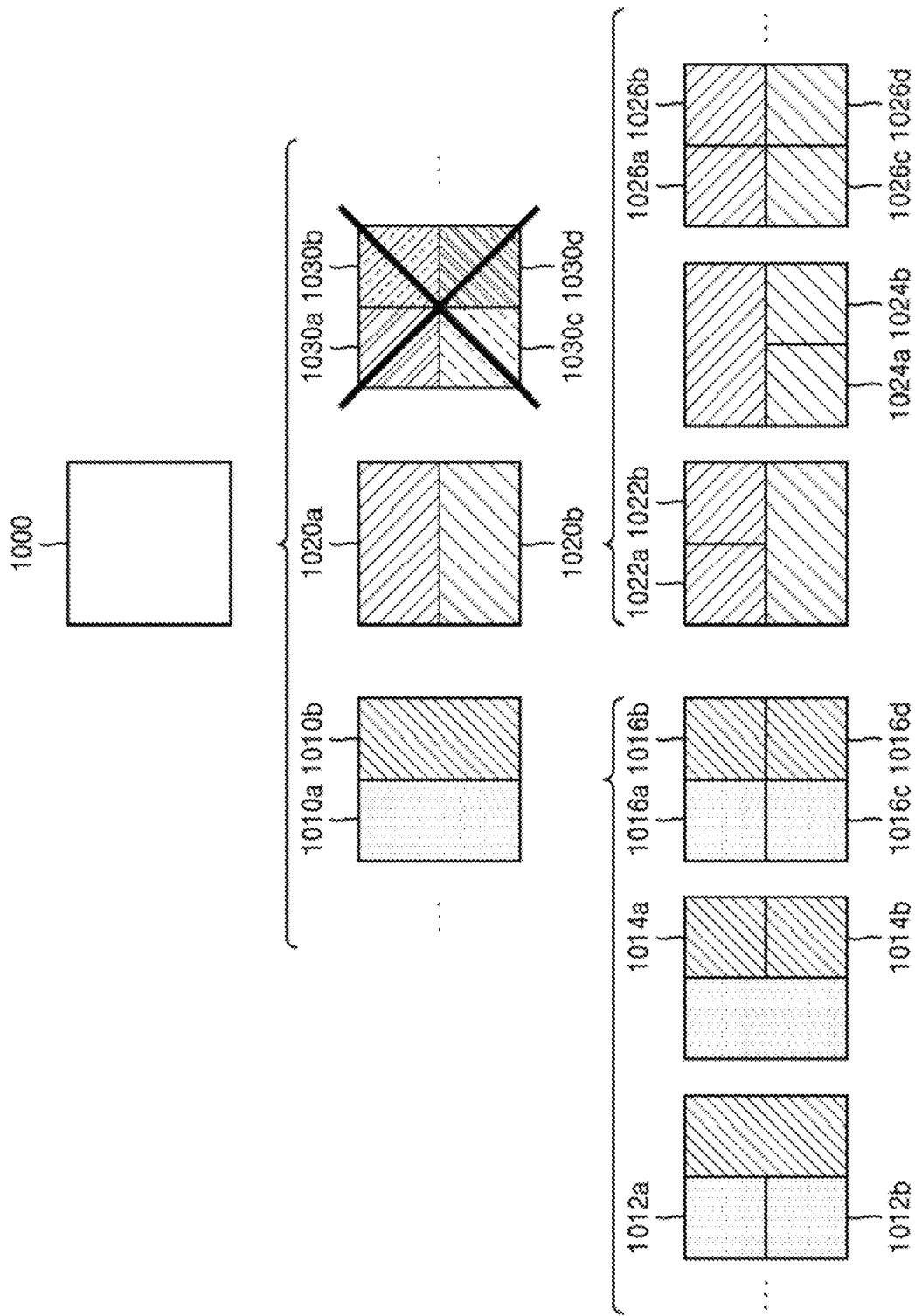
FIG. 10 illustrates a process of splitting a square coding unit when split shape information indicates that the square coding unit is not to be split into four square coding units, according to an embodiment.

FIG. 10 illustrates a process, performed by the image decoding apparatus 150, of splitting a square coding unit when split shape information indicates that the square coding unit is not to be split into four square coding units, according to an embodiment.

According to an embodiment, the image decoding apparatus 150 may determine second coding units 1010a, 1010b, 1020a, 1020b, etc. by splitting a first coding unit 1000, based on at least one of block shape information and split shape information. The split shape information may include information about various methods of splitting a coding unit but, the information about various splitting methods may not include information for splitting a coding unit into four square coding units. According to such split shape information, the image decoding apparatus 150 may not split the first square coding unit 1000 into four square second coding units 1030a, 1030b, 1030c, and 1030d. The image decoding apparatus 150 may determine the non-square second coding units 1010a, 1010b, 1020a, 1020b, etc., based on the split shape information.

According to an embodiment, the image decoding apparatus 150 may independently split the non-square second coding units 1010a, 1010b, 1020a, 1020b, etc. Each of the second coding units 1010a, 1010b, 1020a, 1020b, etc. may be recursively split in a preset order, and this splitting method may correspond to a method of splitting the first coding unit 1000, based on at least one of the block shape information and the split shape information.

For example, the image decoding apparatus 150 may determine square third coding units 1012a and 1012b by splitting the left second coding unit 1010a in a horizontal direction, and may determine square third coding units 1014a and 1014b by splitting the right second coding unit 1010b in a horizontal direction. Furthermore, the image decoding apparatus 150 may determine square third coding units 1016a, 1016b, 1016c, and 1016d by splitting both of the left and right second coding units 1010a and 1010b in a horizontal direction. In this case, coding units having the same shape as the four square second coding units 1030a, 1030b, 1030c, and 1030d split from the first coding unit 1000 may be determined.

As another example, the image decoding apparatus 150 may determine square third coding units 1022a and 1022b by splitting the upper second coding unit 1020a in a vertical direction, and may determine square third coding units 1024a and 1024b by splitting the lower second coding unit 1020b in a vertical direction. Furthermore, the image decoding apparatus 150 may determine square third coding units 1022a, 1022b, 1024a, and 1024b by splitting both of the upper and lower second coding units 1020a and 1020b in a vertical direction. In this case, coding units having the same shape as the four square second coding units 1030a, 1030b, 1030c, and 1030d split from the first coding unit 1000 may be determined.

Figure 11:
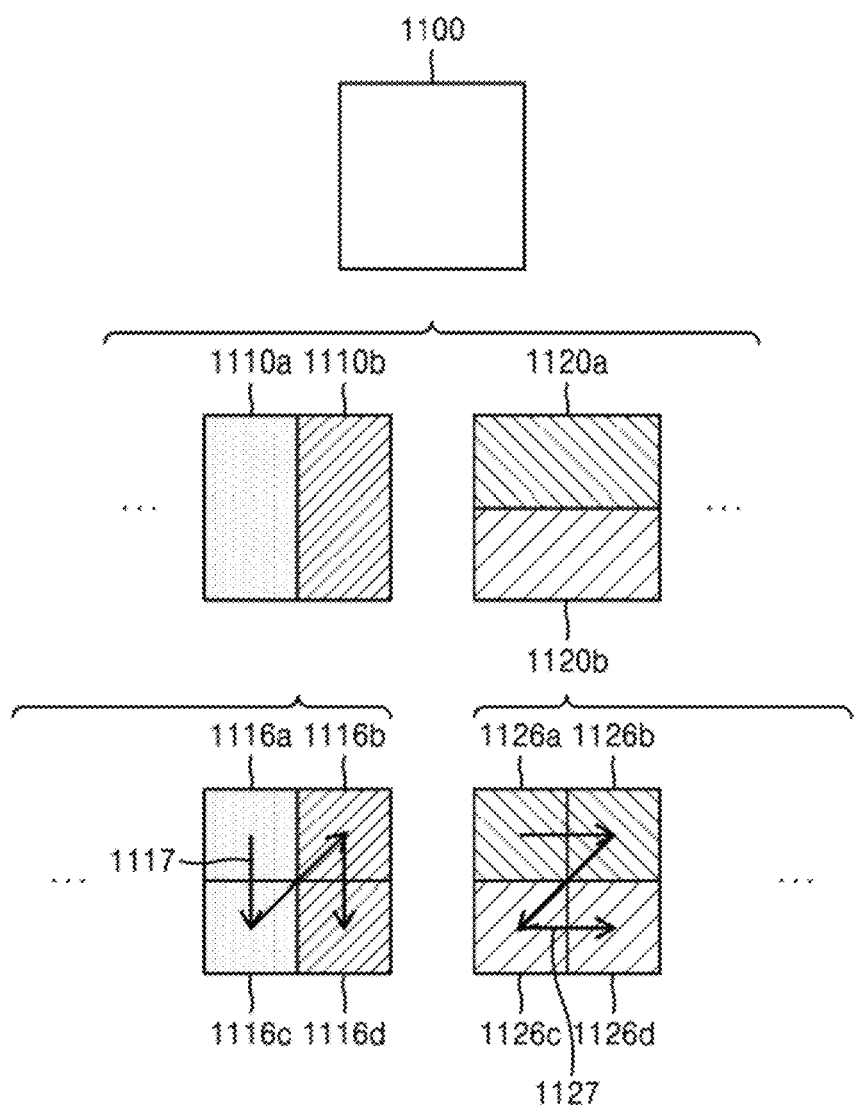
FIG. 11 illustrates that a processing order between a plurality of coding units may be changed depending on a process of splitting a coding unit, according to an embodiment.

FIG. 11 illustrates that a processing order between a plurality of coding units may be changed depending on a process of splitting a coding unit, according to an embodiment.

According to an embodiment, the image decoding apparatus 150 may split a first coding unit 1100, based on block shape information and split shape information. When the block shape information indicates a square shape and the split shape information indicates to split the first coding unit 1100 in at least one of horizontal and vertical directions, the image decoding apparatus 150 may determine second coding units 1110a, 1110b, 1120a, 1120b, 1130a, 1130b, 1130c, and 1130d by splitting the first coding unit 1100. Referring to FIG. 11, the non-square second coding units 1110a, 1110b, 1120a, and 1120b determined by splitting the first coding unit 1100 in only a horizontal direction or vertical direction may be independently split based on the block shape information and the split shape information of each coding unit. For example, the image decoding apparatus 150 may determine third coding units 1116a, 1116b, 1116c, and 1116d by splitting the second coding units 1110a and 1110b, which are generated by splitting the first coding unit 1100 in a vertical direction, in a horizontal direction, and may determine third coding units 1126a, 1126b, 1126c, and 1126d by splitting the second coding units 1120a and 1120b, which are generated by splitting the first coding unit 1100 in a horizontal direction, in a horizontal direction. An operation of splitting the second coding units 1110a, 1110b, 1120a, and 1120b has been described above in relation to FIG. 9, and thus detailed descriptions thereof will not be provided herein.

According to an embodiment, the image decoding apparatus 150 may process coding units in a preset order. An operation of processing coding units in a preset order has been described above in relation to FIG. 6, and thus detailed descriptions thereof will not be provided herein. Referring to FIG. 11, the image decoding apparatus 150 may determine four square third coding units 1116a, 1116b, 1116c, and 1116d, and 1126a, 1126b, 1126c, and 1126d by splitting the square first coding unit 1100. According to an embodiment, the image decoding apparatus 150 may determine processing orders of the third coding units 1116a, 1116b, 1116c, and 1116d, and 1126a, 1126b, 1126c, and 1126d, based on a split shape by which the first coding unit 1100 is split.

According to an embodiment, the image decoding apparatus 150 may determine the third coding units 1116a, 1116b, 1116c, and 1116d by splitting the second coding units 1110a and 1110b generated by splitting the first coding unit 1100 in a vertical direction, in a horizontal direction, and may process the third coding units 1116a, 1116b, 1116c, and 1116d in a processing order 1117 for initially processing the third coding units 1116a and 1116b, which are included in the left second coding unit 1110a, in a vertical direction and then processing the third coding units 1116c and 1116d, which are included in the right second coding unit 1110b, in a vertical direction.

According to an embodiment, the image decoding apparatus 150 may determine the third coding units 1126a, 1126b, 1126c, and 1126d by splitting the second coding units 1120a and 1120b generated by splitting the first coding unit 1100 in a horizontal direction, in a vertical direction, and may process the third coding units 1126a, 1126b, 1126c, and 1126d in a processing order 1127 for initially processing the third coding units 1126a and 1126b, which are included in the upper second coding unit 1120a, in a horizontal direction and then processing the third coding units 1126c and 1126d, which are included in the lower second coding unit 1120b, in a horizontal direction.

Referring to FIG. 11, the square third coding units 1116a, 1116b, 1116c, and 1116d, and 1126a, 1126b, 1126c, and 1126d may be determined by splitting the second coding units 1110a, 1110b, 1120a, and 1120b, respectively. Although the second coding units 1110a and 1110b are determined by splitting the first coding unit 1100 in a vertical direction differently from the second coding units 1120a and 1120b which are determined by splitting the first coding unit 1100 in a horizontal direction, the third coding units 1116a, 1116b, 1116c, and 1116d, and 1126a, 1126b, 1126c, and 1126d split therefrom eventually show same-shaped coding units split from the first coding unit 1100. As such, by recursively splitting a coding unit in different manners based on at least one of the block shape information and the split shape information, the image decoding apparatus 150 may process a plurality of coding units in different orders even when the coding units are eventually determined to be the same shape.

Figure 12:
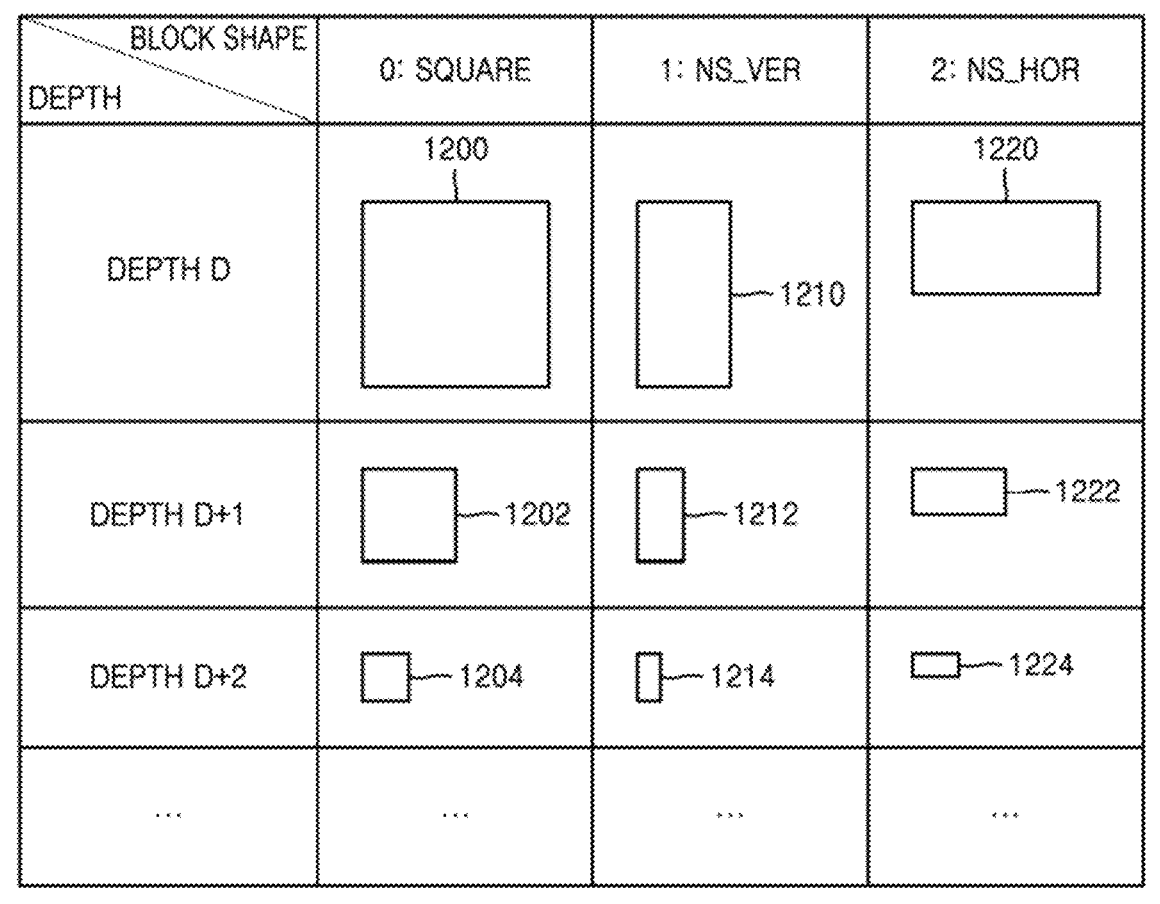

FIG. 12 illustrates a process of determining a depth of a coding unit as a shape and size of the coding unit change, when the coding unit is recursively split such that a plurality of coding units are determined, according to an embodiment.

According to an embodiment, the image decoding apparatus 150 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 150 may determine that a depth of the current coding unit is increased from a depth of the coding unit before being split, by n. In the following description, a coding unit having an increased depth is expressed as a coding unit of a deeper depth.

Referring to FIG. 12, according to an embodiment, the image decoding apparatus 150 may determine a second coding unit 1202 and a third coding unit 1204 of deeper depths by splitting a square first coding unit 1200 based on block shape information indicating a square shape (for example, the block shape information may be expressed as '0: SQUARE'). Assuming that the size of the square first coding unit 1200 is 2N×2N, the second coding unit 1202 determined by dividing a width and height of the first coding unit 1200 to ½ may have a size of N×N. Furthermore, the third coding unit 1204 determined by dividing a width and height of the second coding unit 1202 to ½ may have a size of N/2×N/2. In this case, a width and height of the third coding unit 1204 are ¼ times those of the first coding unit 1200. When a depth of the first coding unit 1200 is D, a depth of the second coding unit 1202, the width and height of which are ½ times those of the first coding unit 1200, may be D+1, and a depth of the third coding unit 1204, the width and height of which are ½ times those of the first coding unit 1200, may be D+2.

According to an embodiment, the image decoding apparatus 150 may determine a second coding unit 1212 or 1222 and a third coding unit 1214 or 1224 of deeper depths by splitting a non-square first coding unit 1210 or 1220 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 150 may determine a second coding unit 1202, 1212, or 1222 by dividing at least one of a width and height of the first coding unit 1210 having a size of N×2N. That is, the image decoding apparatus 150 may determine the second coding unit 1202 having a size of N×N or the second coding unit 1222 having a size of N×N/2 by splitting the first coding unit 1210 in a horizontal direction, or may determine the second coding unit 1212 having a size of N/2×N by splitting the first coding unit 1210 in horizontal and vertical directions.

According to an embodiment, the image decoding apparatus 150 may determine the second coding unit 1202, 1212, or 1222 by dividing at least one of a width and height of the first coding unit 1220 having a size of 2N×N. That is, the image decoding apparatus 150 may determine the second coding unit 1202 having a size of N×N or the second coding unit 1212 having a size of N/2×N by splitting the first coding unit 1220 in a vertical direction, or may determine the second coding unit 1222 having a size of N×N/2 by splitting the first coding unit 1220 in horizontal and vertical directions.

According to an embodiment, the image decoding apparatus 150 may determine a third coding unit 1204, 1214, or 1224 by dividing at least one of a width and height of the second coding unit 1202 having a size of N×N. That is, the image decoding apparatus 150 may determine the third coding unit 1204 having a size of N/2×N/2, the third coding unit 1214 having a size of N/2×N/2, or the third coding unit 1224 having a size of N/2×N/2 by splitting the second coding unit 1202 in vertical and horizontal directions.

According to an embodiment, the image decoding apparatus 150 may determine the third coding unit 1204, 1214, or 1224 by dividing at least one of a width and height of the second coding unit 1212 having a size of N/2×N. That is, the image decoding apparatus 150 may determine the third coding unit 1204 having a size of N/2×N/2 or the third coding unit 1224 having a size of N/2×N/2 by splitting the second coding unit 1212 in a horizontal direction, or may determine the third coding unit 1214 having a size of N/2×N/2 by splitting the second coding unit 1212 in vertical and horizontal directions.

According to an embodiment, the image decoding apparatus 150 may determine the third coding unit 1204, 1214, or 1224 by dividing at least one of a width and height of the second coding unit 1214 having a size of N×N/2. That is, the image decoding apparatus 150 may determine the third coding unit 1204 having a size of N/2×N/2 or the third coding unit 1214 having a size of N/2×N/2 by splitting the second coding unit 1212 in a vertical direction, or may determine the third coding unit 1224 having a size of N/2×N/2 by splitting the second coding unit 1222 in vertical and horizontal directions.

According to an embodiment, the image decoding apparatus 150 may split the square coding unit 1200, 1202, or 1204 in a horizontal or vertical direction. For example, the image decoding apparatus 150 may determine the first coding unit 1210 having a size of N×2N by splitting the first coding unit 1200 having a size of 2N×2N in a vertical direction, or may determine the first coding unit 1220 having a size of 2N×N by splitting the first coding unit 1200 in a horizontal direction. According to an embodiment, when a depth is determined based on the length of the longest side of a coding unit, a depth of a coding unit determined by splitting the first coding unit 1200, 1202 or 1204 having a size of 2N×2N in a horizontal or vertical direction may be the same as the depth of the first coding unit 1200, 1202 or 1204.

According to an embodiment, a width and height of the third coding unit 1214 or 1224 may be ½ times those of the first coding unit 1210 or 1220. When a depth of the first coding unit 1210 or 1220 is D, a depth of the second coding unit 1212 or 1214, the width and height of which are ½ times those of the first coding unit 1210 or 1220, may be D+1, and a depth of the third coding unit 1214 or 1224, the width and height of which are ½ times those of the first coding unit 1210 or 1220, may be D+2.

Figure 13:
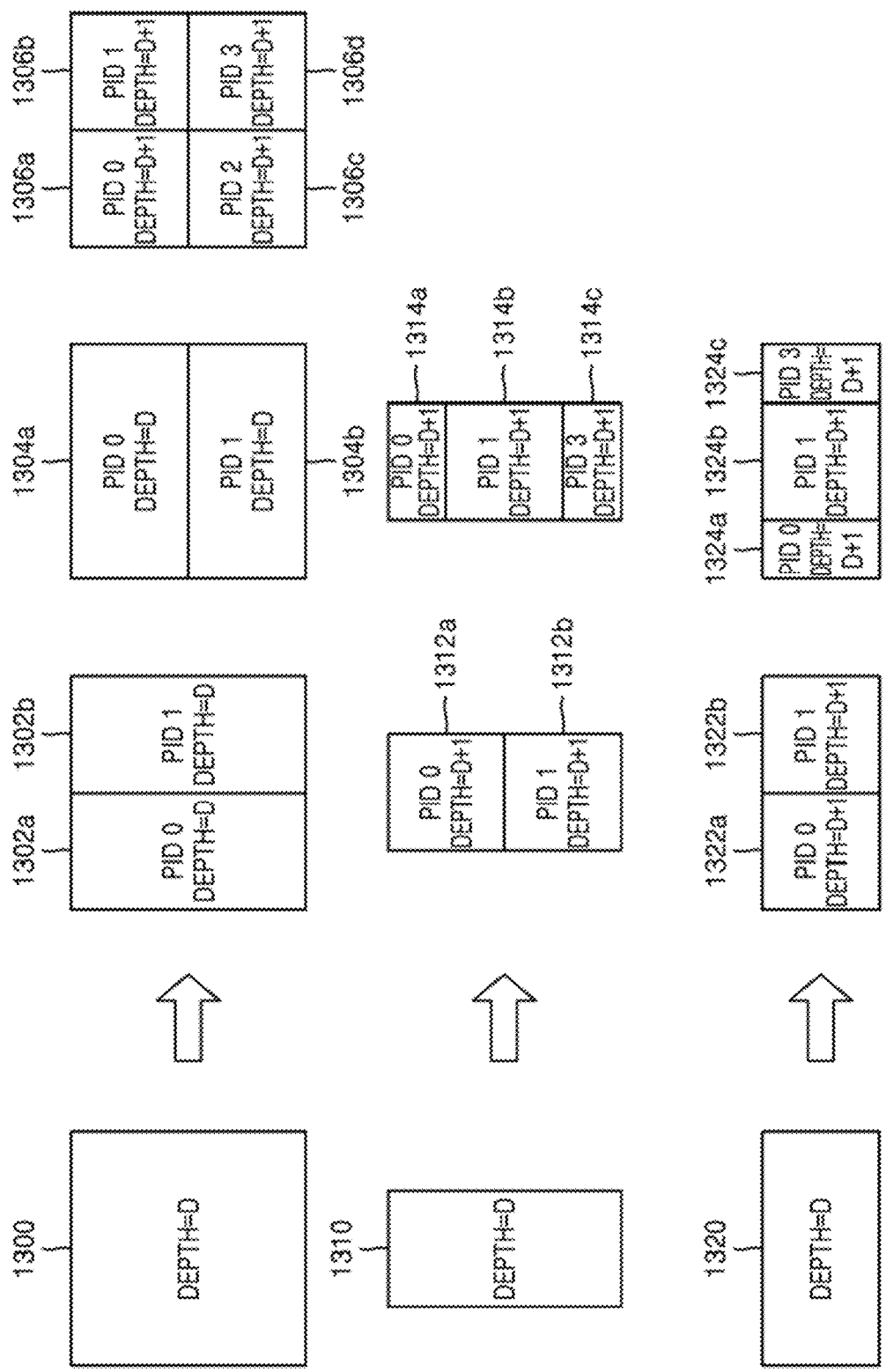
FIG. 13 illustrates depths that are determinable based on shapes and sizes of coding units, and part indexes (PIDs) that are for distinguishing the coding units, according to an embodiment.

FIG. 13 illustrates depths that are determinable based on shapes and sizes of coding units, and part indexes (PIDs) that are for distinguishing the coding units, according to an embodiment.

According to an embodiment, the image decoding apparatus 150 may determine various-shape second coding units by splitting a square first coding unit 1300. Referring to FIG. 13, the image decoding apparatus 150 may determine second coding units 1302a and 1302b, 1304a and 1304b, and 1306a, 1306b, 1306c, and 1306d by splitting the first coding unit 1300 in at least one of vertical and horizontal directions based on split shape information. That is, the image decoding apparatus 150 may determine the second coding units 1302a and 1302b, 1304a and 1304b, and 1306a, 1306b, 1306c, and 1306d, based on the split shape information of the first coding unit 1300.

According to an embodiment, depths of the second coding units 1302a and 1302b, 1304a and 1304b, and 1306a, 1306b, 1306c, and 1306d that are determined based on the split shape information of the square first coding unit 1300 may be determined based on the length of a long side thereof. For example, because the length of a side of the square first coding unit 1300 equals the length of a long side of the non-square second coding units 1302a and 1302b, and 1304a and 1304b, the first coding unit 1300 and the non-square second coding units 1302a and 1302b, and 1304a and 1304b may have the same depth, e.g., D. However, when the image decoding apparatus 150 splits the first coding unit 1300 into the four square second coding units 1306a, 1306b, 1306c, and 1306d based on the split shape information, because the length of a side of the square second coding units 1306a, 1306b, 1306c, and 1306d is ½ times the length of a side of the first coding unit 1300, a depth of the second coding units 1306a, 1306b, 1306c, and 1306d may be D+1 which is deeper than the depth D of the first coding unit 1300 by 1.

According to an embodiment, the image decoding apparatus 150 may determine a plurality of second coding units 1312a and 1312b, and 1314a, 1314b, and 1314c by splitting a first coding unit 1310, a height of which is longer than a width, in a horizontal direction based on the split shape information. According to an embodiment, the image decoding apparatus 150 may determine a plurality of second coding units 1322a and 1322b, and 1324a, 1324b, and 1324c by splitting a first coding unit 1320, a width of which is longer than a height, in a vertical direction based on the split shape information.

According to an embodiment, a depth of the second coding units 1312a and 1312b, 1314a, 1314b, and 1316a, 1316b, 1316c, and 1316d, which are determined based on the split shape information of the non-square first coding unit 1310 or 1320, may be determined based on the length of a long side thereof. For example, because the length of a side of the square second coding units 1312a and 1312b is ½ times the length of a long side of the first coding unit 1310 having a non-square shape, a height of which is longer than a width, a depth of the square second coding units 1302a, 1302b, 1304a, and 1304b is D+1 which is deeper than the depth D of the non-square first coding unit 1310 by 1.

Furthermore, the image decoding apparatus 150 may split the non-square first coding unit 1310 into an odd number of second coding units 1314a, 1314b, and 1314c based on the split shape information. The odd number of second coding units 1314a, 1314b, and 1314c may include the non-square second coding units 1314a and 1314c and the square second coding unit 1314b. In this case, because the length of a long side of the non-square second coding units 1314a and 1314c and the length of a side of the square second coding unit 1314b are ½ times the length of a long side of the first coding unit 1310, a depth of the second coding units 1314a, 1314b, and 1314c may be D+1 which is deeper than the depth D of the non-square first coding unit 1310 by 1. The image decoding apparatus 150 may determine depths of coding units split from the first coding unit 1320 having a non-square shape, a width of which is longer than a height, by using the above-described method of determining depths of coding units split from the first coding unit 1310.

According to an embodiment, the image decoding apparatus 150 may determine PIDs for identifying split coding units, based on a size ratio between the coding units when an odd number of split coding units do not have equal sizes. Referring to FIG. 13, a coding unit 1314b of a center location among an odd number of split coding units 1314a, 1314b, and 1314c may have a width equal to that of the other coding units 1314a and 1314c and a height which is two times that of the other coding units 1314a and 1314c. That is, in this case, the coding unit 1314b at the center location may include two of the other coding units 1314a and 1314c. Therefore, when a PID of the coding unit 1314b at the center location is 1 based on a scan order, a PID of the coding unit 1314c located next to the coding unit 1314b may be increased by 2 and thus may be 3. That is, there may be discontinuity in PID values. According to an embodiment, the image decoding apparatus 150 may determine whether an odd number of split coding units do not have equal sizes, based on whether there is discontinuity in PIDs for identifying the split coding units.

According to an embodiment, the image decoding apparatus 150 may determine whether to use a specific splitting method, based on PID values for identifying a plurality of coding units determined by splitting a current coding unit. Referring to FIG. 13, the image decoding apparatus 150 may determine an even number of coding units 1312a and 1312b or an odd number of coding units 1314a, 1314b, and 1314c by splitting the first coding unit 1310 having a rectangular shape, a height of which is longer than a width. The image decoding apparatus 150 may use PIDs indicating respective coding units so as to identify the respective coding units. According to an embodiment, the PID may be obtained from a sample of a preset location of each coding unit (e.g., a top left sample).

According to an embodiment, the image decoding apparatus 150 may determine a coding unit at a preset location from among the split coding units, by using the PIDs for distinguishing between the coding units. According to an embodiment, when the split shape information of the first coding unit 1310 having a rectangular shape, a height of which is longer than a width, indicates to split a coding unit into three coding units, the image decoding apparatus 150 may split the first coding unit 1310 into three coding units 1314*a*, 1314*b*, and 1314*c*. The image decoding apparatus 150 may assign a PID to each of the three coding units 1314*a*, 1314*b*, and 1314*c*. The image decoding apparatus 150 may compare PIDs of an odd number of split coding units to determine a coding unit at a center location from among the coding units. The image decoding apparatus 150 may determine the coding unit 1314*b* having a PID corresponding to a middle value among the PIDs of the coding units, as the coding unit at the center location from among the coding units determined by splitting the first coding unit 1310. According to an embodiment, the image decoding apparatus 150 may determine PIDs for distinguishing between split coding units, based on a size ratio between the coding units when the split coding units do not have equal sizes. Referring to FIG. 13, the coding unit 1314*b* generated by splitting the first coding unit 1310 may have a width equal to that of the other coding units 1314*a* and 1314*c* and a height which is two times that of the other coding units 1314*a* and 1314*c*. In this case, when the PID of the coding unit 1314*b* at the center location is 1, the PID of the coding unit 1314*c* located next to the coding unit 1314*b* may be increased by 2 and thus may be 3. When the PID is not uniformly increased as described above, the image decoding apparatus 150 may determine that a coding unit is split into a plurality of coding units including a coding unit having a size different from that of the other coding units. According to an embodiment, when the split shape information indicates to split a coding unit into an odd number of coding units, the image decoding apparatus 150 may split a current coding unit in such a manner that a coding unit of a preset location among an odd number of coding units (e.g., a coding unit of a centre location) has a size different from that of the other coding units. In this case, the image decoding apparatus 150 may determine the coding unit of the centre location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 150 may use a preset data unit where a coding unit starts to be recursively split.

Figure 14:
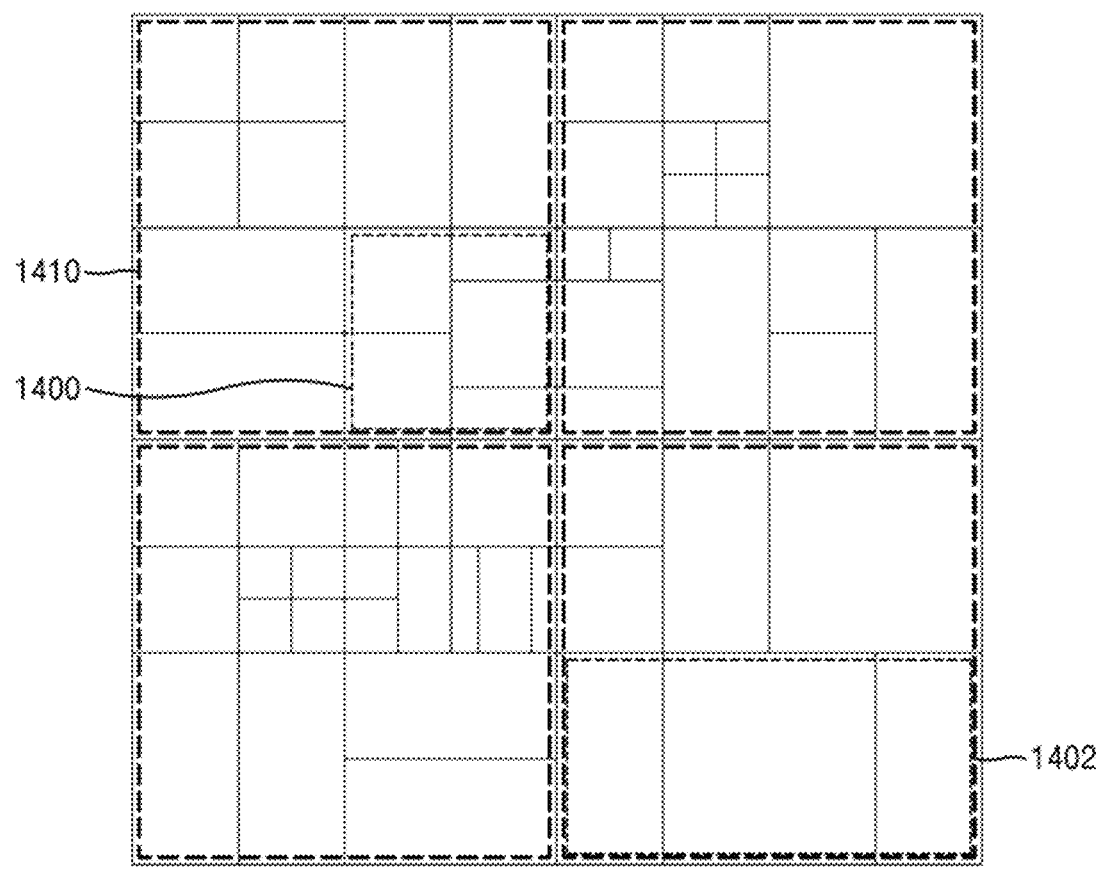
FIG. 14 illustrates that a plurality of coding units are determined based on a plurality of preset data units included in a picture, according to an embodiment.

FIG. 14 illustrates that a plurality of coding units are determined based on a plurality of preset data units included in a picture, according to an embodiment.

According to an embodiment, a preset data unit may be defined as a data unit where a coding unit starts to be recursively split by using at least one of block shape information and split shape information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 150 may split the current picture into a plurality of reference data units. According to an embodiment, the image decoding apparatus 150 may split the plurality of reference data units, which are split from the current picture, by using splitting information about each reference data unit. The operation of splitting the reference data unit may correspond to a splitting operation using a quadtree structure.

According to an embodiment, the image decoding apparatus 150 may previously determine the minimum size allowed for the reference data units included in the current picture. Accordingly, the image decoding apparatus 150 may determine various reference data units having sizes equal to or greater than the minimum size, and may determine one or more coding units by using the block shape information and the split shape information with reference to the determined reference data unit.

Referring to FIG. 14, the image decoding apparatus 150 may use a square reference coding unit 1400 or a non-square reference coding unit 1402. According to an embodiment, the shape and size of reference coding units may be determined based on various data units capable of including one or more reference coding units (e.g., sequences, pictures, slices, slice segments, largest coding units, or the like).

According to an embodiment, the receiver 160 of the image decoding apparatus 150 may obtain, from a bitstream, at least one of reference coding unit shape information and reference coding unit size information with respect to each of the various data units. An operation of splitting the square reference coding unit 1400 into one or more coding units has been described above in relation to the operation of splitting the current coding unit 300 of FIG. 10, and an operation of splitting the non-square reference coding unit 1400 into one or more coding units has been described above in relation to the operation of splitting the current coding unit 1100 or 1150 of FIG. 11. Thus, detailed descriptions thereof will not be provided herein.

According to an embodiment, the image decoding apparatus 150 may use a PID for identifying the size and shape of reference coding units, to determine the size and shape of reference coding units according to some data units previously determined based on a preset condition. That is, the receiver 160 may obtain, from the bitstream, only the PID for identifying the size and shape of reference coding units with respect to each slice, slice segment, or largest coding unit which is a data unit satisfying a preset condition (e.g., a data unit having a size equal to or smaller than a slice) among the various data units (e.g., sequences, pictures, slices, slice segments, largest coding units, or the like). The image decoding apparatus 150 may determine the size and shape of reference data units with respect to each data unit, which satisfies the preset condition, by using the PID. When the reference coding unit shape information and the reference coding unit size information are obtained and used from the bitstream according to each data unit having a relatively small size, the efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 150 may determine at least one of the size and shape of reference coding units included in a data unit serving as a unit for obtaining the PID, by selecting the previously determined at least one of the size and shape of reference coding units based on the PID.

According to an embodiment, the image decoding apparatus 150 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 150 may determine the reference coding units by splitting the largest coding unit n times based on a quadtree structure, and may split the reference coding unit based on at least one of the block shape information and the split shape information according to various embodiments.

Figure 15:
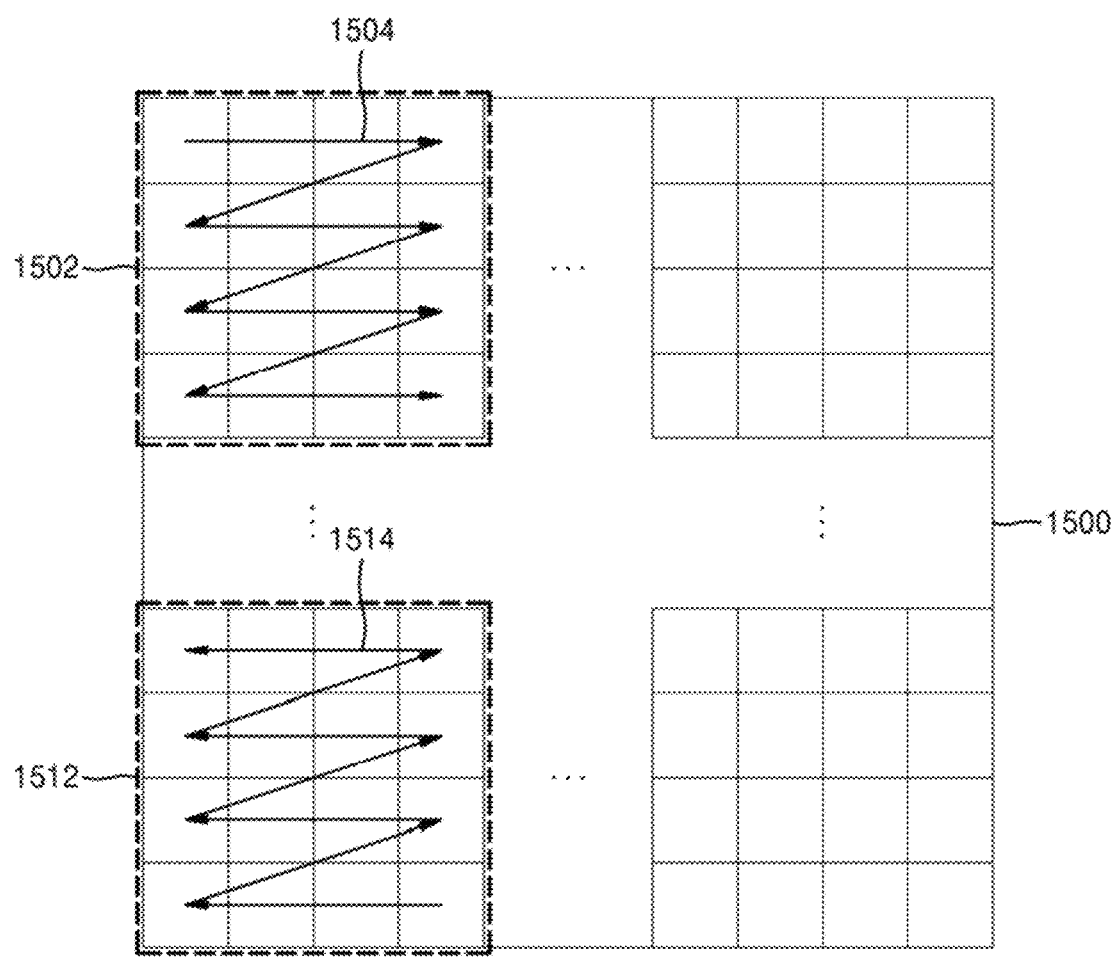
FIG. 15 illustrates a processing block serving as a unit for determining a determination order of reference coding units included in a picture, according to an embodiment.

FIG. 15 illustrates a processing block serving as a unit for determining a determination order of reference coding units included in a picture 1500, according to an embodiment.

According to an embodiment, the image decoding apparatus 150 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 150 may obtain processing block size information and may determine the size of one or more processing blocks included in the picture. The image decoding apparatus 150 may obtain the processing block size information from a bitstream and may determine the size of one or more processing blocks included in the picture. The size of processing blocks may be a preset size of data units, which is indicated by the processing block size information.

According to an embodiment, the receiver 160 of the image decoding apparatus 150 may obtain the processing block size information from the bitstream according to each specific data unit. For example, the processing block size information may be obtained from the bitstream in a data unit such as an image, sequence, picture, slice, or slice segment. That is, the receiver 160 may obtain the processing block size information from the bitstream according to each of the various data units, and the image decoding apparatus 150 may determine the size of one or more processing blocks, which are split from the picture, by using the obtained processing block size information. The size of the processing blocks may be integer times that of the reference coding units.

According to an embodiment, the image decoding apparatus 150 may determine the size of processing blocks 1502 and 1512 included in the picture 1500. For example, the image decoding apparatus 150 may determine the size of processing blocks based on the processing block size information obtained from the bitstream. Referring to FIG. 15, according to an embodiment, the image decoding apparatus 150 may determine a width of the processing blocks 1502 and 1512 to be four times the width of the reference coding units, and may determine a height of the processing blocks 1502 and 1512 to be four times the height of the reference coding units. The image decoding apparatus 150 may determine a determination order of one or more reference coding units in one or more processing blocks.

According to an embodiment, the image decoding apparatus 150 may determine the processing blocks 1502 and 1512, which are included in the picture 1500, based on the size of processing blocks, and may determine a determination order of one or more reference coding units in the processing blocks 1502 and 1512. According to an embodiment, determination of reference coding units may include determination of the size of the reference coding units.

According to an embodiment, the image decoding apparatus 150 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 150 may obtain, from the bitstream, the determination order information of reference coding units according to each specific data unit. For example, the receiver 160 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 150 may determine one or more reference coding units based on the determined determination order.

According to an embodiment, the receiver 160 may obtain the determination order information of reference coding units from the bitstream as information related to the processing blocks 1502 and 1512, and the image decoding apparatus 150 may determine a determination order of one or more reference coding units included in the processing blocks 1502 and 1512 and determine one or more reference coding units, which are included in the picture 1500, based on the determination order. Referring to FIG. 15, the image decoding apparatus 150 may determine determination orders 1504 and 1514 of one or more reference coding units in the processing blocks 1502 and 1512, respectively. For example, when the determination order information of reference coding units is obtained with respect to each processing block, different types of the determination order information of reference coding units may be obtained for the processing blocks 1502 and 1512. When the determination order 1504 of reference coding units in the processing block 1502 is a raster scan order, reference coding units included in the processing block 1502 may be determined according to a raster scan order. On the contrary, when the determination order 1514 of reference coding units in the other processing block 1512 is a backward raster scan order, reference coding units included in the processing block 1512 may be determined according to the backward raster scan order.

In FIGS. 1 through 15, the method of splitting the image into the largest coding unit and the method of splitting the largest coding unit into the coding units of the hierarchical tree structure are described. In FIGS. 16 through 28, embodiments in which an ultimate motion vector expression (UMVE) mode related to adjusting of a motion vector is applied to a base motion vector of an affine mode will be described. A merge mode with motion vector difference (MMVD) mode may indicate a method of adjusting a motion vector that is the same as the UMVE mode.

Inter prediction corresponds to a prediction method for predicting a current block from a reference block that is similar to the current block, the reference block being obtained from a reference picture of a current picture. To inter predict the current block, a motion vector indicating a spatial difference between the current block and the reference block and the reference picture to which the current picture refers may be determined. Also, the current block may be predicted by referring to the reference block determined according to the motion vector and the reference picture. The UMVE mode described in the disclosure corresponds to an inter prediction mode for efficiently encoding and/or decoding the motion vector.

In the UMVE mode, a UMVE candidate list may be determined from blocks spatially adjacent to the current block or temporally adjacent to the current block. Also, the reference picture and a base motion vector of the current block may be determined from a UMVE candidate of the current block selected from the UMVE candidate list. The base motion vector of the current block may be corrected according to a correction size and a correction direction, in order to generate the motion vector of the current block.

Figure 16:
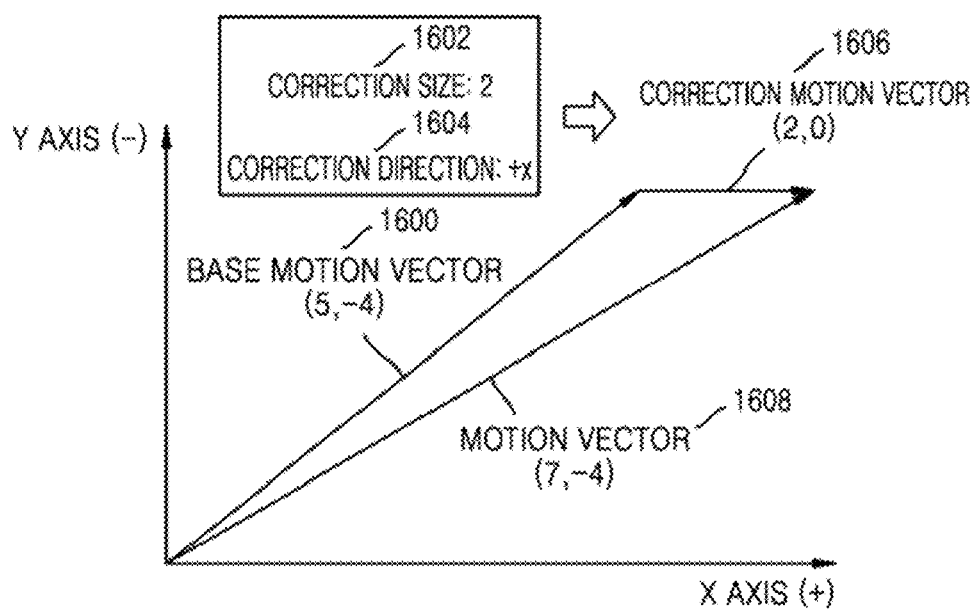
FIG. 16 illustrates an inter prediction method according to an ultimate motion vector expression (UMVE) mode.

In FIG. 16, inter prediction based on the UMVE mode will be described in detail. Referring to FIG. 16, a base motion vector 1600 obtained from a UMVE candidate of a current block may be (5, −4). However, when a reference block indicated by the base motion vector 1600 is inaccurate, a coding efficiency of the current block may be degraded. Thus, in the UMVE mode, the base motion vector 1600 may be corrected according to a correction size 1602 and a correction direction 1604.

For example, when the correction size 1602 is 2 and the correction direction 1604 is a direction of +x, a correction motion vector 1606 for correcting the base motion vector 1600 may be determined as (2, 0). Also, a sum vector (7, −4) of the base motion vector 1600 and the correction motion vector 1606 may be determined as a motion vector 1608 of the current block. Thus, the current block may be predicted by the motion vector 1608 indicating an accurate reference block. Thus, in the UMVE mode, the base motion vector 1600 may be corrected to increase the accuracy of prediction.

In the UMVE mode, in order to reduce a size of information required for correction of the base motion vector 1600, the correction size 1602 and the correction direction 1604 may have a limited number of candidates. For example, when the correction size 1602 is determined from 8 correction size candidates, correction size information indicating the correction size 1602 may be expressed as 1 bit at the least to 7 bits at the most according to a truncated unary code. Likewise, when the correction direction 1604 is determined from among 4 correction direction candidates (+x, −x, +y, and −y directions), correction direction information indicating the correction direction 1604 may be expressed as 2 bits. Thus, the number of bits required for determining the correction motion vector 1606 may be limited to 9 bits. Accordingly, the number of bits required for determining the correction motion vector 1606 in the UMVE mode may be limited to a preset number of bits, and thus, the compression efficiency may be increased.

Figure 17:
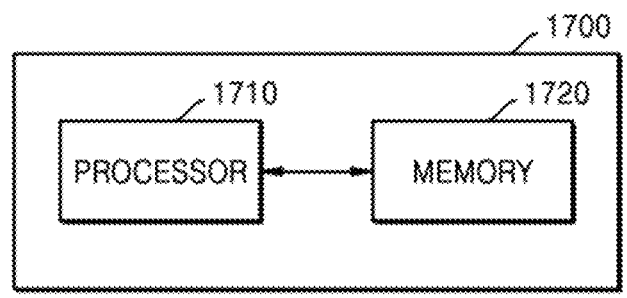
FIG. 17 illustrates a block diagram of a video decoding apparatus for decoding a current block by correcting a base motion vector determined according to an affine mode, according to a UMVE mode.

FIG. 17 illustrates a block diagram of a video decoding apparatus 1700 for decoding a current block by correcting a base motion vector determined according to an affine mode, according to an UMVE mode.

Referring to FIG. 17, the video decoding apparatus 1700 according to an embodiment may include a processor 1710 and a memory 1720.

The processor 1710 according to an embodiment may generally control the video decoding apparatus 1700. The processor 1710 according to an embodiment may execute one or more programs stored in the memory 1720.

The memory 1720 according to an embodiment may store various data, programs or applications for operating and controlling the video decoding apparatus 1700. The programs stored in the memory 1720 may include one or more instructions. The programs (the one or more instructions) or the applications stored in the memory 1720 may be executed by the processor 1710.

The processor 1710 may determine whether or not the UMVE mode is enabled for an upper data unit of a current block. The upper data unit may include a sequence, a picture, a slice, and a slice segment of the current block. For example, the processor 1710 may determine whether or not the UMVE mode is enabled for each picture unit.

The processor 1710 may determine whether or not the UMVE mode is enabled for each upper data unit. For example, the processor 1710 may determine whether or not the UMVE mode is enabled for a current sequence. Also, the processor 1710 may determine whether or not the UMVE mode is enabled with respect to a current picture included in the current sequence. Likewise, the processor 1710 may determine whether or not the UMVE mode is enabled with respect to a current slice included in the current picture.

When the UMVE mode is not enabled with respect to the current sequence, the processor 1710 may determine that the UMVE mode is not enabled for all pictures included in the current sequence. Likewise, when the UMVE mode is not enabled with respect to the current sequence, the processor 1710 may determine that the UMVE mode is not enabled with respect to all slices included in the current sequence.

The processor 1710 may obtain a UMVE enabled flag indicating whether or not the UMVE mode is enabled for the upper data unit of the current block, from a bitstream. When the UMVE enabled flag indicates that the UMVE mode is enabled for the upper data unit, the processor 1710 may determine whether or not the UMVE mode is applied to all blocks included in the upper data unit. On the contrary, when the UMVE enabled flag indicates that the UMVE mode is not enabled for the upper data unit, the processor 1710 may determine that the UMVE mode is not applied to all of the blocks included in the upper data unit.

When the UMVE enabled flag indicates 1, the UMVE enabled flag may be interpreted to indicate that the UMVE mode is enabled for the upper data unit. On the contrary, when the UMVE enabled flag indicates 0, the UMVE enabled flag may be interpreted to indicate that the UMVE mode is not enabled for the upper data unit. According to an embodiment, the meaning of the UMVE enabled flag may be interpreted in the opposite way.

The processor 1710 may obtain the UMVE enabled flag for each upper data unit. When whether or not the UMVE mode is enabled is determined for each picture unit, the processor 1710 may obtain the UMVE enabled flag for each picture unit. However, when whether or not the UMVE mode is enabled is hierarchically determined in the order of a sequence unit, a picture unit, and a slice unit, the processor 1710 may obtain the UMVE enabled flag with respect to the sequence unit, the UMVE enabled flag with respect to the picture unit, and the UMVE enabled flag with respect to the slice unit.

According to another embodiment, the UMVE enabled flag may indicate whether or not a default setting with respect to an UMVE mode is applied to the upper data unit. For example, when the UMVE enabled flag indicates 0, the UMVE enabled flag may be interpreted to indicate that the default setting with respect to the UMVE mode is applied to the upper data unit. On the contrary, when the UMVE enabled flag indicates 1, the UMVE enabled flag may be interpreted to indicate that the default setting with respect to the UMVE mode is not applied to the upper data unit. When the UMVE enabled flag is not obtained, the processor 1710 may apply the default setting with respect to the UMVE mode to the upper data unit.

The default setting with respect to the UMVE mode may indicate not to enable the UMVE mode for the upper data unit. Alternatively, the default setting with respect to the UMVE mode may indicate to apply only the UMVE mode to the upper data unit in a preset condition. The default setting with respect to the UMVE mode may be differently set for each of the sequence unit, the picture unit, and the slice unit.

The processor 1710 may determine whether or not the UMVE mode is enabled for the upper data unit, without the UMVE enabled flag, according to a preset condition. For example, when the current picture is a last picture of a group of picture (GoP), the processor 1710 may apply the default setting with respect to the UMVE mode to the upper data unit without the UMVE enabled flag. As another example, the processor 1710 may apply the default setting with respect to the UMVE mode to the upper data unit without the UMVE enabled flag, according to a temporal layer depth of the current picture.

The processor 1710 may determine whether or not another inter prediction mode is enabled, according to whether or not the UMVE mode is enabled for the upper data unit. For example, when the UMVE mode is enabled according to the UMVE enabled flag, preset inter prediction modes may not be enabled for the upper data unit. The preset inter prediction modes may include a decoder-side motion vector derivation (DMVD) mode, a decoder-side motion vector refinement (DMVR) mode, and the like.

For example, in the UMVE mode, information about a motion vector may be obtained from a bitstream. However, in the DMVD mode or the DMVR mode, the motion vector may be derived without obtaining the information about the motion vector from the bitstream. Thus, according to an embodiment, when the UMVE mode is enabled for the upper data unit, the processor 1710 may determine not to enable the DMVD mode or the DMVR mode for the upper data unit.

According to another embodiment, when the UMVE mode is enabled for the upper data unit, the processor 1710 may obtain an enabled flag with respect to the preset inter prediction mode from a bitstream with respect to the upper data unit. According to another embodiment, when the UMVE mode is enabled for the upper data unit, the processor 1710 may apply a default setting with respect to the preset inter prediction mode to the upper data unit, without obtaining the enabled flag with respect to the preset inter prediction mode. The preset inter prediction mode may include a DMVD mode, a DMVR mode, an overlapped block motion compensation (OBMC) mode, an illumination compensation (IC) mode, and the like.

When the UMVE mode is enabled for the upper data unit, the processor 1710 may additionally obtain setting information with respect to the UMVE mode applied to the upper data unit. Hereinafter, the additional information about the UMVE mode obtained by the processor 1710 will be described.

The processor 1710 may obtain, from a bitstream, information about the number of UMVE candidates, the information indicating the number of UMVE candidates of the UMVE mode enabled for the upper data unit. Also, the processor 1710 may determine UMVE candidates corresponding to the number of UMVE candidates indicated by the information about the number of UMVE candidates.

Also, the processor 1710 may obtain, from a bitstream, information about the number of correction size candidates, the information indicating the number of correction size candidates enabled for the upper data unit. Also, the processor 1710 may determine correction size candidates corresponding to the number of correction size candidates indicated by the information about the number of correction size candidates.

Also, the processor 1710 may obtain, from a bitstream, information about the number of correction direction candidates, the information indicating the number of correction direction candidates enabled for the upper data unit. Also, the processor 1710 may determine correction direction candidates corresponding to the number of correction direction candidates indicated by the information about the number of correction direction candidates.

The information about the number of UMVE candidates may indicate a difference between a minimum number of UMVE candidates and the number of UMVE candidates used for the upper data unit. For example, when the minimum number of UMVE candidates is 4 and the number of UMVE candidates used for the upper data unit is 5, the information about the number of UMVE candidates may indicate 1. Like the information about the number of UMVE candidates, the information about the number of correction size candidates and the information about the number of correction direction candidates may indicate differences between minimum numbers and the numbers of candidates used for the upper data unit.

The processor 1710 may obtain, from a bitstream, information about construction of a UMVE candidate list, the information indicating a method of constructing a UMVE candidate list. The information about the construction of the UMVE candidate list may indicate that the UMVE candidate list of the UMVE mode is constructed based on a motion vector candidate list used in a merge mode.

Alternatively, the information about the construction of the UMVE candidate list may indicate that a motion vector candidate list exclusive for the UMVE mode is constructed. For example, the motion vector candidate list exclusive for the UMVE mode may be constructed by statistically analyzing motion vector information used for decoding the current picture. When it is highly probable that a left block and an upper block of the current block are selected as UMVE candidates, the left block and the upper block of the current block may be preferentially included in the UMVE candidate list.

Alternatively, the information about the construction of the UMVE candidate list may indicate that a motion vector candidate list is constructed by combining the motion vector candidate list used in the merge mode with the motion vector candidate list exclusive for the UMVE mode.

When the information about the construction of the UMVE candidate list is not to be obtained or when the UMVE candidate list is intrinsically determined, the processor 1710 may select a method of constructing the UMVE candidate list based on a default setting.

The processor 1710 may obtain, from a bitstream, information about a correction size range with respect to a plurality of blocks of the upper data unit. Also, the processor 1710 may determine a correction size of the base motion vector based on a correction size range indicated by the information about the correction size range.

For example, the correction size range information may indicate a minimum value of a correction size candidate. When the minimum value of the correction size candidate indicated by the correction size range information is 1 and the number of correction size candidates indicated by information about the number of correction size candidates is 4, the correction size candidates may be determined as {1, 2, 4, 8}.

Also, the correction size range information may indicate a size difference between the correction size candidates. For example, the correction size range information may indicate whether the value of the correction size candidates is arithmetically increased or exponentially increased. When the value of the correction size candidates is arithmetically increased, the correction size candidates may be determined as {1, 2, 3, 4, 5, . . . }. Also, when the value of the correction size candidates is exponentially increased, the correction size candidates may be determined as {1, 2, 4, 8, 16, . . . }.

Also, the correction size range information may indicate one of a plurality of preset correction size candidate sets. For example, the correction size range information may indicate one of a first correction size candidate set of {1, 2, 4, 8}, a second correction size candidate set of {1, 2, 3, 4}, and a third correction size candidate set of {4, 8, 16, 32}.

The processor 1710 may obtain information about a correction size change with respect to the plurality of blocks of the upper data unit, from a bitstream. The correction size change information may indicate whether or not a range of the correction size candidates is changed according to a temporal distance between a current picture and a reference picture. Thus, when the correction size change information indicates a change of the range of the correction size candidates, the processor 1710 may determine the range of the correction size candidates according to the temporal distance between the current picture and the reference picture.

Generally, when the current block refers to a reference block of the reference picture temporally far from the current picture, it is probable that the base motion vector may have a greater error. On the contrary, when the current block refers to a reference block of the reference picture temporally adjacent to the current picture, it is probable that the base motion vector may have a little error. Thus, when the correction size candidate set is determined according to the temporal distance between the current picture and the reference picture, prediction accuracy of the motion vector may be increased.

For example, when the temporal distance is small between the current picture and the reference picture, the minimum value of the correction size candidate may be determined as ½. Also, when the temporal distance is intermediate between the current picture and the reference picture, the minimum value of the correction size candidate may be determined as 1. Also, when the temporal distance is large between the current picture and the reference picture, the minimum value of the correction size candidate may be determined as 2.

The temporal distance between the current picture and the reference picture may be determined based on one or more threshold values. For example, when there are three threshold values, the minimum value of the correction size candidate may be determined by comparing the temporal distance between the current picture and the reference picture with the three threshold values.

The processor 1710 may determine a minimum value of a correction size candidate of the upper data unit based on the minimum value of the correction size candidate of the correction size range information and the temporal distance between the current picture and the reference picture. In detail, the minimum value of the correction size candidate of the correction size range information may be changed according to the temporal distance between the current picture and the reference picture, so that the minimum value of the correction size candidate of the upper data unit may be determined.

When the processor 1710 may not obtain the correction size change information or when whether or not to change the correction size is intrinsically determined, the processor 1710 may determine whether or not to change the correction size according to a default setting.

The processor 1710 may obtain, from a bitstream, information about enabling of a change of a prediction direction with respect to the plurality of blocks of the upper data unit. The current block may obtain the information about a prediction direction of the reference picture together with information about the base motion vector from a UMVE candidate selected from the UMVE candidate list. When the change of the prediction direction is not enabled according to the information about the enabling of the change of the prediction direction, a prediction direction of the UMVE candidate may be applied to the current block. However, when the change of the prediction direction is enabled according to the information about the enabling of the change of the prediction direction, a prediction direction which is different from the prediction direction of the UMVE candidate may be applied to the current block.

The prediction direction may indicate one of list 0 uni-prediction, list 1 uni-prediction, and bi-prediction using both of list 0 uni-prediction and list 1 uni-prediction. In the case of uni-prediction, only one of a reference block of list 0 and a reference block of list 1 may be used for predicting the current block. However, in the case of bi-prediction, the reference block of list 0 and the reference block of list 1 may be used together. Therefore, bi-prediction may have a higher prediction accuracy than uni-prediction. Thus, when the change of the prediction direction is enabled, the prediction direction of the UMVE mode may be determined as bi-prediction even when the UMVE candidate indicates uni-prediction, and thus, the coding efficiency according to the UMVE mode may be increased.

Thus, when the change of the prediction direction is enabled according to the information about the enabling of the change of the prediction direction, the processor 1710 may change the prediction direction of the current block. For example, when the change of the prediction direction is enabled, the prediction direction of the current block may be determined as list 1 uni-prediction or bi-prediction, even when the prediction direction of the UMVE candidate is list 0 uni-prediction.

The processor 1710 may obtain information about a main prediction direction with respect to the upper data unit from a bitstream. The main prediction direction information may indicate whether or not there is a main prediction direction with respect to the upper data unit. Also, when there is the main prediction direction with respect to the upper data unit, the main prediction direction information may indicate the main prediction direction of the upper data unit. When the main prediction direction of the upper data unit is set, blocks to which the UMVE mode is applied, the blocks being included in the upper data unit, may be predicted according to the main prediction direction. For example, when the main prediction direction is determined as bi-prediction, the blocks to which the UMVE mode is applied may be bi-predicted. Thus, even when the prediction direction of the UMVE candidate is uni-prediction, the prediction direction of the current block may be determined as bi-prediction.

The processor 1710 may obtain both of the information about the enabling of the change of the prediction direction and the main prediction direction information. When the information about the enabling of the change of the prediction direction indicates enabling of the change of the prediction information, and the main prediction direction information indicates setting of the main prediction direction, prediction direction information obtained by the processor 1710 may indicate whether or not the prediction direction of the current block is a main prediction direction. For example, when the main prediction direction is bi-prediction and the prediction direction information indicates that the prediction direction of the current block is the main prediction direction, the prediction direction of the current block may be determined as bi-prediction. When the main prediction direction is bi-prediction and the prediction direction information indicates that the prediction direction of the current block is not the main prediction direction, the prediction direction of the current block may be determined as an auxiliary prediction direction, such as list 0 uni-prediction or list 1 uni-prediction, according to the prediction direction information.

The processor 1710 may obtain, from a bitstream, information about enabling of a plurality of corrections, the information indicating whether or not a corrected base motion vector is to be corrected a number of times. When the base motion vector is to be corrected a number of times according to the information about enabling of the plurality of corrections, the processor 1710 may correct the base motion vector a number of times.

When the UMVE mode is enabled for the upper data unit, the processor 1710 may determine whether or not the UMVE mode is applied to the current block. The processor 1710 may obtain, from a bitstream, a UMVE flag indicating whether or not the UMVE mode is applied to the current block. For example, when the UMVE flag indicates that the UMVE mode is applied to the current block, the processor 1710 may determine the prediction mode of the current block as the UMVE mode. On the contrary, when the UMVE flag indicates that the UMVE mode is not applied to the current block, the processor 1710 may not determine the prediction mode of the current block as the UMVE mode.

When the UMVE mode is applied to the current block, the processor 1710 may determine that another inter prediction mode is not applied to the current block. For example, when the UMVE mode is applied to the current block according to the UMVE flag, preset inter prediction modes may not be applied to the current block. The preset inter prediction modes may include a DMVD mode, a DMVR mode, an OBMC mode, an IC mode, and the like. On the contrary, when the UMVE mode is applied to the current block, the processor 1710 may determine that a specific prediction mode is applied to the current block.

Also, when the UMVE mode is not applied to the current block, the processor 1710 may determine that other intra prediction modes are applied to the current block. For example, the intra prediction mode may include a DMVD mode, a DMVR mode, an OBMC mode, an IC mode, and the like.

When the UMVE mode is applied to the current block, the processor 1710 may determine the base motion vector of the current block from a UMVE candidate. The processor 1710 may determine a UMVE candidate list according to a method of constructing a UMVE candidate list according to information about construction of a UMVE candidate list. The number of UMVE candidates included in the UMVE candidate list may be determined according to information about the number of UMVE candidates.

The processor 1710 may obtain, from a bitstream, a UMVE index indicating a UMVE candidate from the UMVE candidate list, the UMVE candidate including the base motion vector and the reference picture of the current block. Also, the processor 1710 may determine the base motion vector and the reference picture of the current block according to the UMVE index.

The processor 1710 may determine a correction size and a correction direction for correcting the base motion vector. The base motion vector may be corrected for the accuracy of prediction in the UMVE mode. Thus, in order to determine a correction motion vector for correcting the base motion vector, the processor 1710 may determine a correction size indicating a size of the correction motion vector and a correction direction indicating a direction of the correction motion vector.

The processor 1710 may determine correction size candidates according to information about the number of correction size candidates, information about a correction size range, and information about a correction size change with respect to the upper data unit. The processor 1710 may determine the number of correction size candidates according to the information about the number of correction size candidates. Also, the processor 1710 may determine a difference between a minimum value of the correction size candidate and the correction size candidate according to the correction size range information. Also, when the correction size change information indicates a change of a range of the correction size candidates, the processor 1710 may determine the range of the correction size candidates according to a distance between the current picture and the reference picture. For example, the minimum value of the correction size candidate may be changed by comparing the distance between the current picture and the reference picture with a preset threshold value. Thus, the range of the correction size candidates may be determined according to the changed minimum value.

The processor 1710 may obtain, from a bitstream, information about a correction size, the information indicating a correction size of the base motion vector. The correction size information may indicate a correction size candidate corresponding to the correction size of the base motion vector from among a preset number of correction size candidates. The processor 1710 may determine the correction size of the base motion vector according to the correction size candidate indicated by the correction size information.

The processor 1710 may determine correction direction candidates according to information about the number of correction directions with respect to the upper data unit. Also, the processor 1710 may determine a correction direction from the preset number of correction direction candidates.

The processor 1710 may obtain correction direction information indicating a correction direction of the base motion vector from a bitstream. The correction direction information may indicate a correction direction candidate corresponding to the correction direction of the base motion vector from among the preset number of correction direction candidates. The processor 1710 may determine the correction direction of the base motion vector according to the correction direction candidate indicated by the correction direction information.

The processor 1710 may determine a motion vector of the current block by correcting the base motion vector according to the determined correction size and the determined correction direction. For example, when the correction size is 2 and the correction direction is +x, a motion vector having an x value increased by 2 from the base motion vector may be used for prediction of the current block.

Figure 18:
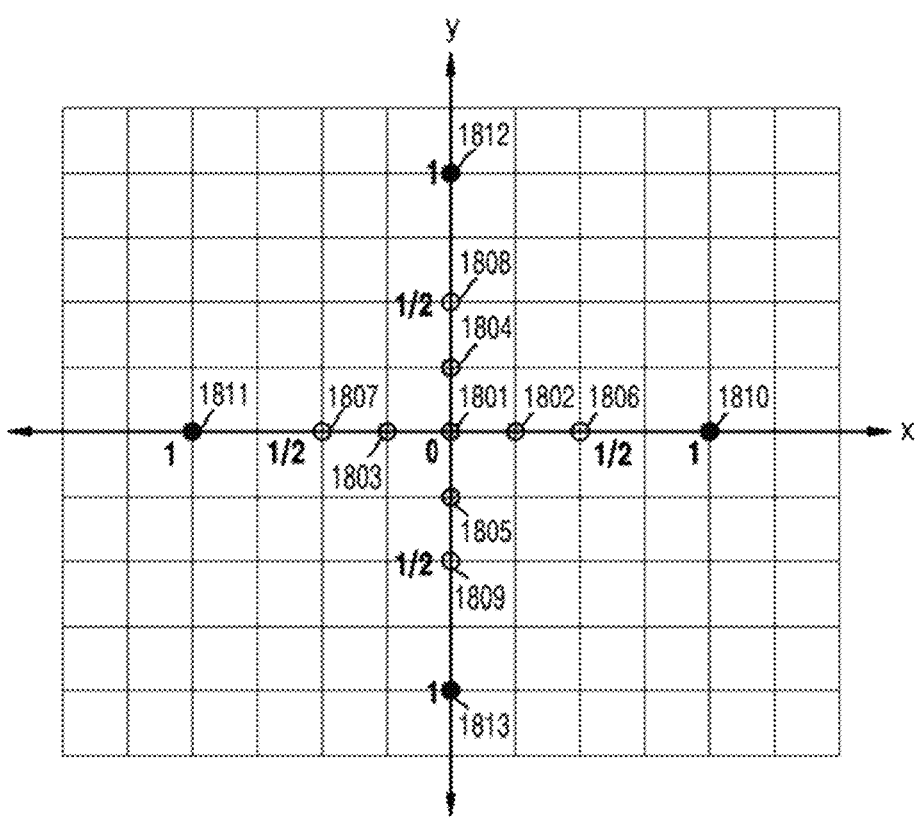
FIG. 18 illustrates motion vector candidates of a UMVE mode that have a diamond-shape distribution based on a base motion vector.
Figure 19:
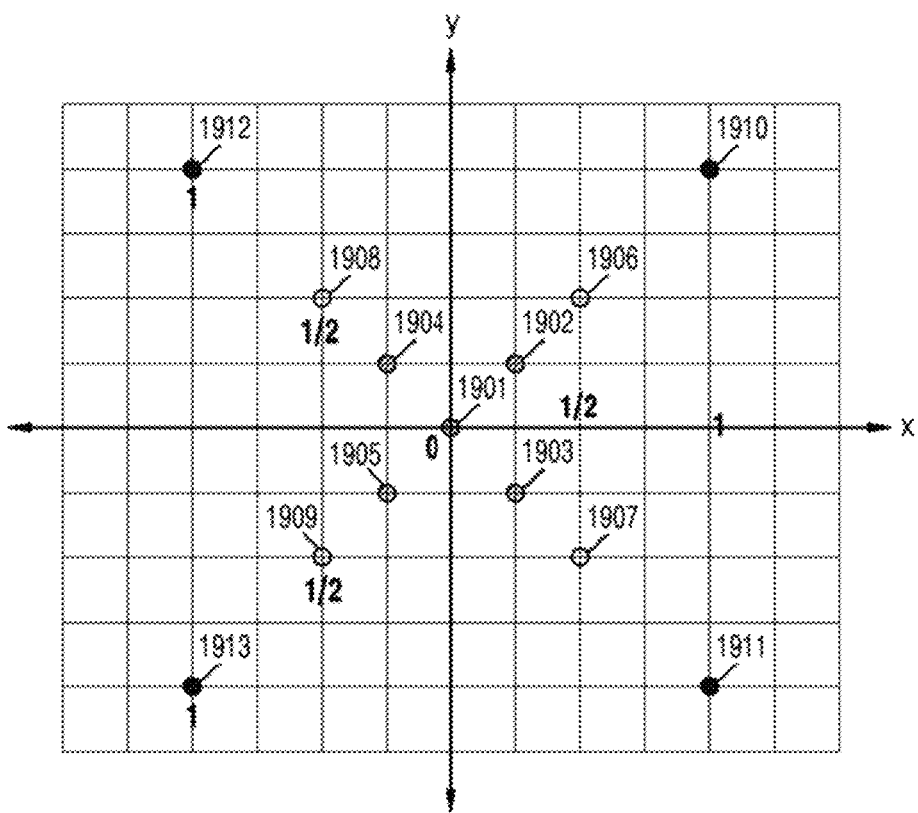
FIG. 19 illustrates motion vector candidates of a UMVE mode that have a rectangular-shape distribution based on a base motion vector.
Figure 20:
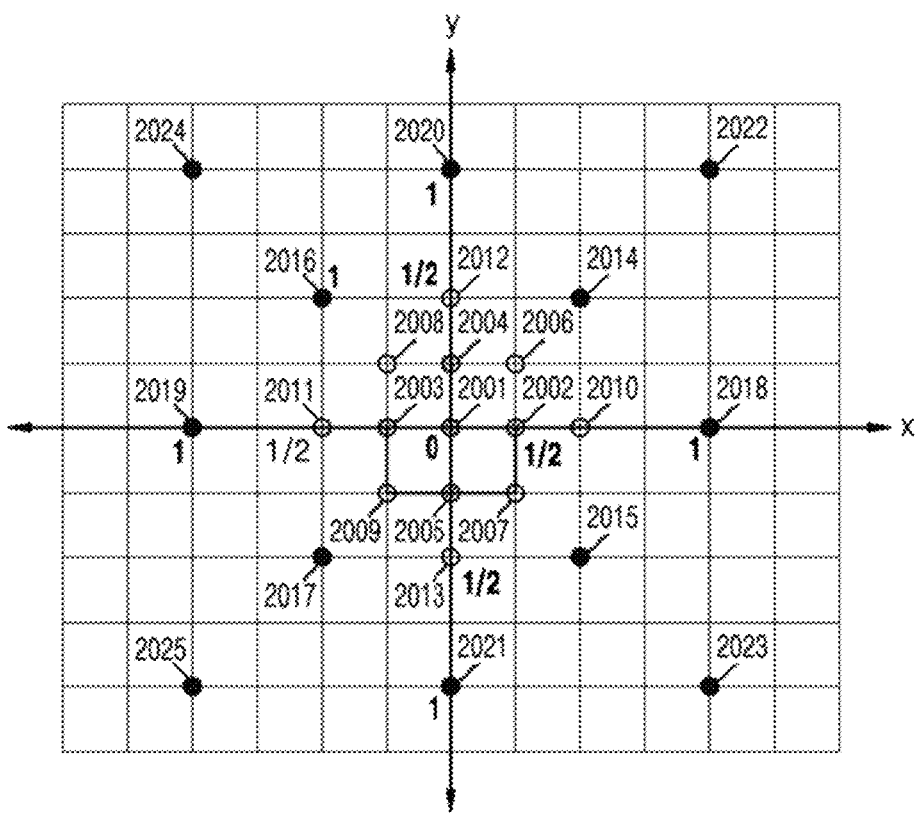
FIG. 20 illustrates a UMVE mode according to an embodiment, the UMVE mode having a different number of motion vector candidates for each of groups.
Figure 21:
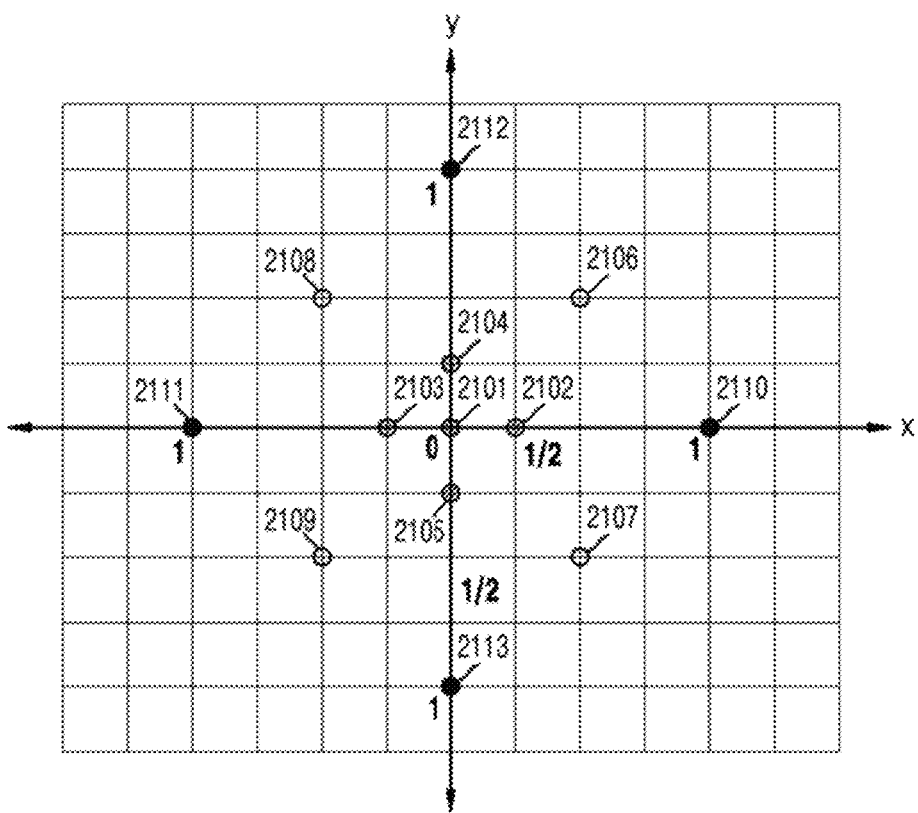
FIG. 21 illustrates a UMVE mode according to an embodiment, the UMVE mode having a different shape distribution of motion vector candidates for each of groups.

FIGS. 18 through 21 are views for describing a process of determining a motion vector of a current block in a UMVE mode. In FIGS. 18 and 21, a coordinate indicated by the base motion vector is set as (base_x, base_y). Also, a correction motion vector according to a correction size and a correction direction of the UMVE mode is described based on the coordinate (base_x, base_y).

Referring to FIG. 18, the processor 1710 may determine motion vector candidates having a diamond-shape distribution based on the base motion vector.

The processor 1710 may determine motion vector candidates (base_x+¼, base_y) 1802, (base_x−¼, base_y) 1803, (base_x, base_y+¼) 1804, and (base_x, base_y−¼) 1805, which are within a distance of a ¼ pixel from the base motion vector (base_x, base_y) 1801, as a first candidate group.

The processor 1710 may determine motion vector candidates (base_x+½, base_y) 1806, (base_x−½, base_y) 1807, (base_x, base_y+½) 1808, and (base_x, base_y−½) 1809, which are within a distance of a ½ pixel from the base motion vector (base_x, base_y) 1801, as a second candidate group.

The processor 1710 may determine motion vector candidates (base_x+1, base_y) 1810, (base_x−1, base_y) 1811, (base_x, base_y+1) 1812, and (base_x, base_y−1) 1813, which are within a distance of a pixel from the base motion vector (base_x, base_y) 1801, as a third candidate group.

The processor 1710 may select one of the first through third candidate groups according to a correction distance. Also, the processor 1710 may determine a motion vector candidate of one of the candidate groups as the motion vector of the current block according to the correction direction.

Referring to FIG. 19, the processor 1710 may determine prediction motion vector candidates having a square-shape distribution based on a base motion vector.

Likewise, the processor 1710 may determine motion vector candidates (base_x+¼, base_y+¼) 1902, (base_x+¼, base_y−¼) 1903, (base_x−¼, base_y+¼) 1904, and (base_x−¼, base_y−¼) 1905, which are within a distance of about a ¼ pixel from the base motion vector (base_x, base_y) 1901, as a first candidate group.

The processor 1710 may determine motion vector candidates (base_x+½, base_y+½) 1906, (base_x+½, base_y−½) 1907, (base_x−½, base_y+½) 1908, and (base_x−½, base_y−½) 1909, which are within a distance of about a ½ pixel from the base motion vector (base_x, base_y) 1901, as a second candidate group.

The processor 1710 may determine motion vector candidates (base_x+1, base_y+1) 1910, (base_x+1, base_y−1) 1911, (Base_x−1, Base_y+1) 1912, and (base_x−1, base_y−1) 1913 which are within a distance of a pixel from the base motion vector (base_x, base_y) 1901, as a third candidate group.

Referring to FIG. 20, a video decoding apparatus 1730 may determine a different number of motion vector candidates for each candidate group. Although a distance between each pixel corresponds to a ¼ pixel, for convenience, component values of vector candidates are expressed via four-times scaling hereinafter.

In detail, the processor 1710 may determine eight motion vector candidates (base_x+¼, base_y/4) 2002, (base_x−¼, base_y) 2003, (base_x, base_y+¼) 2004, (base_x, base_y−¼) 2005, (base_x+¼, base_y+¼) 2006, (base_x+¼, base_y−¼) 2007, (base_x−¼, base_y+¼) 2008, and (base_x−¼, base_y−¼) 2009, which are within a distance of about a ¼ pixel from a base motion vector, as a first candidate group.

Also, the processor 1710 may determine eight motion vector candidates (base_x+½, base_y) 2010, (base_x−½, base_y) 2011, (base_x, base_y+½) 2012, (base_x, base_y−½) 2013, (base_x+½, base_y+½) 2014, (base_x+½, base_y−½) 2015, (base_x−½, base_y+½) 2016, and (base_x−½, base_y−½) 2017, which are within a distance of about a ½ pixel from the base motion vector, as a second candidate group.

The processor 1710 may determine eight motion vector candidates (base_x+1, base_y) 2018, (base_x−1, base_y) 2019, (base_x, base_y+1) 2020, (base_x, base_y−1) 2021, (base_x+1, base_y+1) 2022, (base_x+1, base_y−1) 2023, (base_x−1, base_y+1) 2024, and (base_x−1, base_y−1) 2025, which are within a distance of about one pixel from the base motion vector, as a third candidate group.

Referring to FIG. 21, the processor 1710 may differently determine a distribution shape of motion vector candidates included in each candidate group. In detail, the processor 1710 may determine motion vector candidates 2102, 2103, 2104, and 2105 having a diamond-shape distribution based on a base motion vector 2101 as a first candidate group. Also, the processor 1710 may determine motion vector candidates 2106, 2107, 2108, and 2109 having a square-shape distribution based on the base motion vector 2101 as a second candidate group. Also, the processor 1710 may determine motion vector candidates 2110, 2111, 2112, and 2113 having a diamond-shape distribution based on the base motion vector 2101 as a third candidate group. As illustrated in FIG. 21, the distribution of the motion vector candidates of each candidate group may be determined as other various ways in addition to the distribution shapes illustrated in FIG. 21.

The processor 1710 may determine one or more base motion vectors. When there are two base motion vectors, motion vector candidates may be generated by using each of the base motion vectors.

The processor 1710 may perform bi-prediction. When the base motion vector is bi-predicted by using reference pictures in list 0 and list 1, motion vectors of each prediction direction may be corrected according to a temporal distance between a current picture and the reference picture.

For example, when the reference picture of list 0 and the reference picture of list 1 are located in the same direction from the current picture, a correction direction of a base motion vector with respect to list 0 and a correction direction of a base motion vector with respect to list 1 may be identically determined. On the contrary, when the reference picture of list 0 and the reference picture of list 1 are located in opposite directions to each other from the current picture, a correction direction of the base motion vector of list 0 may be determined to be the opposite to a correction direction of the base motion vector of list 1.

Also, a correction size of the base motion vector of list 0 and a correction size of the base motion vector of list 1 may be determined to be proportionate to the temporal distance between the reference picture of list 0 and the current picture and the temporal distance between the reference picture of list 1 and the current picture, respectively. Thus, when the temporal distance of the reference picture of list 0 and the current picture is twice the temporal distance of the reference picture of list 1 and the current picture, the correction size of the base motion vector of list 0 may be determined to be twice the correction size of the base motion vector of list 1.

A correction size and a correction direction indicated by correction size information and correction direction information obtained from a bitstream may be applied to the base motion vector of list 0.

The correction size and the correction direction used to correct the base motion vector of list 0 may be changed by taking into account a distance between the reference picture of list 0 and the current picture and a distance between the reference picture of list 1 and the current picture. Also, the changed correction size and correction direction may be applied to the base motion vector of list 1.

According to an embodiment, in a reverse way, the correction size and the correction direction indicated by the correction size information and the correction direction information may be applied to the base motion vector of list 1 and the changed correction size and correction direction may be applied to the base motion vector of list 0.

Figure 22:
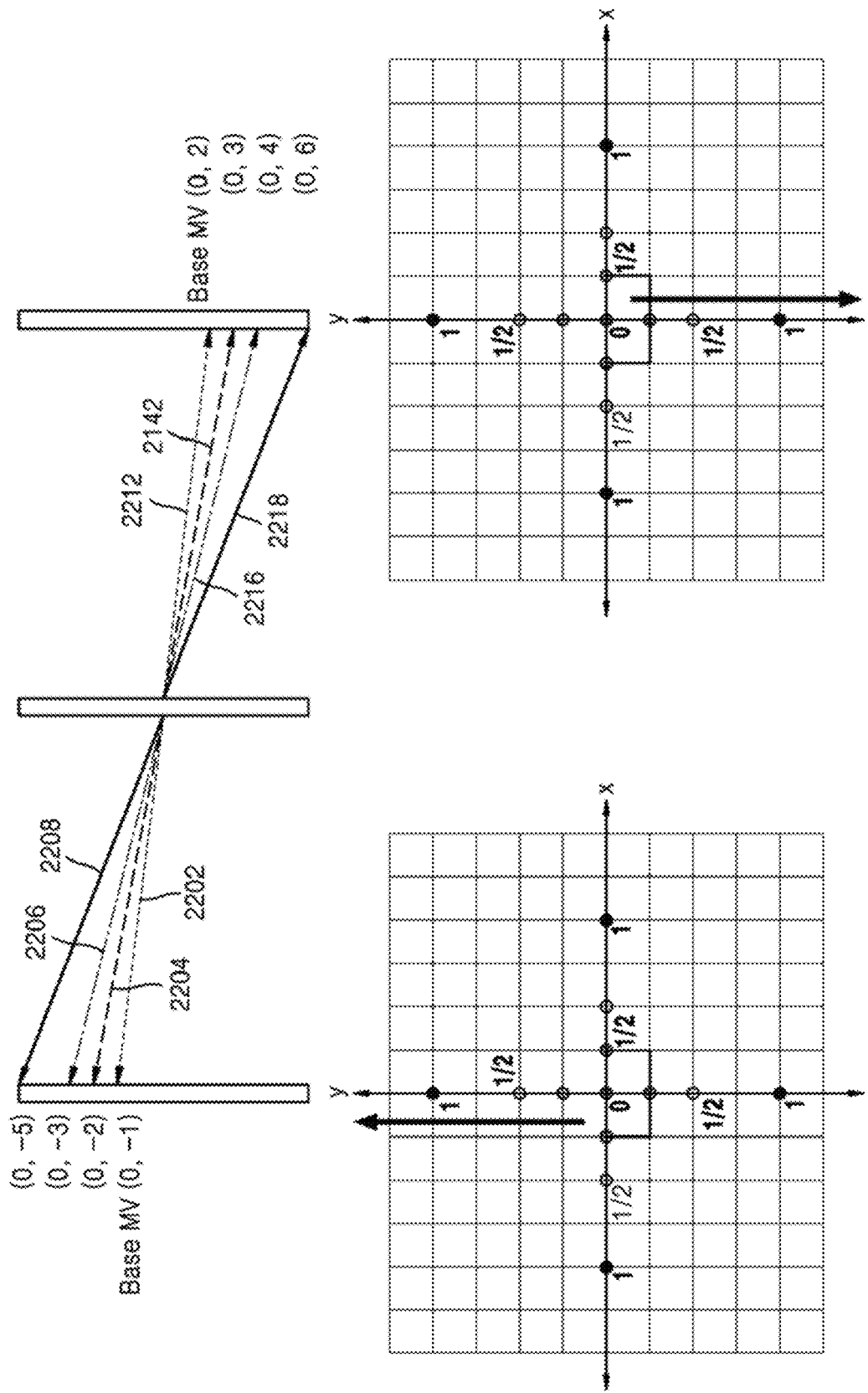
FIG. 22 illustrates a method of correcting two base motion vectors according to bi-prediction, according to an embodiment.

FIG. 22 illustrates a method of correcting two base motion vectors according to bi-prediction, according to an embodiment. In FIG. 22, a base motion vector 2202 of list 0 indicates (0, −1). Also, a base motion vector 2212 of list 1 indicates (0, 2).

In a UMVE mode, a correction size and a correction direction may be applied to both of the base motion vector 2202 of list 0 and the base motion vector 2212 of list 1. When the correction size is 1 and the correction direction is −y with respect to the base motion vector 2202 of list 0, a motion vector 2204 of list 0 may be (0, −2).

A reference picture of list 0 and a reference picture of list 1 may be located in opposite directions from a current picture. Thus, the correction direction of the base motion vector 2212 of list 1 may be determined to be the opposite to the correction direction of the base motion vector 2202 of list 0. Thus, the correction direction of the base motion vector 2212 of list 1 may be determined as +y.

The reference picture of list 0 and the reference picture of list 1 may be apart from the current picture by the same temporal distance. Thus, the correction size of the base motion vector 2212 of list 1 may be determined as the same as the correction size of the base motion vector 2202 of list 0. Thus, the correction size of the base motion vector 2212 of list 1 may be determined as 1.

Thus, a motion vector 2214 of list 1 may be determined as (0, 3), which has a y component that is greater than that of the base motion vector 2212 of list 1 by 1.

When the correction size of the base motion vector 2202 in a direction of list 0 is 2, a motion vector 2206 in the direction of list 0 may be determined as (0, −3) and a motion vector 2216 in a direction of list 1 may be determined as (0, 4). Also, when the correction size of the base motion vector 2202 in the direction of list 0 is 4, a motion vector 2208 in the direction of list 0 may be determined as (0, −5) and a motion vector 2218 in the direction of list 1 may be determined as (0, 6).

When a change of a prediction direction is enabled according to information about enabling of a change of a prediction direction, the processor 1710 may obtain prediction direction information from a bitstream and may change a prediction direction of the current block according to the prediction direction information. The prediction direction information may indicate whether or not to change the prediction direction. When the prediction direction information does not indicate to change the prediction direction, the current block may be predicted according to a prediction direction of a UMVE candidate. However, when the prediction direction information indicates to change the prediction direction, the current block may be predicted according to a prediction direction that is different from the prediction direction of the UMVE candidate.

Additionally, the prediction direction information may indicate a changed prediction direction. For example, when the prediction direction of the UMVE candidate is list 0 uni-prediction, the prediction direction information may indicate one of list 1 uni-prediction and bi-prediction. Thus, the prediction direction information may indicate whether or not to change the prediction direction and the changed prediction direction.

When there is no change in the prediction direction, the prediction direction information may be set as 0. When there is a change in the prediction direction, the prediction direction information may be set as 10 or 11 according to the changed prediction direction. For example, when the prediction direction of the UMVE candidate is list 0 uni-prediction, the prediction direction information may be set as 0, when the prediction direction of the current block is list 0 uni-direction.

When the prediction direction of the current block is bi-prediction or list 1 uni-prediction, the prediction direction information may be set as 10 or 11. According to an embodiment, when the prediction direction of the UMVE candidate is uni-prediction and the prediction direction of the current block is bi-prediction, the prediction direction information may be set as 10. According to an embodiment, when the prediction direction of the UMVE candidate is uni-prediction and the prediction direction of the current block is uni-prediction in a different direction, the prediction direction information may be set as 11.

As another example, when the prediction direction of the UMVE candidate is list 1 uni-prediction, the prediction direction information may be set as 0, when the prediction direction of the current block is list 1 uni-direction.

When the prediction direction of the current block is bi-prediction or list 0 uni-prediction, the prediction direction information may be set as 10 or 11. According to an embodiment, when the prediction direction of the UMVE candidate is uni-prediction and the prediction direction of the current block is bi-prediction, the prediction direction information may be set as 10. According to an embodiment, when the prediction direction of the UMVE candidate is uni-prediction and the prediction direction of the current block is uni-prediction in a different direction, the prediction direction information may be set as 11.

As another example, when the prediction direction of the UMVE candidate is bi-prediction, the prediction direction information may be set as 0, when the prediction direction of the current block is bi-prediction.

When the prediction direction of the current block is list 0 uni-prediction or list 1 uni-prediction, the prediction direction information may be set as 10 or 11. According to an embodiment, when the prediction direction of the UMVE candidate is bi-prediction and the prediction direction of the current block is list 0 uni-prediction, the prediction direction information may be set as 10. According to an embodiment, when the prediction direction of the UMVE candidate is bi-prediction and the prediction direction of the current block is list 1 uni-prediction, the prediction direction information may be set as 11.

When the prediction direction information indicates a change in the prediction direction, the processor 1710 may change a motion vector of the UMVE candidate according to the changed prediction direction. For example, when the prediction direction of the UMVE candidate is list 0 uni-prediction and the prediction direction of the current block is list 1 uni-prediction, a motion vector of list 0 may be corrected to be appropriate for prediction according to the reference picture of list 1. In detail, the motion vector of list 0 may be corrected via scaling according to a ratio of a temporal distance between the reference picture of list 0 and the current picture to a temporal distance between the reference picture of list 1 and the current picture.

For example, when the motion vector of list 0 is (8, 6) and the ratio of the temporal distance between the reference picture of list 0 and the current picture to the temporal distance between the reference picture of list 1 and the current picture is 2:1, a motion vector of list 1 may be determined as (4, 3). When the ratio between the temporal distances is 2:−1, that is, when the reference picture of list 1 and the reference picture of list 0 are located in different directions from each other with respect to the current picture, the motion vector of list 1 may be determined as (−4, −3).

When the prediction direction of the UMVE candidate is list 0 uni-prediction and the prediction direction of the current block is bi-prediction, the motion vector of list 1 may be obtained based on the motion vector of list 0 of the UMVE candidate. The motion vector of list 1 may be obtained by scaling the motion vector with respect to the reference picture of list 0 according to the ratio of the temporal distance between the reference picture of list 0 and the current picture to the temporal distance between the reference picture of list 1 and the current picture. Also, the reference picture of list 1 may be determined as a picture located in a preset order of list 1. Also, both of the reference picture and the motion vector of list 0 and the reference picture and the motion vector of list 1 may be used for prediction of the current block.

Likewise, when the prediction direction of the UMVE candidate is list 1 uni-prediction and the prediction direction of the current block is bi-prediction, the motion vector of list 0 may be obtained from the motion vector of list 1. Also, the reference picture of list 0 may be determined as a picture located in a preset order of list 0. Also, both of the reference picture and the motion vector of list 0 and the reference picture and the motion vector of list 1 may be used for prediction of the current block.

When the prediction direction of the UMVE candidate is bi-prediction and the prediction direction of the current block is list 0 uni-prediction, only the motion vector and the reference picture of list 0 from among the motion vector and the reference picture of list 0 and the motion vector and the reference picture of list 1 may be used to predict the current block. On the contrary, when a pre-change prediction direction is bi-prediction and a changed prediction direction is list 1 uni-prediction, only the motion vector and the reference picture of list 1 from among the motion vector and the reference picture of list 0 and the motion vector and the reference picture of list 1 may be used to predict the current block.

When main prediction direction information is obtained, the processor 1710 may change the motion vector of the UMVE candidate according to a main prediction direction indicated by the main prediction direction information. When the main prediction direction of the current picture and a reference direction of the UMVE candidate are the same, the current block may be predicted according to the reference picture and the motion vector of the UMVE candidate. However, when the main prediction direction of the current picture and the reference direction of the UMVE candidate are different from each other, the motion vector of the UMVE candidate may be changed according to the main prediction direction. The changing of the motion vector and the reference picture of the UMVE candidate according to the main prediction direction may be performed by using the same method used for changing the motion vector and the reference picture of the UMVE candidate according to the prediction direction information.

According to an embodiment, when the main prediction direction information is obtained and the change of the prediction direction is enabled according to the information about the enabling of the change of the prediction direction, the processor 1710 may change a prediction direction of the current block according to the prediction direction information. When the main prediction direction information is set, the prediction direction information may indicate the prediction direction of the current block, from the main prediction direction and two auxiliary prediction directions. When the prediction direction information indicates the main prediction direction, the current block may be predicted according to the main prediction direction. However, when the prediction direction information indicates the auxiliary prediction directions, the current block may be predicted according to one of the two auxiliary prediction directions that is indicated by the prediction direction information. When the main prediction direction information is set, in the prediction direction information, 0 may be assigned to the main prediction direction, 10 may be assigned to a first auxiliary prediction direction, and 11 may be assigned to a second auxiliary prediction direction. Also, the two auxiliary prediction directions with respect to the main prediction direction may be determined in various ways according to an embodiment.

When the base motion vector may be corrected a number of times according to information about enabling of a plurality of corrections, the processor 1710 may correct a corrected base motion vector once more. Thus, the processor 1710 may obtain additional correction size information and additional correction direction information from a bitstream. Also, the processor 1710 may correct the base motion vector once more based on an additional correction size determined according to the additional correction size information and an additional correction direction determined according to the additional correction direction information.

When a correction size is equal to or greater than a threshold value, the processor 1710 may obtain the additional correction size information and the additional correction direction information. Also, the additional correction size and the additional correction direction indicated by the additional correction size information and the additional correction direction information may be restricted according to the correction size and the correction direction. For example, the additional correction size may be determined to be less than the correction size. Alternatively, the additional correction direction may be determined to be different from the correction direction.

The processor 1710 may reconstruct the current block based on the motion vector and the reference picture of the current block. When the prediction direction of the current block is list 0 uni-prediction or list 1 uni-prediction, the processor 1710 may predict the current block by using one motion vector and one reference picture. When the prediction direction of the current block is bi-prediction, the processor 1710 may predict the current block by using the motion vector and the reference picture of list 0 and the motion vector and the reference picture of list 1.

Above, the method of adjusting the motion vector according to the UMVE mode is described. Hereinafter, a method of adjusting a base motion vector according to an affine mode by using the same process as the method of adjusting the motion vector according to the UMVE mode will be described.

Figure 23:
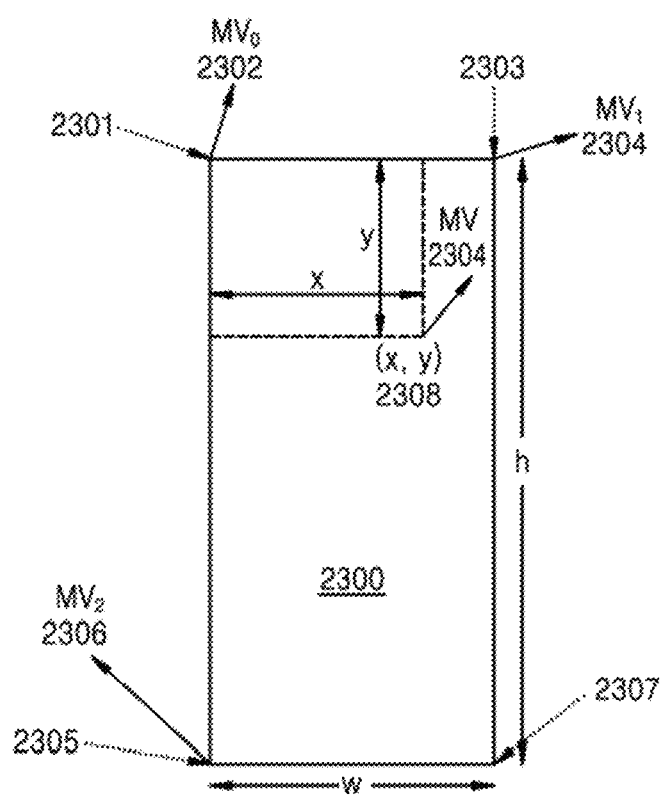
FIG. 23 illustrates a method of deriving a motion vector applied to a sample of a current block in an affine mode.

First, FIG. 23 illustrates in detail a method of deriving a motion vector applied to a sample of a current block 2300 in an affine mode. The processor 1710 may adjust motion vectors used in the affine mode according to the UMVE mode.

In the affine mode, at least three affine parameters may be required to derive the motion vector of the sample of the current block 2300. In detail, the affine mode may include a 6-parameter affine mode, a 4-parameter affine mode, and a 3-parameter affine mode. Hereinafter, the method of deriving the motion vector of the sample of the current block 2300 according to each affine mode will be described.

In the 6-parameter affine mode, the processor 1710 may obtain three motion vectors 2302, 2304, and 2306 from peripheral samples 2301, 2303, and 2305 of the current block 2300. The first motion vector 2302 may be obtained from the peripheral samples of an upper left coordinate 2301 of the current block 2300. Also, the second motion vector 2304 may be obtained from the peripheral samples of an upper right coordinate 2303 of the current block 2300. Also, the third motion vector 2306 may be obtained from the peripheral samples of a lower left coordinate 2305 of the current block 2300. Although, in FIG. 23, the third motion vector 2306 is obtained based on the lower left coordinate 2305 of the current block 2300, the third motion vector 2306 may be obtained based on a lower right coordinate 2307 of the current block 2300 according to an embodiment. Also, the processor 1710 may determine an x component and a y component of the first motion vector 2302, an x component and a y component of the second motion vector 2304, and an x component and a y component of the third motion vector 2306 as the affine parameters.

According to an embodiment, the first motion vector 2302 may be determined as an average of motion vectors of a plurality of adjacent blocks adjacent to the upper left coordinate 2301 of the current block 2300. Likewise, the second motion vector 2304 may be determined as an average of motion vectors of a plurality of adjacent blocks adjacent to the upper right coordinate 2303 of the current block 2300.

Also, the third motion vector 2306 may be determined as an average of motion vectors of a plurality of adjacent blocks adjacent to the lower left coordinate 2305 or the lower right coordinate 2307 of the current block 2300.

A motion vector 2310 of a sample 2308 of the current block 2300 may be determined based on the first motion vector 2302, the second motion vector 2304, and the third motion vector 2306 according to Equations 1 through 3.

In Equations 1 through 3, x denotes a difference of a horizontal distance between the upper left coordinate 2301 of the current block 2300 and the sample 2308 of the current block 2300, and y denotes a vertical distance between the upper left coordinate 2301 of the current block 2300 and the sample 2308 of the current block 2300. $MV_0$ denotes the first motion vector 2303, $MV_1$ denotes the second motion vector 2304, and $MV_2$ denotes the third motion vector 2306. MV denotes the motion vector 2310 of the sample 2308 of the current block 2300. w denotes a width of the current block 2300 and h denotes a height of the current block 2300. $dMV_x$ denotes a horizontal change rate of the motion vector 2310 and $dMV_y$ denotes a vertical change rate of the motion vector 2310.

$$dMV_x = (MV_1 - MV_0)/w \quad \text{[Equation 1]}$$

$$dMV_y = (MV_2 - MV_0)/h \quad \text{[Equation 2]}$$

$$MV = MV_0 + x \cdot dMV_x + y \cdot dMV_y \quad \text{[Equation 3]}$$

Equation 1 indicates a method of obtaining the horizontal change rate $dMV_x$ of the motion vector 2310. According to Equation 1, the horizontal change rate of the motion vector 2310 may be obtained by dividing a value, generated by subtracting the first motion vector 2302 from the second motion vector 2304, over a width of the current block 2300.

Equation 2 indicates a method of obtaining the vertical change rate $dMV_y$ of the motion vector 2310. According to Equation 2, the vertical change rate of the motion vector 2310 may be obtained by dividing a value, generated by subtracting the first motion vector 2302 from the third motion vector 2306, over a height of the current block 2300.

Equation 3 indicates a method of obtaining the motion vector 2310. According to Equation 2, the motion vector 2310 may be determined by summing the first motion vector $MV_0$ 2302 with inner product values between ($dMV_x$, $dMV_y$) and a coordinate (x, y) of the sample 2308 of the current block 2300, an origin of the coordinate (x, y) of the sample 2308 is the upper left coordinate 2301 of the current block 2300, and ($dMV_x$, $dMV_y$) indicates the vertical change rate and the horizontal change rate of the coordinate (x, y) of the sample 2308.

According to Equations 1 through 3, motion vectors of all samples or sub-blocks included in the current block 2300 may be determined. According to Equations 1 through 3, the motion vectors of the samples may be differently determined according to locations of the samples. Equations 1 and 2 may be applied when vertical components of coordinates, from which the first motion vector 2302 and the second motion vector 2304 are derived, are the same, and horizontal components of coordinates, from which the first motion vector 2302 and the third motion vector 2306 are derived, are the same. Thus, a generalized equation for determining the motion vector of the current block 2300 will be described below with reference to FIG. 28.

In the 6-parameter affine mode, the motion vector 2310 may be determined based on three motion vectors. Thus, a reference block of the current block 2300 may be zoomed, rotated, and sheared from the current block 2300.

In the 4-parameter affine mode, the processor 1710 may obtain two motion vectors 2302 and 2304 from peripheral samples of the current block 2300. As in the 6-parameter affine mode, the first motion vector 2302 may be obtained from peripheral samples of an upper left coordinate of the current block 2300. Likewise, the second motion vector 2304 may be obtained from peripheral samples of an upper right coordinate of the current block 2300. Also, the processor 1710 may determine an x component and a y component of the first motion vector 2302 and an x component and a y component of the second motion vector 2304 as the affine parameters.

In the 4-parameter affine mode, the third motion vector 2306 may not be determined from the lower left coordinate or the lower right coordinate of the current block 2300. Rather, the third motion vector 2306 may be determined by combining the first motion vector 2302 and the second motion vector 2304.

Equation 4 and Equation 5 indicate a method of determining the third motion vector 2306 by combining the first motion vector 2302 and the second motion vector 2304. In Equations 4 and 5, x denotes a horizontal component of the motion vector and y denotes a vertical component of the motion vector. $MV_0$ denotes the first motion vector 2303, $MV_1$ denotes the second motion vector 2304, and $MV_2$ denotes the third motion vector 2306. w denotes a width of the current block 2300 and h denotes a height of the current block 2300.

$$MV_2[x]=(MV_1[y]-MV_0[y])*w/h+MV_0[x] \quad \text{[Equation 4]}$$

$$MV_2[y]=(MV_0[x]-MV_1[x])*w/h+MV_0[y] \quad \text{[Equation 5]}$$

According to Equation 4, a horizontal coordinate value $MV_2[x]$ of the third motion vector 2306 may be determined as $(MV_1[y]-MV_0[y])*w/h+MV_0[x]$, a value generated by adding a horizontal coordinate value $MV_0[x]$ of the first motion vector 2302 to a value w/h obtained by multiplying a value $MV_1[y]-MV_0[y]$, which is obtained by subtracting a vertical coordinate value of the first motion vector 2302 from a vertical coordinate value of the second motion vector 2304, with a value obtained by dividing a width of the current block by a height of the current block.

According to Equation 5, a vertical coordinate value $MV_2[y]$ of the third motion vector 2306 may be determined as $(MV_0[x]-MV_1[x])*w/h+MV_0[y]$, a value generated by adding a vertical coordinate value $MV_0[y]$ of the first motion vector 2302 to a value w/h obtained by multiplying a value $MV_0[x]-MV_1[x]$, which is obtained by subtracting a horizontal coordinate value of the second motion vector 2304 from a horizontal coordinate value of the first motion vector 2302, with the value obtained by dividing the width of the current block by the height of the current block.

In the 4-parameter affine mode, the x component and the y component of the third motion vector 2306 may be derived from the first motion vector 2302 and the second motion vector 2304. Thus, unlike the 6-parameter affine mode, in the 4-parameter affine mode, the reference block of the current block 2300 may be only zoomed and rotated from the current block 2300 based on the first motion vector 2302 and the second motion vector 2304. That is, in the 4-parameter affine mode, the current block 2300 may not be sheared.

In the 3-parameter affine mode, the processor 1710 may obtain two motion vectors 2302 and 2304 from peripheral samples of the current block 2300. The first motion vector 2302 may be obtained from peripheral samples of an upper left coordinate of the current block 2300. Likewise, the second motion vector 2304 may be obtained from peripheral samples of an upper right coordinate of the current block 2300. However, unlike the 4-parameter affine mode, in the 3-parameter affine mode, only the x component or the y component may be obtained from the second motion vector 2304. Thus, the processor 1710 may determine the x component and the y component of the second motion vector 2304 along with the x component and the y component of the first motion vector 2302 as the Affine parameters.

When the x component of the second motion vector 2304 is to be obtained, the y component of the second motion vector 2304 may be obtained from the y component of the first motion vector 2302. On the contrary, when the y component of the second motion vector 2304 is to be obtained, the x component of the second motion vector 2304 may be obtained from the x component and the y component of the first motion vector 2302 and the y component of the second motion vector 2304. Equations 6 and 7 below indicate a method of determining the y component and the x component of the second motion vector 2304.

In Equations 6 and 7, x denotes a horizontal component of the motion vector and y denotes a vertical component of the motion vector. $MV_0$ denotes the first motion vector 2303, $MV_1$ denotes the second motion vector 2304, and $MV_2$ denotes the third motion vector. w denotes a width of the current block 2300 and h denotes a height of the current block 2300.

$$MV_1[y]=MV_0[y] \quad \text{[Equation 6]}$$

$$MV_1[x]=\text{sqrt}(w^2-(MV_1[y]-MV_0[y])^2)+MV_0[x]-w \quad \text{[Equation 7]}$$

According to Equation 6, when only the x component of the second motion vector 2304 is to be obtained, the processor 1710 may determine the y component of the second motion vector 2304 to be the same as the y component of the first motion vector 2302.

According to Equation 7, when only the y component of the second motion vector 2304 is to be obtained, the processor 1710 may determine the x component of the second motion vector 2304 according to the x component $MV_0[x]$ and the y component $MV_0[y]$ of the first motion vector 2302 and the y component $MV_1[y]$ of the second motion vector 2304.

Also, the x component and the y component of the third motion vector 2306 may be determined according to Equations 4 and 5 as in the 4-parameter affine mode. In the 3-parameter affine mode, the x components or the y components of the second motion vector 2304 and the third motion vector 2306 that are not be obtained may be derived from the x components or the y components of the first motion vector 2302 and the second motion vector 2304 that are to be obtained. Thus, in the 3-parameter affine mode, the reference block of the current block 2300 may be only zoomed or rotated from the current block 2300 based on the first motion vector 2302 and the second motion vector 2304. When the x component of the second motion vector 2304 is to be obtained, the reference block of the current block 2300 may be only zoomed from the current block 2300. On the contrary, when the y component of the second motion vector 2304 is to be obtained, the reference block of the current block 2300 may be only rotated from the current block 2300.

The processor 1710 may obtain affine mode information indicating whether or not an affine mode is applied to the current block. Also, when the affine mode information indicates that the affine mode is applied to the current block, the processor 1710 may predict the current block according to the affine mode.

The processor 1710 may obtain two or more base motion vectors from an adjacent block of the current block. The base motion vector denotes a motion vector before the motion vector is adjusted according to a UMVE mode.

According to an embodiment, the processor 1710 may obtain a first base motion vector from an adjacent block adjacent to an upper left sample of the current block and a second base motion vector from an adjacent block adjacent to an upper right sample of the current block. Also, the processor 1710 may obtain a third base motion vector from an adjacent block adjacent to a lower left sample of the current block.

According to an embodiment, the processor 1710 may obtain affine motion vector correction information indicating whether or not the base motion vector used to determine an affine motion vector is corrected. Also, when the affine motion vector correction information indicates that the base motion vector is corrected, the processor 1710 may obtain correction information and determine two or more affine motion vectors according to the correction information.

The processor 1710 may obtain the correction information for correcting the two or more base motion vectors. The correction information may be required for correcting the base motion vector. In the 6-parameter affine mode, the correction information may include information about correction of the first base motion vector, the second base motion vector, and the third base motion vector. In the 4-parameter affine mode, the correction information may include information about correction of the first base motion vector and the second base motion vector.

According to an embodiment, the processor 1710 may obtain the correction information including first correction size information and first correction direction information with respect to the correction of the first base motion vector. Also, the processor 1710 may obtain second correction size information and second correction direction information with respect to the correction of the second base motion vector. Likewise, the processor 1710 may obtain third correction size information and third correction direction information with respect to the correction of the third base motion vector.

Also, the processor 1710 may obtain a first correction vector from the first correction size information and the first correction direction information. Likewise, the processor 1710 may obtain a second correction vector from the second correction size information and the second correction direction information and a third correction vector from the third correction size information and the third correction direction information.

The processor 1710 may determine two or more affine motion vectors by correcting two or more base motion vectors according to the correction information. The affine motion vector denotes a motion vector used to determine the motion vector of pixels of the current block with respect to affine prediction. The affine motion vector may be determined by adjusting the base motion vector according to a UMVE mode. The processor 1710 may determine a first affine motion vectors by correcting the first base motion vector according to the first correction vector. The processor 1710 may determine a second affine motion vector by correcting the second base motion vector according to the second correction vector and a third affine motion vector by correcting the third base motion vector according to the third correction vector.

According to an embodiment, in the 6-parameter affine mode, the processor 1710 may determine the first through third affine motion vectors, by correcting the first through third base motion vectors, according to the correction information. Also, the processor 1710 may determine the first affine motion vector according to first correction size information, first correction direction information, and the first base motion vector. Also, the processor 1710 may determine the second affine motion vector according to second correction size information, second correction direction information, and the second base motion vector. Also, the processor 1710 may determine the third affine motion vector according to third correction size information, third correction direction information, and the third base motion vector.

According to an embodiment, in the 3-parameter affine mode or the 4-parameter affine mode, the processor 1710 may determine the first affine motion vector and the second affine motion vector by correcting the first base motion vector and the second base motion vector according to the correction information. Also, the processor 1710 may determine the first affine motion vector according to the first correction size information, the first correction direction information, and the first base motion vector. Also, the processor 1710 may determine the second affine motion vector according to the second correction size information, the second correction direction information, and the second base motion vector. Also, the processor 1710 may determine the third affine motion vector according to the first affine motion vector and the second affine motion vector.

According to an embodiment, the processor 1710 may derive a second correction size and a third correction size from a first correction size indicated by the first correction size information. For example, the processor 1710 may set the second correction size and the third correction size as the same as the first correction size. Thus, decoding of second correction size information and third correction size information indicating the second correction size and the third correction size may be omitted.

According to an embodiment, the processor 1710 may obtain, from a bitstream, correction direction uniformity information indicating whether or not first through third correction directions are the same. When the correction direction uniformity information indicates that the first through third correction directions are the same, the processor 1710 may determine the second and third correction directions as the same as the first correction direction without obtaining additional information about the second and third correction directions. On the contrary, when the correction direction uniformity information indicates that the first through third correction directions are not the same, the processor 1710 may determine the second and third correction directions by obtaining additional information about the second and third correction directions. The correction direction uniformity information may be omitted, and a second correction direction candidate and information about the third correction direction may be directly obtained.

According to an embodiment, the processor 1710 may determine two or more second correction direction candidates with respect to the second correction direction and two or more third correction direction candidates with respect to the third correction direction from a peripheral block of the current block. Also, the processor 1710 may determine one of two or more second correction direction candidates as the second correction direction according to the second correction direction information. Likewise, the processor 1710 may determine one of two or more third correction direction candidates as the third correction direction according to the third correction direction information.

According to an embodiment, the second correction direction information and the third correction direction information may be information on which fixed-length coding or truncated unary coding is performed. According to an embodiment, when the second correction direction information and the third correction direction information are truncated unary coded, a short bit may be assigned to a correction direction candidate which has a less direction difference from the first correction direction. For example, when there are three correction direction candidates, "0," "10," and "11" may be assigned to the correction direction candidates, in the order in which the difference of the correction direction is decreased.

According to an embodiment, the processor 1710 may obtain first correction direction difference information indicating a difference of the correction direction between a correction direction according to the first correction direction information and a correction direction of the second base motion vector, in order to obtain the second correction direction information. Also, the processor 1710 may determine the second correction direction information according to the first correction direction difference information and the first correction direction information.

According to an embodiment, the processor 1710 may obtain second correction direction difference information indicating a difference of the correction direction between the correction direction according to the first correction direction information and a correction direction of the third base motion vector, in order to obtain the third correction direction information. The processor 1710 may determine the third correction direction information according to the second correction direction difference information and the first correction direction information.

Figure 24:
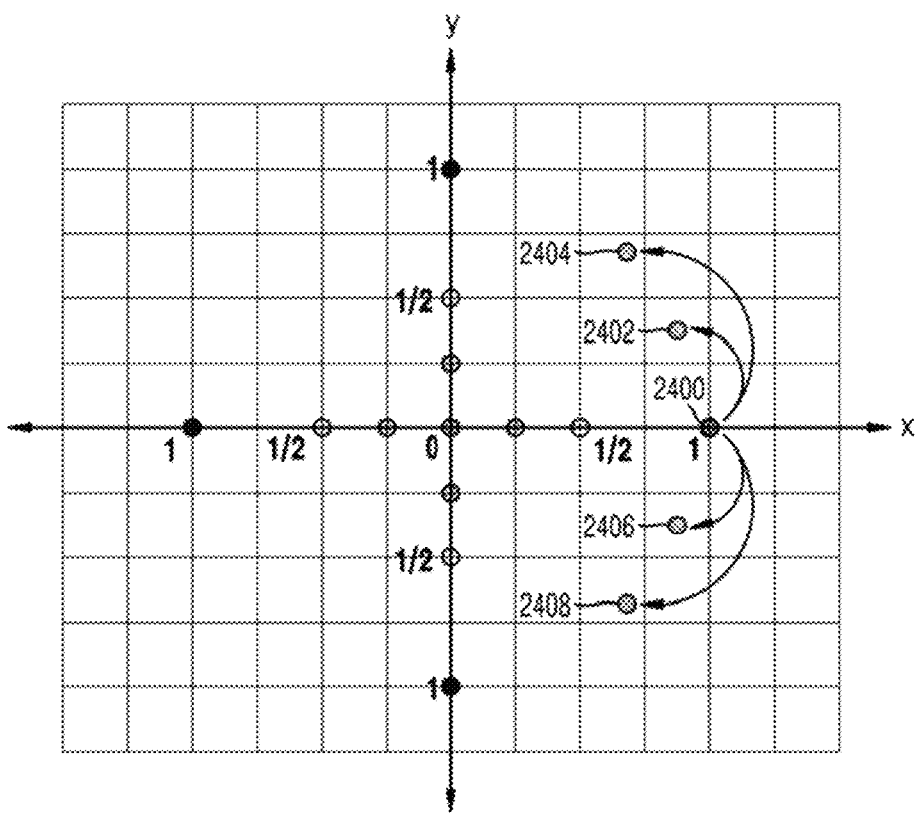
FIG. 24 illustrates a method of deriving a second correction direction and a third correction direction based on a first correction direction, according to an embodiment.

FIG. 24 illustrates a method of deriving the second correction direction and the third correction direction based on the first correction direction, according to an embodiment.

A first correction vector may be determined according to a first correction size and a first correction direction. According to an embodiment illustrated in FIG. 24, the first correction vector having the first correction size of 1 and the first correction direction of +x may correspond to a location 2400.

According to an embodiment, the processor 1710 may determine a second correction size and a third correction size to be equal to the first correction size that is 1. Alternatively, the processor 1710 may determine the second correction size and the third correction size according to additional correction size information obtained from a bitstream.

According to an embodiment, the processor 1710 may determine the second correction direction according to a first correction direction difference and the first correction direction. For example, when the first correction direction difference corresponds to a direction difference of about 22.5 degrees from an anticlock-wise direction, the second correction direction may be determined as a direction of about 22.5 degrees from the anticlock-wise direction based on a +x axis, according to the first correction direction and the first correction direction difference. According to the second correction direction, the second correction vector may be located at a location 2402.

The first correction direction difference described above is only an example and may have different values according to an embodiment. Thus, according to the first correction direction difference, the second correction vector may correspond to locations 2402, 2404, 2406, and 2408. Also, according to the first correction direction difference, the second correction vector may correspond to a location not illustrated in FIG. 24.

According to an embodiment, the processor 1710 may determine a value having the same size as the first correction direction difference and an opposite sign to the first correction direction difference, as a second correction direction difference. For example, when the first correction direction difference corresponds to a direction difference of about 22.5 degrees from the anticlock-wise direction, the second correction direction difference may be determined as a direction difference of about 22.5 degrees from a clock-wise direction. Also, the processor 1710 may determine the third correction direction according to the second correction direction difference and the first correction direction.

Thus, when the second correction vector corresponds to the location 2402, the third correction vector may be determined to correspond to the location 2406. Likewise, when the second correction vector corresponds to the location 2406, the third correction vector may be determined to correspond to the location 2402. Thus, the third correction vector may be determined according to the first correction vector and the second correction vector without additional information.

According to an embodiment, when the first correction direction difference is 0, the first correction vector, the second correction vector, and the third correction vector may be determined to be the same. According to an embodiment, the first correction direction difference and the second correction direction difference may be separately determined.

According to an embodiment, a location to which a correction vector corresponds may not be located on a coordinate of a preset fractional number unit. Thus, a value of the correction vector may be determined to correspond to a coordinate of a preset fractional number unit that is mot adjacent to the location to which the correction vector corresponds. For example, when the correction vector corresponds to the location 2404 and the correction vector may be expressed as a coordinate of a ¼ unit, the correction vector may be determined as (0.75, 0.75) which is most adjacent to the location 2404.

According to an embodiment illustrated in FIG. 24, it is described that the second correction vector may be determined based on the first correction vector, and the third correction vector may be determined according to the first correction vector and the second correction vector. However, according to an embodiment, the first correction vector, the second correction vector, and the third correction vector may be independently determined. Thus, rather than obtaining the first correction direction difference information, the second and third correction direction information respectively indicating the second and third correction directions may be obtained from a bitstream. Alternatively, the second correction direction information indicating the second correction direction may be obtained from the bitstream and the third correction direction may be derived from the first and second correction directions.

According to an embodiment, the processor 1710 may determine zooming information and rotation information from the first base motion vector and the second base motion vector. Also, rather than correcting the second base motion vector, the processor 1710 may correct the zooming information and the rotation information, according to the second correction size information and the second correction direction information. Also, the processor 1710 may determine the second affine motion vector, according to the corrected zooming information and the corrected rotation information.

Figure 25:
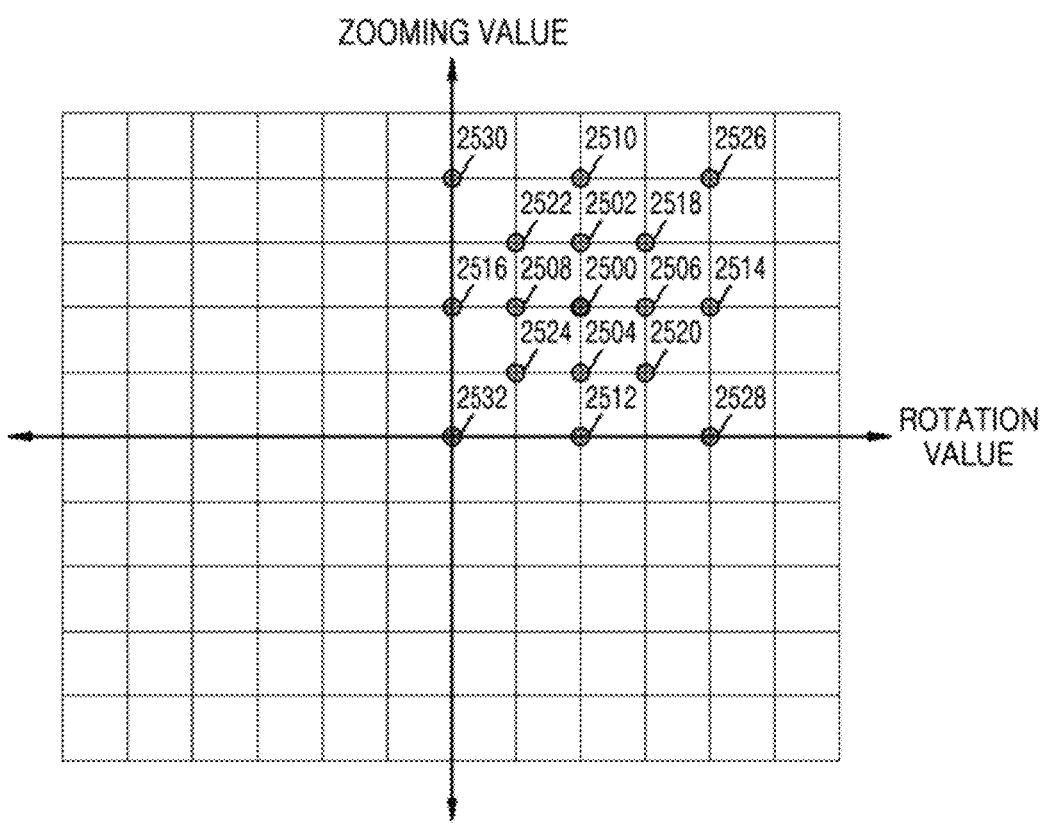
FIG. 25 illustrates a method of correcting extension information and rotation information that are determined from a first base motion vector and a second base motion vector, according to second correction size information and second correction direction information, according to an embodiment.

FIG. 25 illustrates a method of correcting zooming information and rotation information determined from a first base motion vector and a second base motion vector, according to second correction size information and second correction direction information, according to an embodiment.

In the 4-parameter affine mode, when Equations 4 and 5 related to determination of the third affine motion vector are combined with Equation 3 related to the motion vector of each pixel, Equation 8 may be derived.

$$MV = MV_0 + s(R \cdot x), (s = \text{zooming coefficient}, R: \text{rotational matrix}, x: \text{a current pixel location}) \quad [\text{Equation 8}]$$

s of Equation 8 indicates a zooming coefficient. The zooming coefficient may correspond to zooming of a reference block of a current block. The value of s may be expressed as in Equation 9. $mv_{tmp}$ of Equation 9 may indicate a difference vector between the first base motion vector and the second base motion vector. According to an embodiment, $mv_{tmp}$ of Equation 9 may indicate a difference vector between a corrected second base motion vector generated by adding an x component to the second base motion vector according to a width of a block, and the first base motion vector. Alternatively, according to an embodiment, $mv_{tmp}$ of Equation 9 may indicate a difference vector between a corrected second base motion vector generated by correcting the second base motion vector according to a direction difference between the second base motion vector and the first base motion vector, and the first base motion vector. Also, w indicates a width of the current block.

$$s = \frac{\sqrt{mv_{tmp}[x]^2 + mv_{tmp}[y]^2}}{w} \quad [\text{Equation 9}]$$

R of Equation 8 is a rotational matrix. A rotational angle of the rotational matrix corresponds to rotation of the reference block of the current block. The rotational angle θ of the rotational matrix R may be expressed like Equation 10. As in Equation 9, $mv_{tmp}$ of Equation 10 may indicate a difference vector between the first base motion vector and the second base motion vector.

$$\tan\theta = \frac{mv_{tmp}[y]}{mv_{tmp}[x]} \quad [\text{Equation 10}]$$

x denotes a location of a current pixel. In the 4-parameter affine mode, as described above, the information about shearing of the reference block of the current block may not be obtained.

According to an embodiment, in the 4-parameter affine mode, the zooming coefficient and the rotational angle of the rotational matrix may be determined from the first base motion vector and the second base motion vector. Also, the zooming information and the rotation information may be determined according to the zooming coefficient and the rotational angle of the rotational matrix. As illustrated in FIG. 25, the zooming information and the rotation information may be expressed in a two-dimensional coordinate space such that the value indicated by the rotation information corresponds to an x axis and the value indicated by the zooming information corresponds to a y axis.

The processor 1710 may correct the zooming information and the rotation information, rather than correcting the second base motion vector. The processor 1710 may change a coordinate corresponding to affine transform information including the zooming information and the rotation information according to second correction size information and second correction direction information.

For example, in FIG. 25, the affine transform information may correspond to a coordinate 2500. The processor 1710 may determine a second correction vector indicated by the second correction size information and the second correction direction information. Also, the processor 1710 may correct the affine transform information including the zooming information and the rotation information according to the second correction vector. The corrected affine transform information may correspond to a peripheral coordinate of the coordinate 2500, according to the second correction vector.

When the second correction size information is 1 and the second correction direction information is a +y direction, the corrected affine transform information may correspond to a coordinate 2502. The corrected affine transform information may correspond to coordinates 2504 through 2530 indicated in FIG. 25, according to the second correction size information and the second correction direction information. Also, the corrected affine transform information may not be limited to the coordinates indicated in FIG. 25 and may be determined to correspond to other coordinates according to the second correction size information and the second correction direction information.

The processor 1710 may determine a first affine motion vector by correcting the first base motion vector according to the first correction vector. Also, the processor 1710 may determine the motion vector of the pixels of the current block by using the first affine motion vector and the corrected affine transform information. Thus, according to an embodiment illustrated in FIG. 25, the second base motion vector may be used only to determine the affine transform information including the zooming information and the rotation information.

According to an embodiment, the processor 1710 may obtain common correction size information and common correction direction information indicating a correction size and a correction direction that are to be commonly applied to the first through third base motion vectors. The processor 1710 may obtain first additional correction size information and first additional correction direction information indicating a correction size and a correction direction that are to be commonly applied only to the second base motion vector. Likewise, the processor 1710 may obtain second additional correction size information and second additional correction direction information indicating a correction size and a correction direction applied only to the third base motion vector.

According to an embodiment, the processor 1710 may determine the first affine motion vector according to a common correction vector determined based on the common correction size information and the common correction direction information, and the first base motion vector. Also, the processor 1710 may determine the second affine motion vector according to the common correction vector, a first additional correction vector determined based on the first additional correction size information and the first additional correction direction information, and the second base motion vector. Also, the processor 1710 may determine the second affine motion vector according to the common correction vector, a second additional correction vector determined based on the second additional correction size information and the second additional correction direction information, and the third base motion vector.

According to an embodiment, when a prediction mode of the current block is a bi-prediction mode, the processor 1710 may obtain a list 0 base motion vector and a list 1 base motion vector from an adjacent block of the current block. For example, the processor 1710 may obtain a first list 0 base motion vector and a first list 1 base motion vector from an adjacent block of an upper left sample of the current block. Also, the processor 1710 may obtain a second list 0 base motion vector and a second list 1 base motion vector from an adjacent block of an upper right sample of the current block. Also, the processor 1710 may obtain a third list 0 base motion vector and a third list 1 base motion vector from an adjacent block of a lower left sample of the current block.

The processor 1710 may obtain correction size information and correction direction information for correcting the list 0 base motion vector. Also, the processor 1710 may determine a list 0 affine motion vector and a list 1 affine motion vector by correcting the list 0 base motion vector and the list 1 base motion vector according to the correction size information and the correction direction information.

The processor 1710 may determine the list 0 affine motion vector by correcting the list 0 base motion vector according to a list 0 correction vector determined based on a correction size of the correction size information and a correction direction of the correction direction information.

Also, when a list 0 reference picture and a list 1 reference picture have the same temporal direction, the processor 1710 may determine a correction direction of the list 1 correction vector according to the correction direction of the correction direction information. On the contrary, when the list 0 reference picture and the list 1 reference picture have different temporal directions, the processor 1710 may determine the correction direction of the list 1 correction vector according to a direction opposite to the correction direction of the correction direction information.

Also, the processor 1710 may determine a correction size of the list 1 correction vector by changing a correction size of the list 0 correction vector according to a ratio of a temporal distance between the list 0 reference picture and the current picture to a temporal distance between the list 1 reference picture and the current picture.

The list 1 affine motion vector may be determined by correcting the list 1 base motion vector according to the correction direction and the correction size of the list 1 correction vector, the correction direction and the correction size being determined as described above. The method of determining the list 0 affine motion vector and the list 1 affine motion vector described above may be likewise applied to the first list 0 base motion vector and the first list 1 base motion vector, the second list 0 base motion vector and the second list 1 base motion vector, and the third list 0 base motion vector and the third list 1 base motion vector. The method of correcting the motion vector according to the bi-prediction described above in FIG. 22 may be applied to the method of determining the list 0 affine motion vector and the list 1 affine motion vector.

The processor 1710 may obtain a plurality of affine parameters of the current block according to two or more affine motion vectors. Also, the processor 1710 may predict the current block according to the plurality of affine parameters. The processor 1710 may determine the motion vectors corresponding to the pixels of the current block according to the plurality of affine parameters. Also, the processor 1710 may predict the pixels of the current block according to the plurality of motion vectors.

The processor 1710 may reconstruct the current block based on prediction values of the pixels of the current block. The processor 1710 may reconstruct the current block according to a prediction block of the current block and a residual block of the current block. The residual block of the current block may indicate a differential value of a reconstruction block of the current block and the prediction block of the current block.

In the video decoding apparatus 1700, information about the number of decoded UMVE candidates, information about the number of correction size candidates, information about the number of correction direction candidates, information about construction of a UMVE candidate list, information about a correction size range, information about a main prediction direction, information about an UMVE index, information about an affine mode, information about correction of an affine motion vector, information about a correction size, information about a correction direction, information about a prediction direction, information about an additional correction size, information about an additional correction direction, etc. may be binarized based on fixed length coding or truncated unary coding.

The functions of the processor 1710 may be performed by the decoder 170 of FIG. 1B.

FIG. 26 illustrates a flowchart of a video decoding method for encoding a current block by correcting, based on a UMVE mode, a base motion vector determined according to an affine mode.

In operation S2610, two or more base motion vectors may be obtained from an adjacent block of the current block.

In operation S2620, correction information for correcting the two or more base motion vectors may be obtained.

In operation S2630, two or more affine motion vectors may be determined by correcting the two or more base motion vectors according to the correction information.

In operation S2640, a plurality of affine parameters of the current block may be obtained according to the two or more affine motion vectors.

In operation S2650, the current block may be predicted according to a plurality of affine parameters.

The technical features realized by the processor 1710 of FIG. 17 may be realized by the video decoding method of FIG. 26.

FIG. 27 illustrates a block diagram of a video encoding apparatus 2700 for encoding a current block by correcting, based on a UMVE mode, a base motion vector determined according to an affine mode.

Referring to FIG. 27, the video decoding apparatus 2700 according to an embodiment may include a processor 2710 and a memory 2720.

The processor 2710 according to an embodiment may generally control the video encoding apparatus 2700. The processor 2710 according to an embodiment may execute one or more programs stored in the memory 2720.

The memory 2720 according to an embodiment may store various data, programs or applications for operating and controlling the video encoding apparatus 2700. The programs stored in the memory 2720 may include one or more instructions. The programs (the one or more instructions) or the applications stored in the memory 2720 may be executed by the processor 2710.

The processor 2710 may predict the current block according to the plurality of affine parameters. The processor 2710 may perform prediction according to an affine mode based on two or more base motion vectors obtained from an adjacent block of the current block. Also, the processor 2710 may assess a prediction result according to the base motion vector.

The processor 2710 may change an x component and a y component of the base motion vector. Also, the processor 2710 may perform the prediction according to the affine mode based on the changed base motion vector. Also, the processor 2710 may assess a prediction result according to the changed base motion vector.

The processor 2710 may compare the prediction result according to the base motion vector with the prediction result according to the changed base motion vector. The processor 2710 may apply the comparison process to the base motion vector and base motion vectors changed according to the UMVE mode. Also, the processor 2710 may determine a motion vector having an optimum prediction result from among the base motion vector and the base motion vectors changed according to the UMVE mode, as the affine motion vector.

The processor 2710 may determine correction information for correcting two or more base motion vectors, according to two or more affine motion vectors and the two or more base motion vectors.

The technical features of video decoding described with respect to the video decoding apparatus 1700 may be applied to the video encoding apparatus 2700. The functions of the processor 2710 may be performed by the decoder 110 of FIG. 1A.

Figure 28:
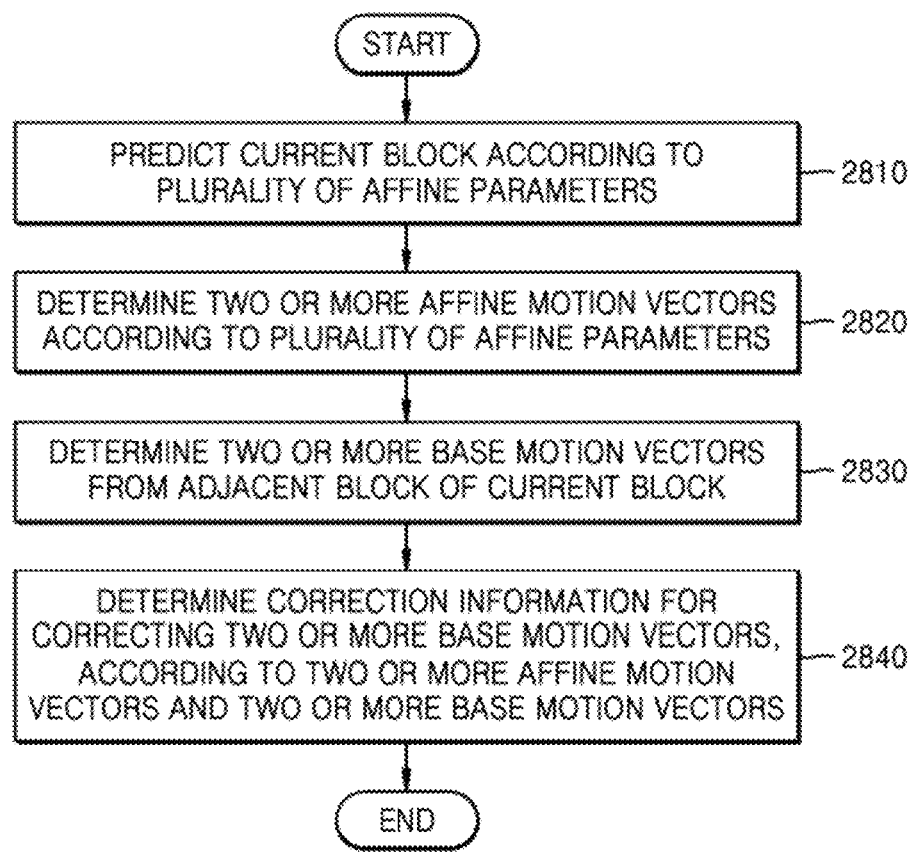
FIG. 28 illustrates a flowchart of a video encoding method, according to which a current block is encoded by correcting a base motion vector determined according to an affine mode, according to a UMVE mode.

FIG. 28 illustrates a flowchart of a video encoding method for encoding a current block by correcting, based on a UMVE mode, a base motion vector determined according to an affine mode.

In operation S2810, the current block may be predicted according to a plurality of affine parameters.

In operation S2820, two or more Affine motion vectors may be determined according to the plurality of affine parameters.

In operation S2830, two or more base motion vectors may be determined from an adjacent block of the current block.

In operation S2840, the correction information for correcting the two or more base motion vectors may be determined according to the two or more affine motion vectors and the two or more base motion vectors.

The technical features realized by the processor 2710 of FIG. 27 may be realized by the video encoding method of FIG. 28.

According to the video encoding method based on the coding units having the tree structure described above with reference to FIGS. 1 through 28, image data of a spatial area may be encoded for each coding unit having the tree structure and each largest coding unit may be decoded according to the video decoding method based on the coding units having the tree structure to reconstruct the image data of the spatial area, so that a picture, and a video including picture sequences may be reconstructed. The reconstructed video may be reproduced by a reproducing apparatus, stored in a storage medium, or transmitted through a network.

The embodiments of the disclosure described in detail may be embodied as a program to be executed in a computer, and may be implemented in a general-purpose digital computer for executing the program by using a computer-readable recording medium.

Although the disclosure is described in relation to specific best embodiments, substitutions, modifications, and corrections to the disclosure will be apparent to one of ordinary skill in the art based on the descriptions above. That is, the scope of claims shall be interpreted to include all these substitutions, modifications, and corrections. Therefore, the descriptions in this specification and the drawings should be interpreted as non-limiting examples.

The invention claimed is:

1. A video decoding method comprising: obtaining a first base motion vector from an adjacent block adjacent to an upper left sample of a current block and obtaining a second base motion vector from an adjacent block adjacent to an upper right sample of the current block; obtaining first correction size information and first correction direction information to correct the first base motion vector; obtaining second correction size information and second correction direction information to correct the second base motion vector; determining a first affine motion vector by correcting the first base motion vector according to the first correction size information and the first correction direction information; determining a second affine motion vector by correcting the second base motion vector according to the second correction size information and the second correction direction information; obtaining a plurality of affine parameters of the current block according to the first affine motion vector and the second affine motion vector; and predicting the current block according to the plurality of affine parameters.

2. The video decoding method of claim 1, wherein the determining of the second affine motion vector includes: determining zooming information and rotation information from the first base motion vector and the second base motion vector; correcting the zooming information and the rotation information according to the second correction size information and the second correction direction information; and according to the corrected zooming information and the corrected rotation information, determining the second affine motion vector.

3. The video decoding method of claim 1, wherein the obtaining of the first base motion vector and the second base motion vector includes, when a prediction mode of the current block is a bi-prediction mode, obtaining a list 0 base motion vector and a list 1 base motion vector from an adjacent block of the current block, and obtaining correction size information and correction direction information for correcting the list 0 base motion vector, and the determining of the first affine motion vector and the second affine motion vector includes determining a list 0 affine motion vector and a list 1 affine motion vector by correcting the list 0 base motion vector and the list 1 base motion vector according to the correction size information and the correction direction information.

4. The video decoding method of claim 3, wherein the determining of the first affine motion vector and the second affine motion vector includes determining the list 0 affine motion vector by correcting the list 0 base motion vector according to a list 0 correction vector determined based on a correction size of the correction size information and a correction direction of the correction direction information.

5. The video decoding method of claim 3, wherein the determining of the first affine motion vector and the second affine motion vector includes: determining a list 1 correction vector according to a correction direction of the correction direction information, when temporal directions of a list 0 reference picture and a list 1 reference picture are the same; determining the list 1 correction vector according to a direction opposite to the correction direction of the correction direction information, when the temporal directions of the list 0 reference picture and the list 1 reference picture are different; and determining the list 1 affine motion vector by correcting the list 1 base motion vector according to the list 1 correction vector.

6. The video decoding method of claim 3, wherein the determining of the first affine motion vector and the second affine motion vector includes: changing a correction size of the correction size information according to a ratio of a temporal distance between a list 0 reference picture and a current picture to a temporal distance between a list 1 reference picture and the current picture; and determining the list 1 affine motion vector by correcting the list 1 base motion vector according to the changed correction size.

7. A video decoding apparatus comprising: a memory storing one or more instructions; and a processor configured to execute the one or more instructions stored in the memory to: obtain first base motion vector from an adjacent block adjacent to an upper left sample of a current block, obtain second base motion vector from an adjacent block of the current block, and obtain a third base motion vector from an adjacent block adjacent to a lower left sample of the current block; obtain first correction size information and first correction direction information for correcting the first base motion vector; obtain second correction size information and second correction direction information for correcting the second base motion vector; obtain third correction size information and third correction direction information for correcting the third base motion vector; determine a first affine motion vector by correcting the first base motion vector according to the first size correction information and the first correction direction information; determine a second affine motion vector by correcting the second base motion vector according to the second size correction information and the second correction direction information; determine a third affine motion vector by correcting the third base motion vector according to the third correction size information and the third correction direction information; obtain a plurality of affine parameters of the current block according to the first affine motion vector, the second affine motion vector, and the third affine motion vector; and predict the current block according to the plurality of affine parameters.

8. The video decoding apparatus of claim 7, wherein the processor is further configured to execute further instructions stored in the memory to: obtain first correction direction difference information indicating a difference of a correction direction between a correction direction according to the first correction direction information and a correction direction of the second base motion vector; and determine the second correction direction information according to the first correction direction difference information and the first correction direction information.

9. The video decoding apparatus of claim 8, wherein the processor is further configured to execute further instructions stored in the memory to:
determine second correction direction difference information indicating a difference of a correction direction between the correction direction according to the first correction direction information and a correction direction of the third base motion vector, according to the first correction direction difference information; and determine the third correction direction information according to the second correction direction difference information and the first correction direction information.

10. The video decoding apparatus of claim 7, wherein correction sizes indicated by the first correction size information, the second correction size information, and the third correction size information are the same.

11. The video decoding apparatus of claim 7, wherein the processor is further configured to execute further instructions stored in the memory to: obtain common correction size information and common correction direction information indicating a correction size and a correction direction that are to be commonly applied to the first base motion vector and the second base motion vector; obtain first additional correction size information and first additional correction direction information indicating a correction size and a correction direction applied only to the second base motion vector; obtain second additional correction size information and second additional correction direction information indicating a correction size and a correction direction applied only to the third base motion vector, determine the first affine motion vector according to a common correction vector determined based on the common correction size information and the common correction direction information and the first base motion vector; determine the second affine motion vector according to the common correction vector, a first additional correction vector determined based on the first additional correction size information and the first additional correction direction information, and the second base motion vector; and determine the third affine motion vector according to the common correction vector, a second additional correction vector determined based on the second additional correction size information and the second additional correction direction information, and the third base motion vector.

12. A video encoding method comprising: predicting a current block according to a plurality of affine parameters; determining a first affine motion vector and a second affine motion vector according to the plurality of affine parameters; determining a first base motion vector from an adjacent block adjacent to an upper left sample of the current block and determine a second base motion vector from adjacent blocks adjacent to an upper right sample of the current block; determining common correction size information and common correction direction information indicating a correction size and a correction direction that are to be commonly applied to the first base motion vector and the second base motion vector; and determining additional correction size information and additional correction direction information indicating a correction size and a correction direction that are to be commonly applied only to the second base motion vector, wherein the determining of the first affine motion vector includes determining the first affine motion vector according to a common correction vector determined based on the common correction size information and the common correction direction information, and the first base motion vector, and wherein the determining of the second affine motion vector includes determining the second affine motion vector according to the common correction vector, an additional correction vector determined based on the additional correction size information and the additional correction direction information, and the second base motion vector.

13. A video encoding apparatus comprising: a memory storing one or more instructions; and a processor configured to execute the one or more instructions stored in the memory to: predict a current block according to a plurality of affine parameters; determine first affine motion vector and a second affine motion vector according to the plurality of affine parameters; determine a first base motion vector from an adjacent block adjacent to an upper left sample of the current block and determine a second base motion vector from adjacent blocks adjacent to an upper right sample of the current block; and determine first correction size information and first correction direction information for correcting the first base motion vector according to the first affine motion vector and determine second correction size information and second correction direction information for correcting the second base motion vector according to the second affine motion vector, wherein to determine the first affine motion vector and the second affine motion vector comprises: determine the first affine motion vector according to the first correction size information and the first correction direction information and the first base motion vector; and determine the second affine motion vector according to the second correction size information and the second correction direction information and the second base motion vector.

\* \* \* \* \*